(12) United States Patent
Agliardi et al.

(10) Patent No.: US 12,333,607 B2
(45) Date of Patent: Jun. 17, 2025

(54) PORTFOLIO VALUE EVALUATION THROUGH QUANTUM POLYNOMIAL APPROXIMATION

(71) Applicants: International Business Machines Corporation, Armonk, NY (US); E.ON Digital Technology GmbH, Essen (DE)

(72) Inventors: Gabriele Francesco Maria Agliardi, Milan (IT); Kavitha Hassan Yogaraj, Bangalore (IN); Francesco Tacchino, Rueschlikon (CH); Antonio Mezzacapo, Ardsley, NY (US); Gururaja Hebbar, Frisco, TX (US); Omar Shehab, Yorktown Heights, NY (US); Cortiana Giorgio, Munich (DE); Corey O'Meara, Munich (DE); Kumar Jang Bahadur Ghosh, Essen (DE); Piergiacomo Sabino, Duesseldorf (DE)

(73) Assignees: INTERNATIONAL BUSINESS MACHINES CORPORATION, Armonk, NY (US); E.ON Digital Technology GmbH, Essen (DE)

( * ) Notice: Subject to any disclaimer, the term of this patent is extended or adjusted under 35 U.S.C. 154(b) by 78 days.

(21) Appl. No.: 18/298,445

(22) Filed: Apr. 11, 2023

(65) Prior Publication Data
US 2024/0354854 A1 Oct. 24, 2024

(51) Int. Cl.
*G06Q 40/06* (2012.01)
*G06N 10/60* (2022.01)
(52) U.S. Cl.
CPC ............. *G06Q 40/06* (2013.01); *G06N 10/60* (2022.01)
(58) Field of Classification Search
CPC ......... G06Q 40/06; G06N 10/60; G06N 10/00
(Continued)

(56) References Cited

U.S. PATENT DOCUMENTS 10,810,665 B2 * 10/2020 Woerner ............... G06N 10/20
2006/0277134 A1 * 12/2006 Glinberg ............... G06Q 40/06
705/35
(Continued)

FOREIGN PATENT DOCUMENTS

WO WO-2022166850 A1 * 8/2022 ............. G06N 10/00

OTHER PUBLICATIONS

Laszlo Gyongyosi and Sandor Imre, Advances in the Quantum Internet, Communications of the ACM, Aug. 2022.*
(Continued)

*Primary Examiner* — Richard C Weisberger
(74) *Attorney, Agent, or Firm* — Amin, Turocy & Watson, LLP

(57) ABSTRACT

A system can comprise a memory that stores computer executable components, and a processor, operably coupled to the memory, that executes the computer executable components comprising: an evaluating component that employs a quantum register to output a processed vector based on a first variable, of set of variables indexed over a selected dimension, and a valuation component that approximates a value function and that, based on the approximating, outputs a valuation amount representing provision of an aspect over the selected dimension, wherein the value function is a function of an inner product of a set of processing functions that are based on the set of variables, including the first variable, wherein a first processing function of the set of processing functions and of the inner product is based on the processed vector, and wherein the set of variables correspond to conditions defining the provision of the aspect.

17 Claims, 21 Drawing Sheets

(58) Field of Classification Search
USPC .................................................. 705/3–44
See application file for complete search history.

(56) References Cited

U.S. PATENT DOCUMENTS

| | | | | |
|---|---|---|---|---|
| 2011/0153521 | A1* | 6/2011 | Green | G06Q 40/06 705/36 R |
| 2015/0058258 | A1* | 2/2015 | Glinberg | G06Q 40/08 705/36 R |
| 2021/0089953 | A1* | 3/2021 | Bocharov | G06N 10/60 |
| 2022/0198562 | A1* | 6/2022 | Cella | G06Q 40/04 |
| 2022/0414670 | A1* | 12/2022 | Shannon, III | G06Q 20/02 |

OTHER PUBLICATIONS

Holmes, et al., "On nonlinear transformations in quantum computation," arXiv:2112.12307v2 [quant-ph] Feb. 15, 2023, Phys. Rev. Research 5, 013105—Published Feb. 13, 2023, DOI: https://doi.org/10.1103/PhysRevResearch.5.013105.

Markov, et al., "A Generalized Quantum Inner Product and Applications to Financial Engineering," arXiv:2201.09845v1 [quant-ph] Jan. 24, 2022, https://doi.org/10.48550/arXiv.2201.09845.

Nielsen, et al., "Quantum Computation and Quantum Information," 10th Anniversary Edition, First published 2000 Reprinted 2002, 2003, 2004, 2007, 2009, 10th Anniversary edition published 2010, ISBN 978-1-107-00217-3.

Tang, et al., "A quantum-inspired classical algorithm for recommendation systems," arXiv:1807.04271v3 [cs.IR] May 9, 2019, STOC 2019: Proceedings of the 51st Annual ACM SIGACT Symposium on Theory of Computing, Jun. 2019, pp. 217-228, https://doi.org/10.1145/3313276.3316310.

Brassard, et al., "Quantum Amplitude Amplification and Estimation," arXiv:quant-ph/0005055v1 May 15, 2000, Quantum Computation and Quantum Information, Samuel J. Lomonaco, Jr. (editor), AMS Contemporary Mathematics, 305:53-74, 2002, https://doi.org/10.1090/conm/305/05215.

Araujo, et al., "A divide-and-conquer algorithm for quantum state preparation," Scientific Reports | (Published: Mar. 18, 2021) 11:6329, https://doi.org/10.1038/s41598-021-85474-1.

Araujo, et al., "Configurable sublinear circuits for quantum state preparation," arXiv:2108.10182v2 [quant-ph] Mar. 2, 2022, https://doi.org/10.48550/arXiv.2108.10182.

Agliardi, et al., "Energy contract valuation on quantum computers," Last Accessed: Feb. 21, 2023.

Lubasch, et al., "Variational quantum algorithms for nonlinear problem," https://arxiv.org/pdf/1907.09032.pdf, arXiv:1907.09032v3 [quant-ph] Dec. 17, 2019, Phys. Rev. A 101, 010301 (2020), https://doi.org/10.1103/PhysRevA.101.010301.

* cited by examiner

PORTFOLIO VALUE EVALUATION THROUGH QUANTUM POLYNOMIAL APPROXIMATION

BACKGROUND

In the field of portfolio evaluation, such as contract evaluation, product supply evaluation, service supply evaluation and/or the like, a plurality of simulations can be run to determine expected portfolio value. This value can be monetary and/or otherwise and can be calculated using classical computation. However, such classical computation has accuracy and timeliness limitations, as well as having limits on the number of available variables that can be included in the computations. Indeed, executing millions of simulations for determination of a single portfolio evaluation can be impractical due to the accuracy and speed limitations of classical computation.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatuses and/or computer program products can facilitate a process to determine valuation of provision of an aspect (product and/or service) over one or more selected dimensions, such as time (e.g., a time range), wherein the process employs one or more quantum operations for asymptotic quantum speedup of the process.

In accordance with an embodiment, a system can comprise a memory that stores computer executable components, and a processor that executes the computer executable components stored in the memory, wherein the computer executable components can comprise an evaluating component that employs a quantum register to output a processed vector based on a first variable, of a set of variables indexed over a selected dimension; and a valuation component that approximates a value function and that, based on the approximating, outputs a valuation amount representing provision of an aspect over the selected dimension, wherein the value function is a function of an inner product of a set of processing functions that are based on the set of variables, including the first variable, wherein a first processing function of the set of processing functions and of the inner product is based on the processed vector, and wherein the set of variables correspond to conditions defining the provision of the aspect.

In accordance with another embodiment, a computer-implemented method can comprise employing, by a system operably coupled to a processor, a quantum register to output processed vector based on a first variable of a set of variables indexed over a selected dimension; approximating, by the system, a value function, wherein the value function is a function of an inner product of a set of processing functions that are based on the set of variables, including the first variable, and wherein a first processing function of the set of processing functions and of the inner product is based on the processed vector; and based on the approximating, outputting, by the system, a valuation amount representing provision of an aspect over the selected dimension, wherein the set of variables correspond to conditions defining the provision of the aspect.

In accordance with another embodiment, a computer program product facilitating valuation of a portfolio can comprise a computer readable storage medium having program instructions embodied therewith, the program instructions executable by a processor to cause the processor to employ, by the processor, a quantum register to output a processed vector based on a first variable, of a set of variables indexed over a selected dimension; approximate, by the processor, a value function, wherein the value function is a function of an inner product of a set of processing functions that are based on the set of variables, including the first variable, and wherein a first processing function of the set of processing functions and of the inner product is based on the processed vector; and based on the approximating, output, by the processor, a valuation amount representing provision of an aspect over the selected dimension, wherein the set of variables correspond to conditions defining the provision of the aspect.

An advantage of such system, computer-implemented method and/or computer program product can be an asymptotic quantum-based speedup of approximation of the value function as compared to classical-only only based approaches having higher costs of such classical computation. This speedup can be at least partially due to a quantum-based speedup associated with the output of the processed vectors and with one or more subsequent power calculations.

In one or more embodiments of the above-mentioned system, computer-implemented method and/or computer program product, an encoding component generates a quantum circuit that encodes a dataset into the quantum register in the form of one or more corresponding quantum states, wherein the encoding comprises employing a set of initial vectors representing the dataset, indexed over the selected dimension, and having been normalized.

An advantage thereof can be provision of an optimal encoding strategy for representing classical data on a quantum processor that optimizes a trade off between quantum circuit depth and quantum circuit width. As a result, a complexity in a resulting quantum circuit can be reduced. As another result, error percentage throughout the encoding, and throughout a value approximation employing the encoding, can be reduced. These one or more reductions can be at least partially due to reduction in noise in a corresponding quantum circuit being executed. Furthermore, the resulting encoding can be compatible with a variety of quantum operations, including a swap test.

In one or more other embodiments described herein, systems, computer-implemented methods, apparatuses and/or computer program products can facilitate a process to provide quantum data encoding, such as in coordination with or apart from portfolio valuation.

In accordance with an embodiment, a system can comprise a memory that stores computer executable components, and a processor that executes the computer executable components stored in the memory, wherein the computer executable components can comprise an encoding component that generates a quantum circuit that encodes a dataset into a quantum register in the form of one or more corresponding quantum states, wherein the encoding comprises employing a set of vectors representing the dataset, indexed over a selected dimension, and having been normalized, and wherein the encoding comprises determining a balance between depth of the quantum circuit and width of the quantum circuit by employing a classical binary tree data structure for angles to encode the set of vectors.

An advantage of such system can be provision of an optimal encoding strategy for representing classical data on a quantum processor that optimizes a trade off between quantum circuit depth and quantum circuit width. As a result, a complexity in a resulting quantum circuit can be reduced. As another result, error percentage throughout the encoding, and throughout a value approximation employing the encoding, can be reduced. These one or more reductions can be at least partially due to reduction in noise in a corresponding quantum circuit being executed. Furthermore, the resulting encoding can be compatible with a variety of quantum operations, including a swap test.

In one or more embodiments of the above-mentioned system, the set of vectors are defined over a parameter s represented by an integer in $\{1 \ldots \log 2\}$, wherein, for each respective vector of the set of vectors, N represents a length of the respective vector. An advantage thereof can be provision of an optimal encoding strategy for representing classical data on a quantum processor that optimizes a trade off between quantum circuit depth and quantum circuit width.

In one or more further embodiments described herein, systems, computer-implemented methods, apparatuses and/or computer program products can facilitate a process to perform quantum circuit dynamic stopping, such as in coordination with or apart from portfolio valuation.

In accordance with an embodiment, a system can comprise a memory that stores computer executable components, and a processor that executes the computer executable components stored in the memory, wherein the computer executable components can comprise an evaluating component that employs a quantum register to perform a non-linear transformation of dataset by calculating a plurality of monomial powers for the dataset, wherein the calculating comprises sequentially executing a set of iterations of a quantum circuit implementation of a quantum Hadamard product at the quantum register, a quantum measurement component that determines a measurement for the quantum circuit during execution of the quantum circuit, and a decision component that, based on the measurement, generates a decision to stop execution of the quantum circuit comprising the set of iterations or to continue the execution of the quantum circuit.

An advantage of such system can be enablement of dynamic stopping of a quantum circuit, employing a feature of dynamic circuits to incorporate classical processing within the coherence time of qubits of the quantum register. That is, the embodiment can make use of mid-circuit measurements and perform feed-forward operations, using the values produced by measurements to determine what gates to apply next, or whether to stop execution of the quantum circuit altogether, such as due to a quantity of error already present in the measurements.

In one or more embodiments of the above-mentioned system, the non-linear transformation by the evaluating component allows for output, by the evaluating component, of the dataset having been processed to produce higher-order powers, wherein the processed dataset is representable as a unitary quantum circuit. An advantage thereof can be an ability to employ quantum amplitude estimation (QAE) incorporating the unitary quantum circuit.

DETAILED DESCRIPTION

Figure 1:
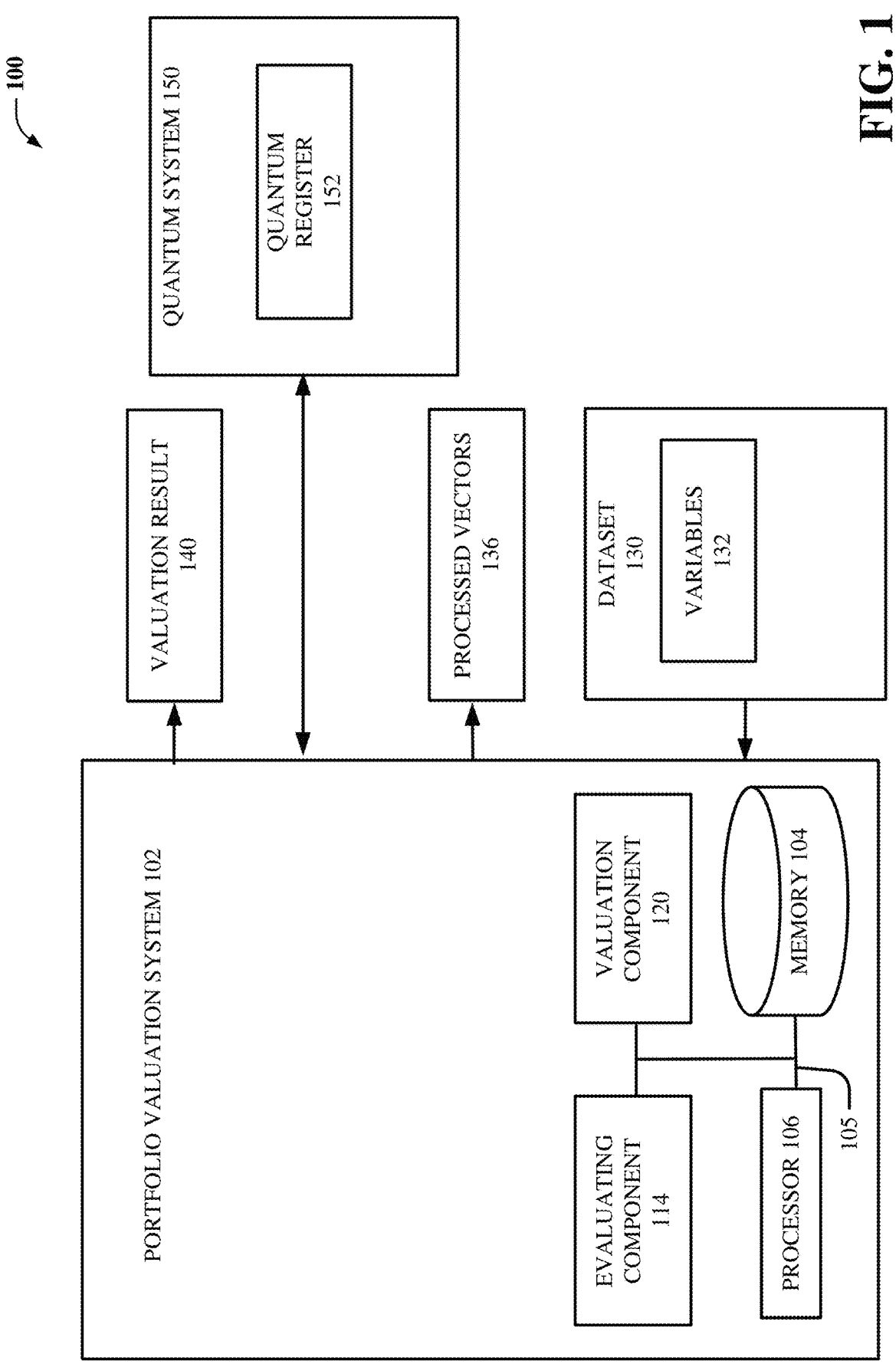
FIG. 1 illustrates a block diagram of an example, non-limiting system that can facilitate portfolio valuation, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Risk management problems, such as in the fields of finance, energy and/or data storage, can involve use of complex mathematical techniques to calculate availability, supply, demand and contract pricing. In such fields, a customer can pay a fixed price or can pay according to a fixed formula. In various cases, customers can be part of customer groups which can further complicate variables that are associated with these customers. Supply, demand and excess volumes can affect pricing, along with political pressures, economic pressures, weather patterns and/or social patterns. These factors, whether one or more in a simple or complex aggregate, can lead to various risks for a provider of a product and/or service, particularly where pricing, pricing formulas and/or contracts account for provision over a time range, as opposed to instantaneous provision.

For example, looking to the energy industry as but one example, and particularly to the gas industry, gas demands of domestic buildings, businesses and/or other structures be conventionally described by a deterministic dependency of gas volumes and weather variables, typically temperature, among other variables. Contracts for private, commercial and/or industrial customers can entail full-supply gas delivery, without volume constraints. For example, a customer can pay a fixed price, for consumption, where a supplier can take a risk of volume derivations from a projected load profile of the customer. In one example, on cold days the gas demand can be higher than expected, therefore in order to meet the demand, a supplier can be pushed to buy extra gas on a day-ahead market, such as at prices that are higher than those contracted with the customer. Alternatively, a fixed formula can be employed relative to volume demanded. In addition, excess volumes can be sold by the supplier for lower prices in order to balance an economic position when temperatures are higher than expected. These variances can lead to costs and risks for a supplier that can be somewhat managed with temperature-based weather derivatives or with cross-commodity temperature derivative contracts.

That is, product and/or service provision, such as contracts for such provision, can comprise complex evaluations, considerations and/or dynamic variables. Relative to the gas provision example mentioned above, risk and complexity of evaluation can scale with the number of geographical locations in which temperature time series are measured, type (e.g., buy, sell, fixed price and/or variable price) and number of contracts in a portfolio, time horizon of the risk evaluation (e.g., the length of the period being assessed for risk, referred to herein as the selected time range), and/or number of weather and price scenarios considered. Risk managers can thus perform risk analysis and look to compute a fair value and statistics of an entire weather-related portfolio and contracts comprised by the portfolio. To this end, a join stochastic model for the gas prices and temperatures can be defined up front and can rely on extensive and time-consuming Monte Carlo simulations, or other simulations, to estimate fair value and other risk measures related to the sample statistics.

However, while classical models and approaches employing classical computation are existingly available, the high time cost and accuracy reduction associated with consideration of multiple markets and various weather environments in a single portfolio can be burdensome if not wholly impractical with existing valuation determination approaches.

To account for these one or more deficiencies, one or more embodiments described herein as one or more systems, methods and/or computer program products can provide for a quantum speedup in the calculation of portfolio valuations. These one or more embodiments can be applicable to finance, energy, risk management and/or other industries, although various cases of gas supply in the energy industry are utilized as exemplary models herein. Regardless of the particular use, the one or more embodiments described herein can provide for real-time planning, finer risk diversification, high accuracy, lower inherent error and faster re-negotiation than existing frameworks for portfolio valuation. The one or more embodiments also can allow for increased (e.g., more frequent) risk assessments due to the speedup inherent in the one or more embodiments described herein, as compared to existing approaches.

Further, in one or more cases, the one or more embodiments described herein can apply beyond portfolio evaluation to other valuations and/or estimations, such as, but not at all limited to, mineral deposit estimation, production estimates, epidemiology spread rates and/or social influence valuation.

Turning now to the one or more embodiments generally, a quantum speedup in the calculation of valuations, such as portfolio values, can be executed by applying new techniques to quantum computing, as described herein. These techniques can be applied to at least a pair of challenges. First, estimation of a non-linear function is needed, for which polynomial approximation and a quantum Hadamard product (QHP) can be employed, as described below in detail. Second, a computation time of portfolio valuation on a classical computer is already linear, and thus improvement can be connected to an ability to load data efficiently at a quantum computer.

More particularly, a framework described herein can provide a hybrid quantum solution based at least on polynomial approximation. The framework can achieve an asymptotic quantum speedup for polynomials of second degree, if efficient loading unitaries are available for the input data sets.

In connection with the framework, but also applicable outside of the framework to a variety of fields, a unique encoding method can be employed by the one or more embodiments described herein, which encoding method can allow for balancing between quantum circuit depth and quantum circuit width while also allowing for use of a resulting quantum circuit with a variety of quantum operations, including the swap test.

Also in connection with the framework, and also applicable outside of the framework to a variety of fields, a unique reduction method can be employed by the one or more embodiments described herein, which reduction method can allow non-linear transformation while reducing an average quantum circuit depth of a QHP using dynamic circuit capabilities such as dynamic stopping to abort execution of a quantum circuit where the circuit output for a shot (e.g., a single execution of the quantum circuit) can be reconstructed absent continuing with the shot, thus saving execution time and limiting error propagation. This method also will be described below in detail.

Put another way, one or more embodiments described herein can provide for data encoding and loading of a quantum register based on a result of the encoding. The encoding can be performed employing at least a pair of vectors indexed over one or more relevant dimensions, such as time range and/or the multiple contracts in a same portfolio. The vectors can be based on a set of variables indexed over one or more of the selected dimensions and can correspond to conditions (e.g., variables) defining a numerical quantity (such as total economic value) relative to a collection of objects (such as a portfolio of contracts) for provision of an aspect (e.g., temperature and price can define provision of gas). The variables can be indexed over the one or more selected dimensions.

The encoding further can employ a classical tree data structure for angles. Generally, this data structure can be employed to normalize the vectors being real vectors (e.g., unnormalized vectors), where the resultant vectors can be loaded to a quantum register. Non-linear transformation, e.g., comprising power calculation, can be performed employing quantum calculation on a quantum system, using the loaded quantum register, thereby allowing for further processing of the one or more of the vectors (e.g., of one or more of the variables). An inner product of a set of processing functions based at least on the processed one or more vectors can be estimated, such as using a quantum circuit implementation of a quantum Hadamard product at the quantum register.

That is, a value function for a portfolio can be defined as a function of an estimated inner product of a set of processing functions, wherein the processing functions are each based on a variable of the set of variables. At least of the processing functions can be based on the one or more processed vectors. For example, in the gas provision portfolio, the value function can be represented by an inner product of a processing function based on a variable of temperature (e.g., outside temperature where gas is to be provided) and a processing function based on a variable of energy price (e.g., unitary price), with the value function being approximated to thereby output a valuation amount representing provision of the aspect (e.g., gas) over the selected dimension (e.g., time range).

The processing functions employed can comprise volume functions and/or identity functions. An exemplary volume function can be based on a variable of temperature in the ongoing gas provision example, with the volume function being polynomially approximated. An exemplary identity function can take into account inputs and return prices in output. An estimated inner product can be an inner product of such volume function and identity function.

One or more embodiments are now described with reference to the drawings, where like referenced numerals are used to refer to like elements throughout. As used herein, the terms "entity", "requesting entity" and "user entity" can refer to a machine, device, component, hardware, software, smart device and/or human. In the following description, for purposes of explanation, numerous specific details are set forth in order to provide a more thorough understanding of the one or more embodiments. It is evident, however, in various cases, that the one or more embodiments can be practiced without these specific details.

Figure 2:
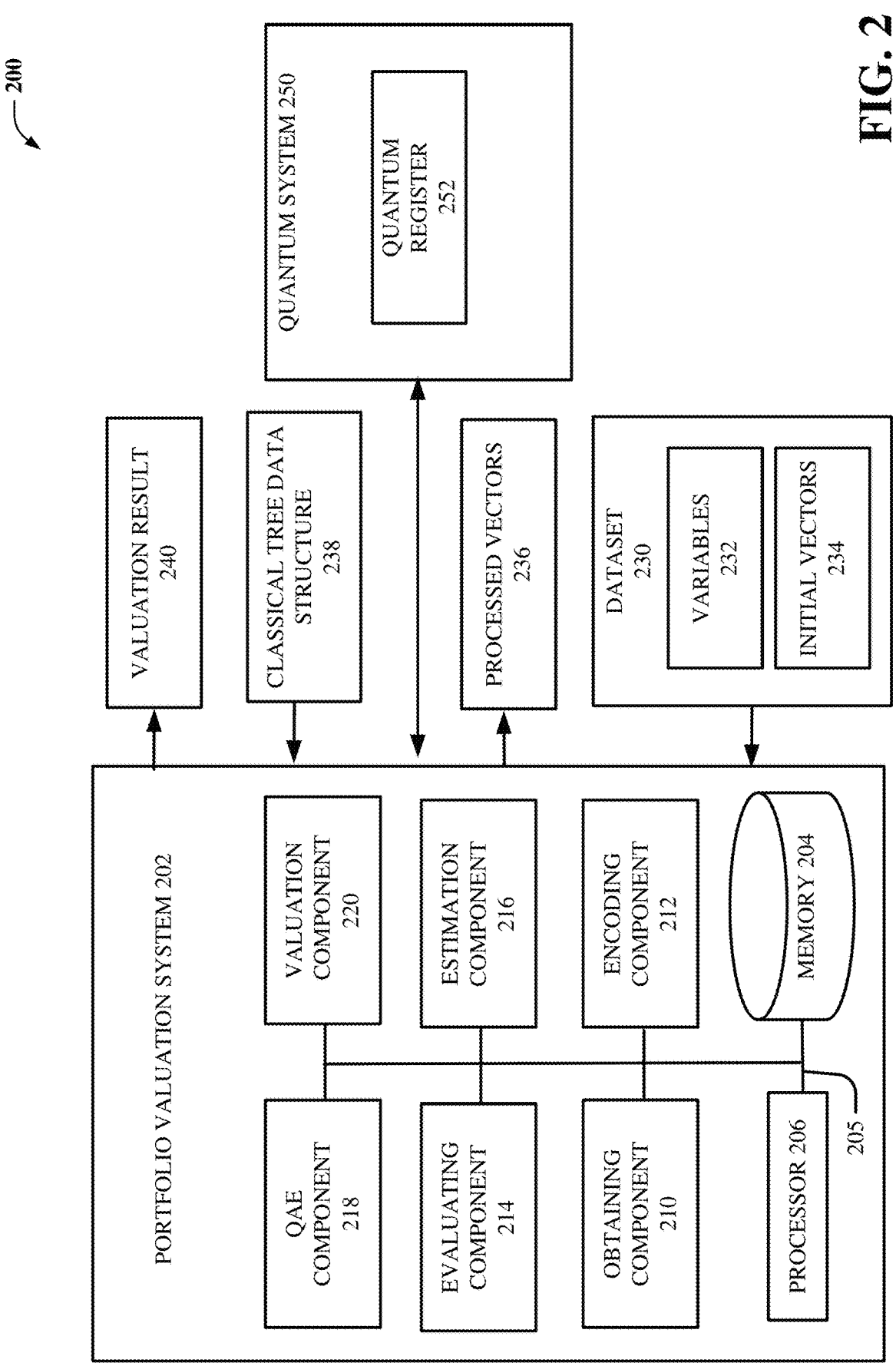
FIG. 2 illustrates a block diagram of another example, non-limiting system that can facilitate portfolio valuation, in accordance with one or more embodiments described herein.
Figure 5:
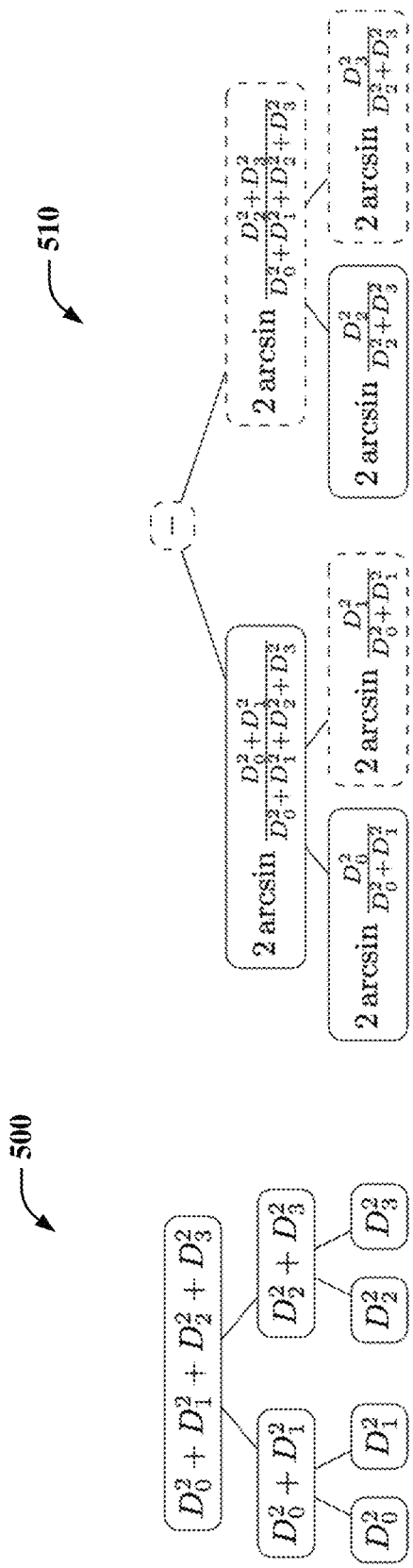
FIG. 5 depicts a schematic diagram of a pair of classical binary tree representations of a dataset, the data of which can be employed by the non-limiting system of FIG. 2, in accordance with one or more embodiments described herein.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100, 200 and/or 400 as illustrated at FIGS. 1, 2 and 5, and/or systems thereof, can further comprise, be associated with and/or be coupled to one or more computer and/or computing-based elements described herein with reference to an operating environment, such as the operating environment 1400 illustrated at FIG. 14. In one or more described embodiments, computer and/or computing-based elements can be used in connection with implementing one or more of the systems, devices, components and/or computer-implemented operations shown and/or described in connection with FIGS. 1, 2 and/or 5 and/or with other figures described herein.

Discussion turns first generally to a road map relative to both of FIGS. 1 and 2. As but one example, again related to the energy and gas industry, but applicable to various other industries such as by employing different variables, a volume of an aspect, such as gas to be consumed, can be described by a function at least a pair of variables, such as temperature and price. $\vec{T}=(T_0, \ldots, T_j, \ldots T_{N-1})$ can represent a first time series vector, here a temperature time series, and $\vec{E}=(E_0, \ldots, E_j, \ldots E_{N-1})$ can represent a second time series vector, here a gas price time series. It is these vectors that can be normalized employing a data encoding method described herein, For example, single, realizations of variables of temperature and prices can be represented as suitably encoded and normalized quantum states, with the transformation following a scheme of: $\vec{T}$, $\vec{E} \rightarrow$(normalization)$\rightarrow \vec{T}$, $\vec{E}= \ldots \rightarrow$(encoding)$\rightarrow |\vec{T}\rangle = \ldots ; |\vec{E}\rangle = \ldots$ .

Thereafter, these normalized and encoded vectors can be processed employing non-linear transformation and power calculation by quantum computation to output one or more processed vectors. For example, after encoding temperature values, volumes (m^3 of gas needed to be purchased based on the assumed outdoor temperatures T) can then be computed directly on the quantum register, by using a polynomial approximation of degree K of $f(T)$ and applying the quantum Hadamard product (QHP), where $f(T)$ is an element-wise function, such as a volume function for gas based on these processes.

Thereafter, portfolio values can be estimated using the volume function and an identity function based on unitary gas prices to estimate one or more inner products between quantum states such as using a swap test for estimation of the inner product, where an inner product can be represented as $\langle f(T), E \rangle$.

A value function can be estimated where the value function is a function of the inner product of the volume function and the identity function, with the value function being approximated to thereby output a valuation amount representing provision of the aspect (e.g., gas) over the time range. In a practical resolution of the problem, multiple inner products can be calculated in connection with the approximation of a respective value function.

For example, relative to a first variable of external temperature T, an instantaneous provision amount, such as instantaneous gas volume, can be given by the volume function (being a first processing function) of Equation 1, where A, B, C, D and $T_0$ are constants.

$$V_j = f(T_j) = \frac{A}{1 + \left(\frac{B}{T_j - T_0}\right)^C} + D. \qquad \text{Equation 1}$$

Further, an identity function (being a second processing function) can be calculated representing unitary prices for the aspect, here being provision (e.g., sale) of gas.

A valuation, such as a portfolio value, can then be computed as a function of an inner product of at least a pair of processing functions, such as the exemplary volume function and the exemplary identity function. Representatively, these pair of processing functions can be based on a pair of processed vectors, with a first processed vector being a processed first time series vector and a second processed vector being a processed second time series vector. For each vector, the phrase "time series" represents the indexing of the respective vector of the selected dimension, being time in the exemplary gas provision example. The processing of the first time series vector (e.g., the exemplary volume-based time series vector), as will be described below, can comprise non-linear transformation and calculation of corresponding powers. The processing of the second time series vector (e.g., the exemplary unitary price-based time series vector), as will be described below, can comprise use of account inputs to derive the unitary prices. As a result, for the ongoing gas provision example, Equation 2 represents the value function. Equation 3 represents a generalized value function for an estimation of portfolio values. In both of Equation 2 and Equation 3, $f$ is the exemplary volume function and j is an index (e.g., a ranging) on the slices of the selected dimensions (e.g., time slices of the time range).

$$v = \sum_j E_j V_j = \sum_j E_j f(T_j), \text{ and} \qquad \text{Equation 2}$$

$$v = \sum_j X_{1,j} X_{2,j} \ldots X_{M,j}. \qquad \text{Equation 3}$$

Portfolio Valuation Embodiments

Turning now to FIG. 1, one or more embodiments described herein can include one or more devices, systems and/or apparatuses that can facilitate portfolio valuation, in accordance with one or more embodiments described herein. While referring here to one or more processes, facilitations and/or uses of the non-limiting system 100, description provided herein, both above and below, also can be relevant to one or more other non-limiting systems described herein, such as the non-limiting system 200, to be described below in detail.

As illustrated at FIG. 1, the non-limiting system 100 can comprise a portfolio valuation system 102. Portfolio valuation system 102 can comprise one or more components, such as a memory 104, processor 106, bus 105, evaluating component 114 and/or valuation component 120. Generally, portfolio valuation system 102 can facilitate estimation of valuation of a portfolio for provision of an aspect (e.g., service and/or product), comprising one or more contracts, based on a set of variables 132 defining the provision of the aspect. An output can be a valuation result 140 based on a set of processed vectors 136 which are vectors defined by the variables 132, indexed over one or more selected dimensions, such as time, and having been processed.

In the ongoing example, the evaluating component 114 can generally employ a quantum register 152 to output a processed vector 136 based on a first variable, set of variables 132 indexed over a selected dimension, such as a time range. The time range can be a length of time over which the aspect is to be provided, such as via contract, request, agreement or otherwise. The quantum register 152 can be comprised by a quantum system 150 and can comprise a quantum logic circuit having a plurality of qubits.

The valuation component 120 can, in response to output of the processed vector 136 by the evaluating component 114, approximate a value function and, based on the approximation, can output a valuation amount representing provision of an aspect over the time range. The set of variables 132, of a dataset 130, can correspond to conditions defining the provision of the aspect. The value function is a function of an inner product of a set of processing functions that are based on the set of variables 132, including the first variable. A first processing function of the set of processing functions and of the inner product is based on at least the processed vector 136. It is noted that multiple iterations of the processes performed by the evaluating component 114 can be performed, resulting in a plurality of processed vectors 136 being output. These multiple processed vectors 136 can be aggregated for subsequent use by the valuation component 120.

The evaluating component 114 and/or valuation component 120 can employ any suitable method of communication, by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

One or more aspects of a component (e.g., the evaluating component 114 and/or the valuation component 120) can be employed separately and/or in combination, such as employing one or more of a memory or a processor of a system that includes the components to thereby facilitate output of a valuation result 140. That is, these components can employ the processor 106 and/or the memory 104. Additionally and/or alternatively, the processor 106 can execute one or more program instructions to cause the processor 106 to perform one or more operations by these components.

Turning next to FIG. 2, the figure illustrates a diagram of an example, non-limiting system 200 that can facilitate portfolio valuation, in accordance with one or more embodiments described herein. Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

As illustrated, the non-limiting system 200 can comprise a portfolio valuation system 202. Generally, portfolio valuation system 202 can facilitate estimation of valuation of a portfolio for provision of an aspect (e.g., service and/or product), comprising one or more contracts, based on a set of variables 232 defining the provision of the aspect. As but one example, the aspect can be provision of gas, and the variables 232, comprised by the dataset 230, can comprise outdoor temperature where gas is to be provided and gas prices, both of which can fluctuate dynamically. An output can be a valuation result 240 based on processed vectors 136 which are vectors defined by the variables 232, indexed over a selected dimension of time and having been processed.

The portfolio valuation system 202, as illustrated, can comprise any suitable type of component, machine, device, facility, apparatus and/or instrument that comprises a processor and/or can be capable of effective and/or operative communication with a wired and/or wireless network. All such embodiments are envisioned. For example, portfolio valuation system 202 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the portfolio valuation system 202 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. The portfolio valuation system 202 can be associated with, such as accessible via, a cloud computing environment.

The portfolio valuation system 202 can comprise a plurality of components. The components can include a memory 204, processor 206, bus 205, obtaining component 210, encoding component 212, evaluating component 214, estimation component 216, quantum amplitude estimation (QAE) component 218 and/or valuation component 220.

Like the portfolio valuation system 102, the portfolio valuation system 202 can be operated to facilitate a process for portfolio valuation.

One or more communications between one or more components of the non-limiting system 200, and/or between an external system, either comprising and/or facilitating access to any one or more of a database, log and/or dataset 230, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 206, memory 204 and bus 205 of the portfolio valuation system 202.

For example, in one or more embodiments, portfolio valuation system 202 can comprise a processor 206 (e.g., computer processing unit, microprocessor, classical processor, quantum processor and/or like processor). In one or more embodiments, a component associated with portfolio valuation system 202, as described herein with or without reference to the one or more figures of the one or more embodiments, can comprise one or more computer and/or machine readable, writable and/or executable components and/or instructions that can be executed by processor 206 to facilitate performance of one or more processes defined by such component(s) and/or instruction(s). In one or more embodiments, the processor 206 can comprise the obtaining component 210, encoding component 212, evaluating component 214, estimation component 216, quantum amplitude estimation (QAE) component 218 and/or valuation component 220.

In one or more embodiments, the portfolio valuation system 202 can comprise a computer-readable memory 204 that can be operably connected to the processor 206. The memory 204 can store computer-executable instructions that, upon execution by the processor 206, can cause the processor 206 and/or one or more other components of the portfolio valuation system 202 (e.g., obtaining component 210, encoding component 212, evaluating component 214, estimation component 216, quantum amplitude estimation (QAE) component 218 and/or valuation component 220) to perform one or more actions. In one or more embodiments, the memory 204 can store computer-executable components (e.g., obtaining component 210, encoding component 212, evaluating component 214, estimation component 216, quantum amplitude estimation (QAE) component 218 and/or valuation component 220).

Portfolio valuation system 202 and/or a component thereof as described herein, can be communicatively, electrically, operatively, optically and/or otherwise coupled to one another via a bus 205 to perform functions of non-limiting system 200, portfolio valuation system 202 and/or one or more components thereof and/or coupled therewith. Bus 205 can comprise one or more of a memory bus, memory controller, peripheral bus, external bus, local bus, quantum bus and/or another type of bus that can employ one or more bus architectures. One or more of these examples of bus 205 can be employed to implement one or more embodiments described herein.

In one or more embodiments, portfolio valuation system 202 can be coupled (e.g., communicatively, electrically, operatively, optically and/or like function) to one or more external systems, such as a quantum system 250, sources and/or devices (e.g., classical and/or quantum computing devices, communication devices and/or like devices), such as via a network. In one or more embodiments, one or more of the components of the non-limiting system 200 can reside in the cloud, and/or can reside locally in a local computing environment (e.g., at a specified location(s)).

In addition to the processor 206 and/or memory 204 described above, portfolio valuation system 202 can comprise one or more computer and/or machine readable, writable and/or executable components and/or instructions that, when executed by processor 206, can facilitate performance of one or more operations defined by such component(s) and/or instruction(s).

Figure 3:
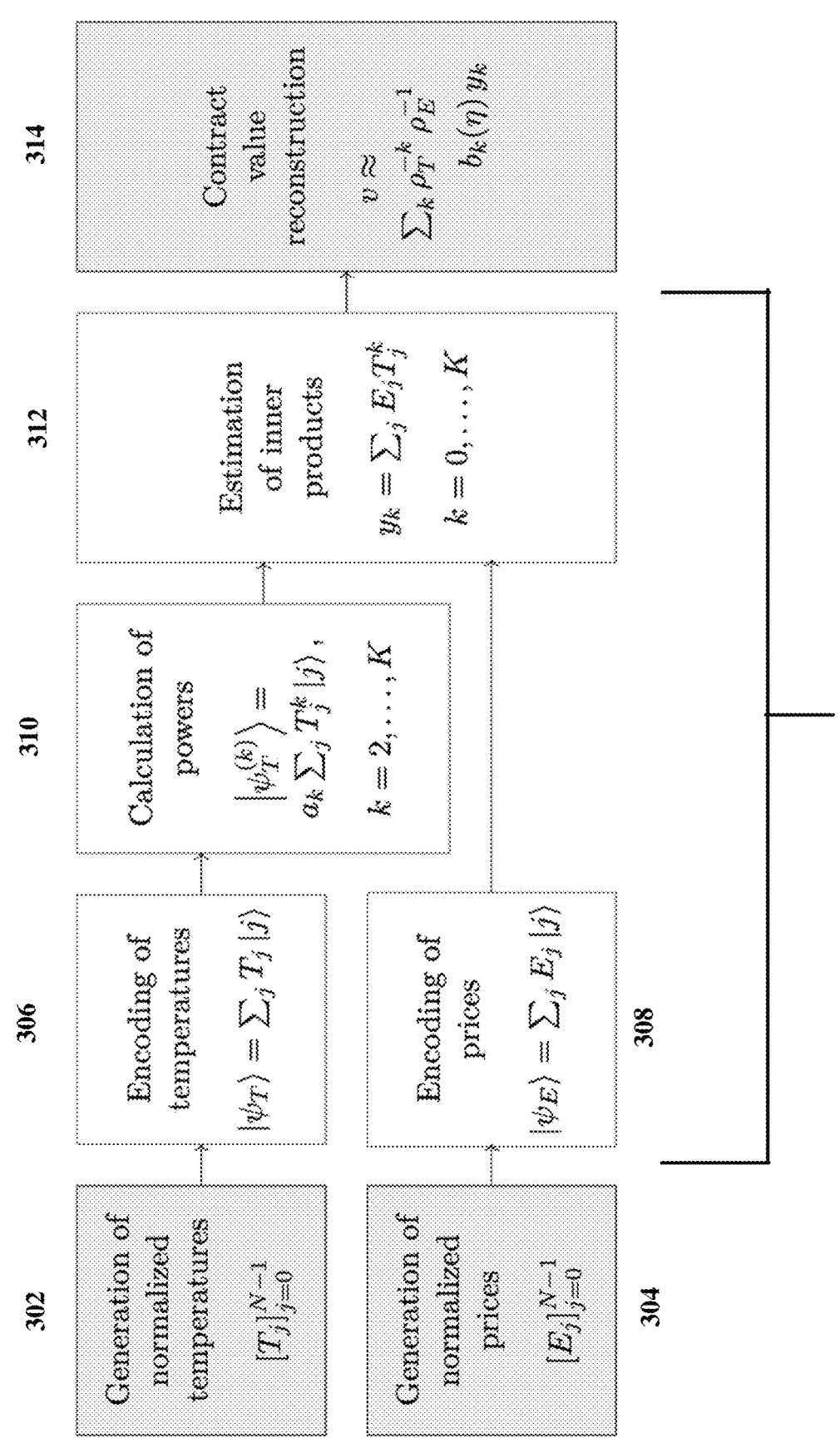
FIG. 3 illustrates a high-level schematic diagram of a set of processes that can be performed by the non-limiting system of FIG. 2 to facilitate portfolio valuation, in accordance with one or more embodiments described herein.

Turning now to FIG. 3, in addition to still referring to FIG. 2, individual components of the portfolio valuation system 202 will be further detailed. As illustrated, the processes that can be performed by the portfolio valuation system 202 that can allow for output of the valuation result 240 can be represented by schematic process flow 300. As illustrated, schematic process flow 300 can comprise generation of normalized vectors at 302 and 304 (e.g., by the obtaining component 210), encoding of the vectors at 306 and 308 (e.g., by the encoding component 212), non-linear transformation of one or more of the vectors at 310 (e.g., by the evaluating component 214), estimation of one or more inner products of the vectors at 312 (e.g., by the estimation component 216), and portfolio value approximation at 314 (e.g., by the valuation component 220). Also as illustrated at FIG. 3, various of the processes, such as one or more of the encoding of the vectors at 306 and 308, non-linear transformation of one or more of the vectors at 310 and/or estimation of one or more inner products of the vectors at 312 can be executed using a quantum amplitude estimation (QAE) method 320 (e.g., employing the QAE component 218 and a quantum system). It is noted that various of these same processes can be performed employed a quantum system, but separate from a QAE method 320.

Referring now to the obtaining component 210, and to FIGS. 2 and 3, the obtaining component 210 generally can determine, find, locate, download, receive and/or otherwise obtain information of the dataset 230 and/or access to the dataset 230. Based on data of the dataset 230, which can define one or more variables 232, the obtaining component 210 can construct a set of initial vectors. For example, a set of variables 232 can comprise temperature (e.g., outside temperature at one or more locations at which an aspect of gas is to be provided according to a corresponding portfolio) and price (e.g., per a given volume of gas). In one or more embodiments, temperature can be considered a dynamic variable that dynamically changes over a time range over which the aspect (e.g., gas) is to be provided. For example, the higher the temperature, the lower can be the demand for gas and vice versa. Price can be considered a fixed variable that is fixed per unit of time of the time range. In one or more other embodiments, price can be considered as a dynamic variable that is affected by other conditions, such as economic conditions, political conditions, market conditions and/or the like.

For example, the obtaining component 210 can generate a set of real, unnormalized vectors for the variables of temperature and price as $\vec{T}$, $\vec{E}$, such as through use of correlated Markov chains. The set of initial vectors can be classically generated as $[T'_j]_{j=0}^{N-1}$, and $[E'_j]_{j=0}^{N-1}$ indexed over time, where N is the size of said vectors, $j=0, \ldots, N-1$ represents an index over time, and j is an index (e.g., a ranging) on the slices of the selected dimensions (e.g., time slices of the time range).

In one or more embodiments, the obtaining component 210 can normalize the initial vectors, outputting a set of normalized vectors to be further processed. For example, the initial vectors can be normalized into normalized versions $[T_j]_{j=0}^{N-1}$ and $[E_j]_{j=0}^{N-1}$ indexed over time through affinities represented by Equation 4, where n is an appropriate translation term for temperature to guarantee $T_j>0$ for all j at least in probability, and $\rho_T$ and $\rho_E$ are scale factors of Equations 5 and 6.

$$\begin{cases} T_j = \rho_T(T'_j - \eta), \\ E_j = \rho_E E''_j. \end{cases} \quad \text{Equation 4}$$

$$\rho_T^{-2} = \left| \sum_{j=0}^{N-1} (T'_j - \eta)^2 \right., \quad \text{Equation 5}$$

and $$\rho_E^{-2} = \sum_{j=0}^{N-1} (E'_j)^2. \quad \text{Equation 6}$$

Turning next to the encoding component 212, and still to FIGS. 2 and 3, generally the encoding component 212 can generate and employ a quantum circuit that can encode the dataset 230 into a quantum register in the form of one or more corresponding quantum states. That is, the encoding component 212 of the classical portfolio valuation system can encode the normalized vectors, indexed over time, into the quantum register 252 (e.g., at steps 306 and 308 of schematic process flow 300 of FIG. 3), such a via use of one or more quantum job requests 424 to direct the loading at the quantum system 401 by the quantum operation component 403 of the quantum system 401. These normalized vectors can be encoded separately (e.g., vectors corresponding to one variable being encoded separately from vectors corresponding to another variable).

A purpose of the encoding can be to allow for additional processing of at least one of the set of normalized vectors (e.g., non-linear transformation at step 310 of FIG. 3) and use of the full set of encoded and/or processed vectors (e.g., resulting from steps 310 and 308 of FIG. 3) for estimating one or more inner products of the encoded/processed vectors (e.g., at step 312 of FIG. 3). Here, the term "processed vector" is used to refer to a vector that is encoded and/or encoded and further processed. That is, in the ongoing example of gas provision, normalized vectors for both temperature and price, indexed over time, can be encoded to a quantum register, such as the quantum register of the quantum system 401.

Figure 4:
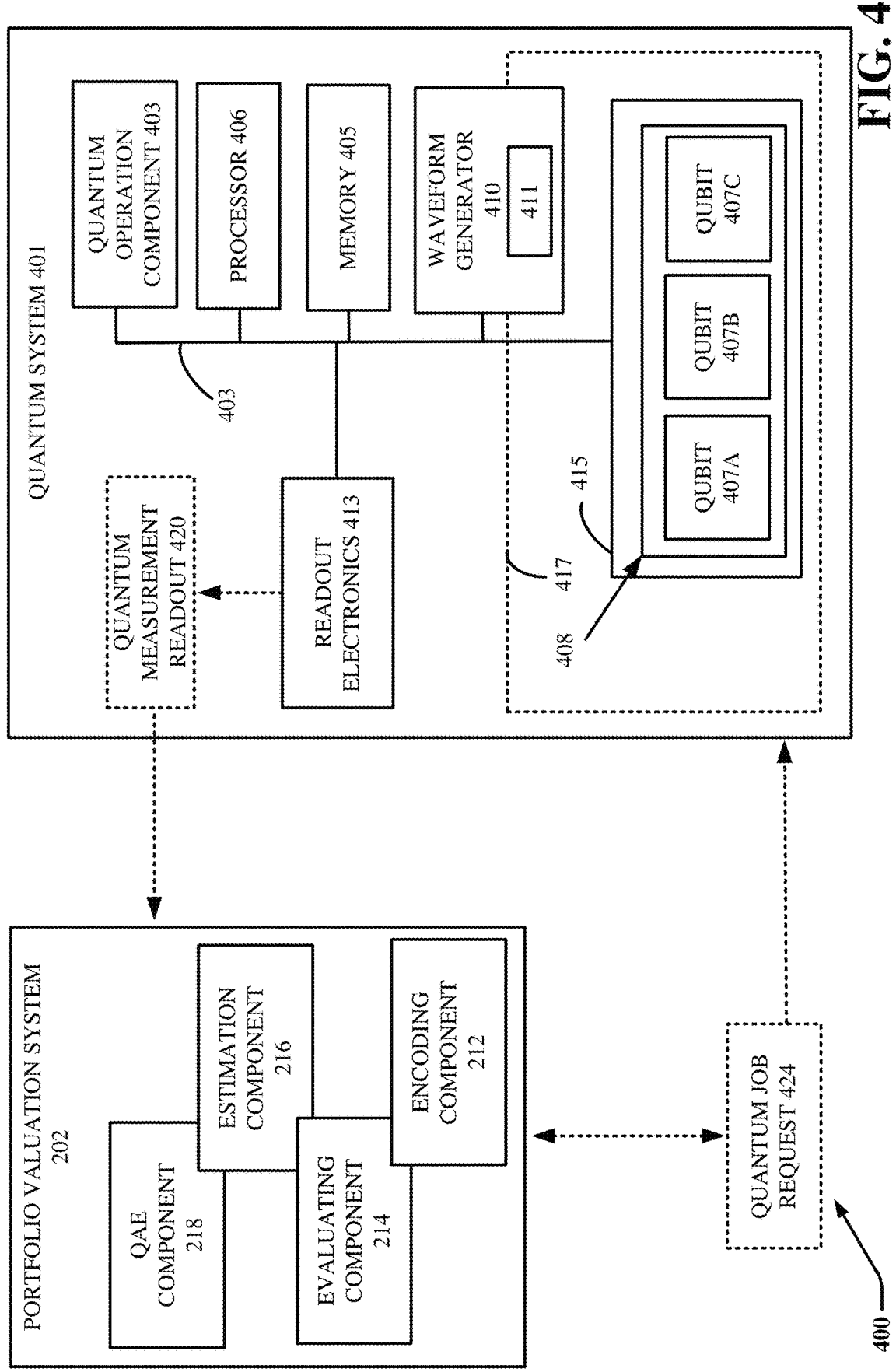
FIG. 4 depicts a block diagram of an example, non-limiting system comprising the valuation system of FIG. 2 in combination with a quantum system, in accordance with one or more embodiments described herein.

That is prior to further description regarding encoding options, direction first turns to FIG. 4 and to a description of a non-limiting system 400 comprising the portfolio valuation system 202 and a quantum system 401 that can be interchangeable with the quantum system 250. The quantum system 401 can be employed by the portfolio valuation system 202 to perform one or more operations, thus allowing for quantum speedup of a portfolio valuation as compared to existing frameworks. As will be detailed relative to FIGS. 6 to 9, a quantum system can be employed for various processes of data encoding, non-linear transformation of vectors and inner product estimation. In one or more embodiments, versions of these processes can be fed to the quantum system using a quantum amplitude estimation (QAE) technique. Data and instructions for one or more of these processes can be sent to the quantum system 401 as a quantum job request 524. Specific detail regarding use of the quantum system 401 for execution of these processes is provided below, again relative to FIGS. 6 to 9.

First, however, description of the non-limiting system 400 and quantum system 401 is provided. In one or more embodiments, the non-limiting system 400 can be a hybrid system and thus can include both a quantum system and a classical system, such as the quantum system 401 and a classical-based system (also herein referred to as a classical system, such as the portfolio valuation system 202). In one or more embodiments, one or more components of the classical system can be at least partially comprised by the quantum system 401, or otherwise comprised external to the classical system. In one or more embodiments, the portfolio valuation system 202 and/or one or more components thereof can be comprised by the quantum system 401. In one or more embodiments, one or more components of the quantum system 401, such as the readout electronics 413, can be at least partially comprised by a classical system, or otherwise disposed external to the quantum system 401.

One or more communications between one or more components of the non-limiting system 400 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The portfolio valuation system 202 and/or the quantum system 401 can be associated with, such as accessible via, a cloud computing environment. For example, the portfolio valuation system 202 can be associated with a cloud computing environment such that aspects of classical processing can be distributed between the portfolio valuation system 202 and the cloud computing environment.

Turning now to the quantum system 401, generally based on a quantum job request 424, such as comprising a quantum circuit to be executed, the quantum operation component 403 can direct execution of the quantum circuit using the quantum processor 408. In one or more embodiments, a component of the portfolio valuation system 202 can output the quantum job request 424, such as to direct execution of the translated quantum source code 240, comprised by the quantum job request 424, at the quantum system 401.

Generally, the quantum system 401 (e.g., quantum computer system, superconducting quantum computer system and/or the like) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement readout 420, can be responsive to the quantum job request 424 and associated input data and can be based at least in part on the input data, quantum functions and/or quantum computations.

In one or more embodiments, the quantum system 401 can comprise components, such as a quantum operation component 403, processor 406, memory 405, bus 403, a quantum processor 408, pulse component (e.g., a waveform generator 410) and/or the readout electronics 413. The quantum processor 408 can comprise one or more, such as plural, qubits 407. Individual qubits 407A, 407B and 407C, for example, can be fixed frequency and/or single junction qubits, such as transmon qubits.

As used herein, a quantum circuit can be a set of operations, such as gates, performed on a set of real-world physical qubits with a purpose of obtaining one or more qubit measurements. A quantum processor (e.g., quantum processor 408) can comprise the one or more real-world physical qubits.

The quantum operation component 403 can obtain (e.g., download, receive, search for and/or otherwise obtain) a quantum job request 424 requesting execution of one or more quantum programs and/or a physical qubit layout. The quantum job request 424 can be provided in any suitable format, such as a text format, binary format and/or another suitable format.

The quantum operation component 403 can determine one or more quantum logic circuits for executing a quantum program. In one or more embodiments, the quantum operation component 403 can direct the waveform generator 410 to generate one or more pulses 411, tones, waveforms and/or the like to affect one or more qubits 407. It is appreciated that any suitable number of qubits coupled to and mapped to one another in any suitable way can be employed.

That is, operation of the quantum circuit can be supported, such as by a pulse component (also herein referred to as a waveform generator), to produce one or more physical pulses and/or other waveforms, signals and/or frequencies to alter one or more states of one or more of the physical qubits. The altered states can be measured, thus allowing for one or more computations to be performed regarding the qubits and/or the respective altered states.

The waveform generator 410 can generally perform one or more quantum processes, calculations and/or measurements for shifting the frequency of one or more qubits 407, such as when in respective excited states. For example, the waveform generator 410 can operate one or more qubit effectors, such as qubit oscillators, harmonic oscillators, pulse generators and/or the like to cause one or more pulses to stimulate and/or manipulate the state(s) of the one or more qubits 407 comprised by the quantum system 401.

The quantum processor 408 and a portion or all of the waveform generator 410 can be contained in a cryogenic environment, such as generated by a cryogenic chamber 417, such as a dilution refrigerator. Indeed, a signal can be generated by the waveform generator 410 to affect one or more of the plurality of qubits 407. Where the plurality of qubits 407 are superconducting qubits, cryogenic temperatures, such as about 4 Kelvin (K) or lower can be employed for function of these physical qubits. Accordingly, one or more elements of the readout electronics 413 also can be constructed to perform at such cryogenic temperatures.

The readout electronics 413, or at least a portion thereof, can be contained in the cryogenic chamber 417, such as for reading a state, frequency and/or other characteristic of qubit, excited, decaying or otherwise.

Referring now again to the encoding that can be performed by the encoding component 212, in combination with the quantum system 401 (e.g., through directing of the quantum system 401 using one or more quantum job requests 424), in one or more embodiments, amplitude encoding can be employed by expressing that the wavefunction y of a quantum circuit defining its measurement probabilities can be used to encode data. That is, it can be implied that amplitudes of a quantum system can be used to represent data values. In the amplitude encoding, a normalized classical vector [Dj] of linear size N can be represented as Equation 7.

$$|\psi_D\rangle := \sum_{j=0}^{N-1} D_j |j\rangle, \qquad \text{Equation 7}$$

where $\{|j\rangle\}$ are computational basis states of $\log_2 N$ qubits, wherein the logarithm is in base 2 and N is the number of data points.

While amplitude encoding can offer an effective use of memory resources, the exact preparation of an arbitrary state $|\psi_D\rangle$ of the form shown in Equation 7 requires O(N) operations in the worst case, wherein O denotes the big-O notation and N is the number of data points. This can jeopardize benefits of many quantum algorithms. In practice, amplitude encoding remains attractive in combination with approximate data loading techniques (e.g., qGANs), in the presence of specific data structures, or under standard quantum memory assumptions.

In one or more other embodiments, a bidirectional-orthogonal encoding (also herein referred to as bidir-orth encoding) can be employed.

This bidir-orth encoding is so-named because on one side, it can build upon existing bidirectional encoding, and on the other side, it can guarantee that side registers are orthogonal, thus enabling subsequent processing through swap tests. Generally, bidir-orth encoding can allow for balancing memory and time resources, or, put another way, quantum circuit width and quantum circuit depth. The bidir-orth encoding can comprise employing a set of initial vectors, representing the data set, indexed over time and having been normalized, and then determining a balance between depth of the quantum circuit and width of the quantum circuit to be defined by loading of the quantum register.

That is, one of the main challenges for an efficient data loading for a quantum execution is to optimize trade off between circuit depth and circuit width, while also reducing the complexity in the quantum circuit and the error percentage through the computation procedure. Furthermore, existing procedures, such as existing bidirectional encoding, can provide encoding that is subsequently incompatible with the swap test and other quantum operations.

To account for one or more of these deficiencies of existing encoding techniques, the width/depth balance can be obtained by the bidir-orth encoding technique described herein, and as a result, the encoded result can be compatible with the swap test and other post-encoding quantum operations.

The bidir-orth encoding can be characterized by states of the form of Equation 8.

$$|\psi_D\rangle := \sum_{j=0}^{N-1} D_j |j\rangle |\phi_j^D\rangle. \qquad \text{Equation 8}$$

At Equation 8, the second register is auxiliary, and contains states entangled to the main register, with the orthonormal property. That is, as compared to existing bidirectional encoding procedures, auxiliary states can be modified to be orthonormal (i.e., $\langle \phi_j | \phi_j \rangle = \delta_{i,j}$), such as at the expense of use of an additional side register of a small width $\log_2 N$, thus allowing application of the swap test. Similar to existing bidirectional encoding, the bidir-orth encoding requires classical data to be organized in a binary tree structure (FIG. 5).

For example, turning to FIG. 5, the bidir-orth encoding technique can work under an assumption of availability of a classical tree data structure for angles, and thus can employ a classical binary tree data structure for angles to encode the set of initial vectors. As illustrated at FIG. 5, a pair of classical binary tree structure representations of the dataset D, applicable to the ongoing gas example and to other examples, are illustrated. The tree structure 500 provides a state decomposition representation and the tree structure 510 provides an angle representation. The state decomposition tree structure 500 can be built (e.g., by the encoding component 212 and/or another component in conjunction with the encoding component 212) bottom up starting from a classical array, and also can be applied to unnormalized datasets. The angle representation tree structure 510 can be suited for quantum data loading and can be derived (e.g., by the encoding component 212 and/or another component in conjunction with the encoding component 212) by traveling the state decomposition tree structure 500 top-down. It is noted that for the angle representation tree structure 510, dashed nodes are redundant and can be inferred from their respective sibling.

To achieve the above, the bidir-orth encoding technique (e.g., via the encoding component 212) employs (e.g., at the classical portfolio valuation system 202) a family of encoding techniques parameterized over a split level, s, represented by an integer in $\{1 \ldots, \log_2 N\}$, where, for each respective vector of the set of vectors, N represents a length of the respective vector.

The parameter s can steer the balance between circuit depth and circuit width of a quantum circuit being encoded where:

for s=1, the width is O(N) and the depth is $O(\log^2 2N)$, for $s=\log_2 N$, the width is $O(\log_2 N)$ and the depth is O(N), and for $s=\frac{1}{2} \log_2 N$, a sublinear behavior in both depth $O(\sqrt{N})$ and width $O(\sqrt{N})$ can be achieved.

Put another way, the split level can steer the balance between circuit depth and circuit width: for s=1, the width is O(N) and the depth $O(\log^2 N)$ (depth efficient), while for $s=\log_2 N$ the width is $O(\log_2 N)$ and the depth $O(N)$ (memory efficient, kin to amplitude encoding).

The data loading procedure (e.g., that can be performed by the encoding component 212) is next detailed relative to Equation 9.

The bidir-orth encoding can be represented as Equation 9, for a dataset D, to encode (e.g., by the encoding component 212) the dataset D into quantum states, where the dataset D separately comprises one of the normalized vectors indexed over time. For example, Equation 9 can be executed separately for temperature and for price.

$$|\hat{\psi}_D\rangle := \sum_{j=0}^{N-1} D_j |j\rangle |\hat{\phi}\rangle |j\rangle = \sum_{j=0}^{N-1} D_j |j\rangle |\phi_j\rangle. \quad \text{Equation 9}$$

At Equation 9, $|D_j|$ is a vector of length N, a power of 2, and a classical binary tree representation, such as the angle representation tree structure 510 is available and/or can be generated, such as by the encoding component based on the aforementioned derivation. As mentioned above, s can be any integer in $\{1, \ldots, \log_2 N\}$, called split level. As a result, a state defined by Equation 9 can be constructed in depth of Equation 10 and in width of Equation 11:

$$2^{s+\frac{1}{2}} \left(\log_2^2 N - \log_2 N - s^2 + s\right) + 1 = O\left(2^s + \log_2^2 N - s^2\right), \quad \text{Equation 10}$$

and $$(s+1)N2^{-s} - 1 + \log_2 N = O\left((s+1)N2^{-s}\right). \quad \text{Equation 11}$$

Turning next to the evaluating component 214 and also again briefly to FIG. 3, further processing of at least one of the vectors can be performed using non-linear transformation to calculate powers of the quantum states corresponding to the at least one of the vectors. That is, the evaluating component 214 can output at least one processed vector 236. Briefly, the evaluating component 214 can take as an input a vector (e.g., in the form of a quantum state) and can output a processed vector (e.g., in the form of a processed state). To achieve this result, the evaluating component 214 can employ operation of the quantum system, such as via use of one or more quantum job requests 424 to direct operation of the quantum system 401.

A purpose of these one or more processes can be that the monomial powers calculated can be employed to calculate individual monomials of an approximating polynomial for a volume function (e.g., at step 314) with the quantum system 401. For example, relative to the ongoing gas provision example, the volume function can allow for consideration of the dynamically changing temperature variable indexed over time. The output nonlinear terms reflect that the volume function itself is nonlinear, such as where real-world dynamics of the volume can require nonlinearity to be well-modelled. The volume function can be employed to approximate a value function, and more particularly to estimate an inner product of the value function, allowing for output of the valuation result 240. That is, the value function can indirectly be a function of the volume function (e.g., the estimated inner product being a function of the volume function).

It is noted that, in one or more embodiments, the evaluating component 214 can perform these operations for the one time series but not for all time series, where applicable. For example, the evaluating component 214 can perform these operations for the temperature time series but not for the price time series. In one or more other embodiments, the non-linear transformation processes performed by the evaluating component 214 can be applied to multiple input vectors (e.g., multiple series indexed over selected dimensions for multiple variables).

Generally, a sequence of non-linear transformations can be exploited (e.g., by the evaluating component 214 at the classical portfolio valuation system 202) to calculate the power $T_j^k$ for al $j=0, \ldots, N-1$ and $k=0, \ldots, K$, where N is the size of said vectors, j is an index (e.g., a ranging) on the slices of the selected dimensions (e.g., time slices of the time range), K is the degree of a polynomial that approximates the corresponding function, and k is an index that ranges over the monomials of the polynomial. Relative to the ongoing gas provision example, the evaluating component 214 can employ the normalized vector $[T_j]_{j=0}^{N-1}$ (e.g., (a normalized time series of temperatures) being a vector of real numbers such that $\Sigma_j T_j^2 = 1$. The state at Equation 12 can be produced, however, to evaluate an approximating polynomial related to the volume function for provision of gas based on the temperature variable, where the powers $T_j^k$ are needed in the form of a state represented at Equation 13, for $k=1, \ldots, K$, where ax is an appropriate scale factor represented by Equation 14.

$$|\psi_T\rangle := \sum_{j=0}^{N-1} T_j |j\rangle, \quad \text{Equation 12}$$

$$|\psi_T^{(k)}\rangle := a_k \sum_{j=0}^{N-1} T_j^k |j\rangle, \quad \text{Equation 13}$$

and $$a_k := \left(\sum_j T_j^{2k}\right)^{-1/2}. \quad \text{Equation 14}$$

It is noted that $a_k$ is an increasing finite sequence, when k grows (e.g., $a_k \geq 1 = a_1$).

Therefore, for the calculation of powers, a non-linear transformation of the quantum Hadamard product (QHP) can be employed (e.g., by the evaluating component 214). That is, given two states $|\psi_0\rangle$ and $|\psi_1\rangle$, their respective QHP can be the state represented by Equation 15, where $\odot$ is the QHP.

$$|\psi_0 \odot \psi_1\rangle := a \sum_{j=1}^{N-1} \langle \psi_0 | j \rangle \langle \psi_1 | j \rangle |j\rangle. \quad \text{Equation 15}$$

Further, the QHP can be iterated (e.g., via instruction of the evaluating component 214 to a quantum system) to compute the Hadamard product of multiple vectors, hence producing higher-order powers. For example, states in the form $|\psi_T^{(k)}\rangle$, as defined at Equation 13, can be obtained by loading k copies of $|\psi_T\rangle$ as input states and calculating their QHP's, as represented at Equation 16.

$$|\psi_T^{(k)}\rangle := |\odot^k \psi_T\rangle. \quad \text{Equation 16}$$

Figure 6:
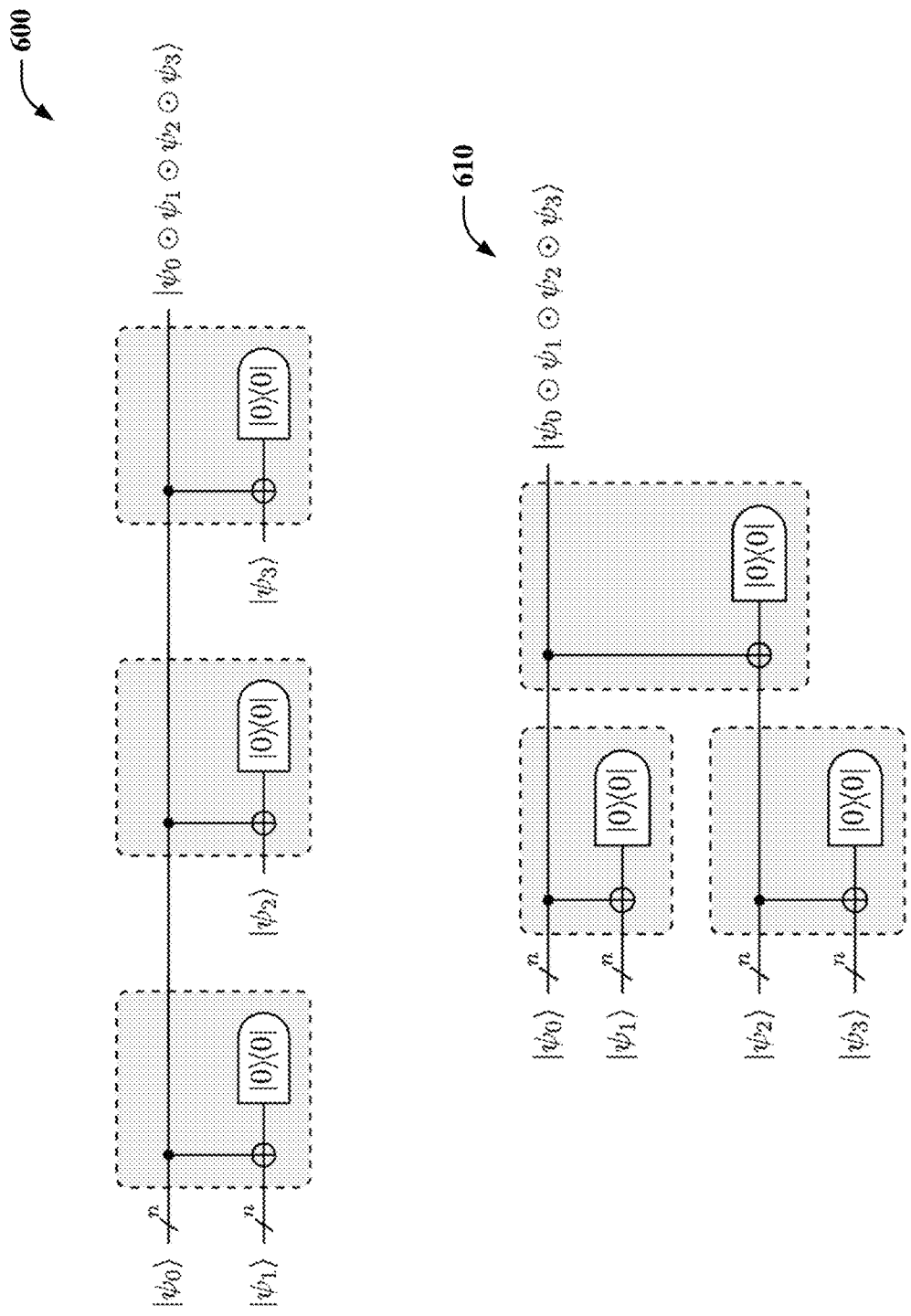
FIG. 6 illustrates a pair of quantum circuit diagrams representing a pair of non-linear transformation processes that can be performed by the non-limiting system of FIG. 2, in accordance with one or more embodiments described herein.
Figure 7:
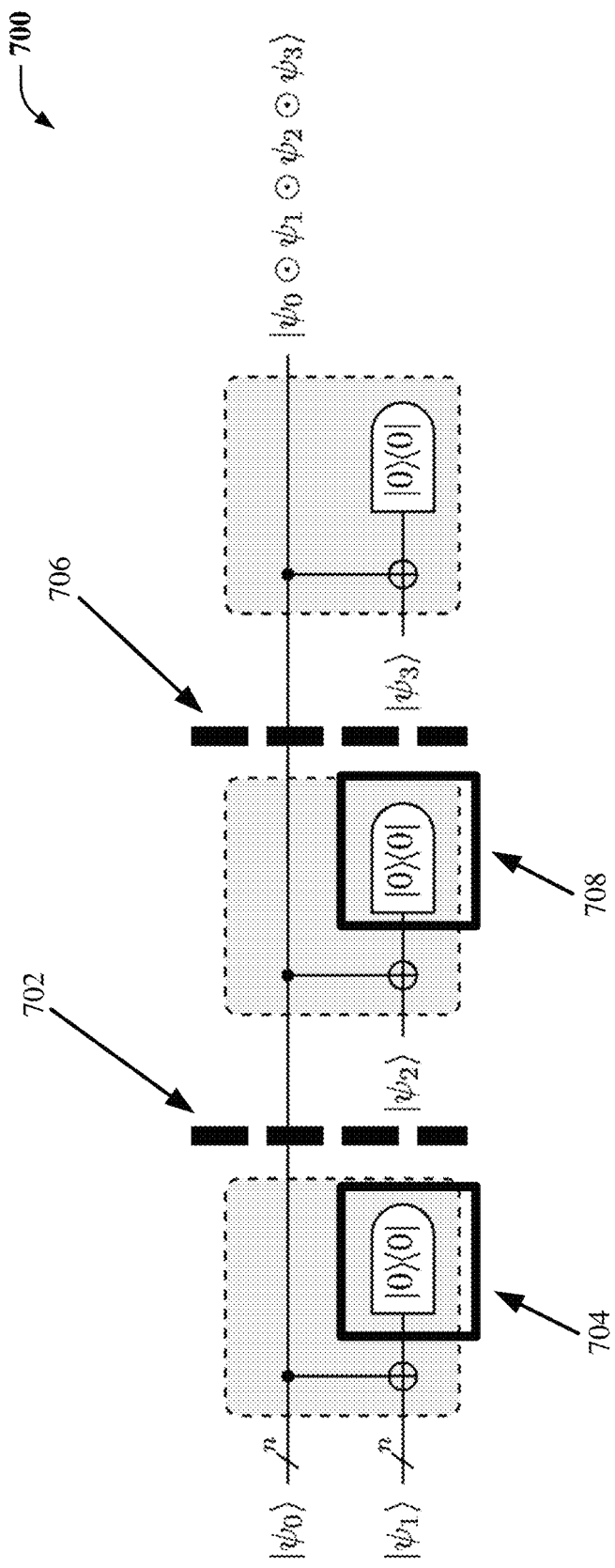
FIG. 7 illustrates a quantum circuit diagram representing a non-linear transformation process that can be performed by the non-limiting system of FIG. 2, in accordance with one or more embodiments described herein.

Referring now to FIGS. 6 and 7, in addition to still referring to FIGS. 2, 3 and 4, generally, the evaluating component 214 can employ a quantum register (e.g., quantum register 252 or of the quantum system 401) to output the set of processed vectors 236 based on a set of variables 232 indexed over a time range using one or more of a plurality of non-linear transformation options using the QHP to satisfy Equation 16. (It is noted that the time range can be a length of time over which the aspect is to be provided, such as via contract, request, agreement or otherwise.) That is, the evaluating component 214 can direct operation at the quantum system 401 via use of one or more quantum job requests 424.

At FIG. 6, quantum circuit diagrams 600 and 610 show two implementations for the QHP of four states, while FIG. 7 illustrates another implementation for the QHP of four states.

One option, illustrated at the quantum circuit diagram 600, can employ mid-circuit measurements and/or mid-circuit resets and has higher quantum circuit depth but lower quantum circuit width than the option illustrated at the quantum circuit diagram 610. This first option (at 600) is also suited for additional improvement by way of dynamic stopping, as described below at the third QHP implementation option. The first option at the quantum circuit diagram 600 employs a k=4 with mid-measurements and mid-resets, employing k−1=3 iterations.

The second option, illustrated at the quantum circuit diagram 610, can comprise lower quantum circuit depth and higher quantum circuit width than the first option. In addition, the second option does not employ mid-circuit measurements or mid-circuit resets. Measurements are postponed until the end. The second option at the quantum circuit diagram 610 employs a k=4, and with no mid-measurements or mid-resets, employs $\log_2 k=2$ iterations.

A third option is illustrated at the quantum circuit diagram 700 of FIG. 7 and can comprise use of mid-circuit measurements and/or mid-circuit resets, and also dynamic stopping. That is, the evaluating component 214 can instruct (e.g., by way of a quantum job request 424) the quantum system 401 (e.g., the quantum operation component 403) to sequentially execute a set of iterations of a quantum circuit implementation of a QHP, determine a measurement for the quantum circuit during execution of the quantum circuit (e.g., mid-circuit), and, based on the measurement from the quantum system 401 (e.g., a quantum measurement readout 420), generate a decision to continue or to stop execution of the quantum circuit (e.g., which decision can be transmitted to the quantum system 401 via a quantum job request 424).

As used herein, dynamic stopping is a technique that can employ a feature of dynamic circuits to incorporate classical processing within the coherence time of qubits of the quantum register. Dynamic circuits can incorporate classical processing within the coherence time of the qubits being operated upon. That is, the third option can make use of mid-circuit measurements and perform feed-forward operations, using the values produced by measurements to determine what gates to apply next, or whether to stop execution of the quantum circuit altogether, such as due to a quantity of error already present in the measurements. As a result, the dynamic stopping can offer an opportunity to trade off circuit depth and circuit width, which can be the difference between a quantum circuit that works well and a quantum circuit having an output that is generally indistinguishable from noise.

Put another way, mid-circuit measurements can be used to identify some characteristics of the circuit output for a given shot, while it is being executed. These measurements can be determined and decisions made at a plurality of times along the execution of the quantum circuit, such as after each iteration of a quantum circuit portion of the quantum circuit. If said characteristics are enough to reconstruct the shot output, dynamic stopping can abort the execution before execution of the full quantum circuit, thus saving execution time and limiting error propagation. This can decrease the average depth of a circuit and hence the accumulated gate errors as well.

For example, the quantum circuit diagram 700 can employ a k=4 with mid-measurements and mid-resets, employing k−1=3 iterations. A quantum circuit execution can be controlled by this dynamic stopping technique with an if-else loop and using conditional mid-circuit measurements. The evaluating component 214 can thus instruct the quantum system 401 to employ a classical computation after the measurement of box 704 and to stop at the first dashed line 702 if the measurement for the "else" branch of the if-else determination (e.g., from box 704) is not 0 (e.g., dynamic stopping condition tests as false). Otherwise, the quantum circuit execution can continue, and again a classical computation can be employed for box 708, with the quantum circuit being conditionally stopped, this time at the second dashed line 706, if the measurement from the box 708 is not 0. Otherwise, the quantum circuit execution can then continue to completion.

Next, using a result output from the evaluating component 214, (e.g., the processed vectors 236 output comprising the calculated higher-order powers of corresponding quantum states), the estimation component 216 can, at the classical portfolio valuation system 202, generate the processing functions to be employed for estimation of one or more inner products by the estimation component 216, which in turn can be employed by the valuation component 220, again at the classical portfolio valuation system 202, to determine the valuation result 240.

A first processing function can be a volume function based on the processed temperature time series. For example, an instantaneous provision amount can be given by the volume function of Equation 1 or alternatively Equation 17 where A, B, C, D and $T_0$ are constants, and where primed notations represent non-normalized vectors.

$$V_j = f(T_j) = \frac{A}{1 + \left(\frac{B}{T_j - T_0}\right)^C} + D, \qquad \text{Equation 1}$$

and $$f(T') = \frac{A}{1 + \left(\frac{B}{T' - T_0}\right)^C} + D, \text{ with } T' \le T_0. \qquad \text{Equation 17}$$

Relative to the ongoing example of gas provision, parameters A≥0, B<0, C>1, D>0 can be given, in the sense that they are either part of the corresponding portfolio or are estimated from the historical demand of a cluster a specific customer belongs to (e.g., domestic buildings, medium-size enterprises, etc.), and $T_0$=40 degree Celsius can comprise one default option.

That is, in the ongoing example, a volume function based on a temperature time series (temperature vector indexed over time) can be represented by Equation 18, where the volume function is approximated by means of a polynomial with coefficients bx. Hence, the monomial powers calculated at step 310 (e.g., employing the evaluating component 214 at the classical portfolio valuation system 202) can be employed to calculate individual monomials of an approximating polynomial for the volume function (e.g., at step 312).

$$f(T'_j) \approx \sum_{k=0}^{K} b_k(\eta) \, (T'_j - \eta)^k. \quad \text{Equation 18}$$

It is noted that the vector T', instead of representing a random sampling of the temperature time series, can also be used to represent the seasonal-normal temperature and thus can be employed to describe daily expectation of a corresponding temperature station.

Figure 8:
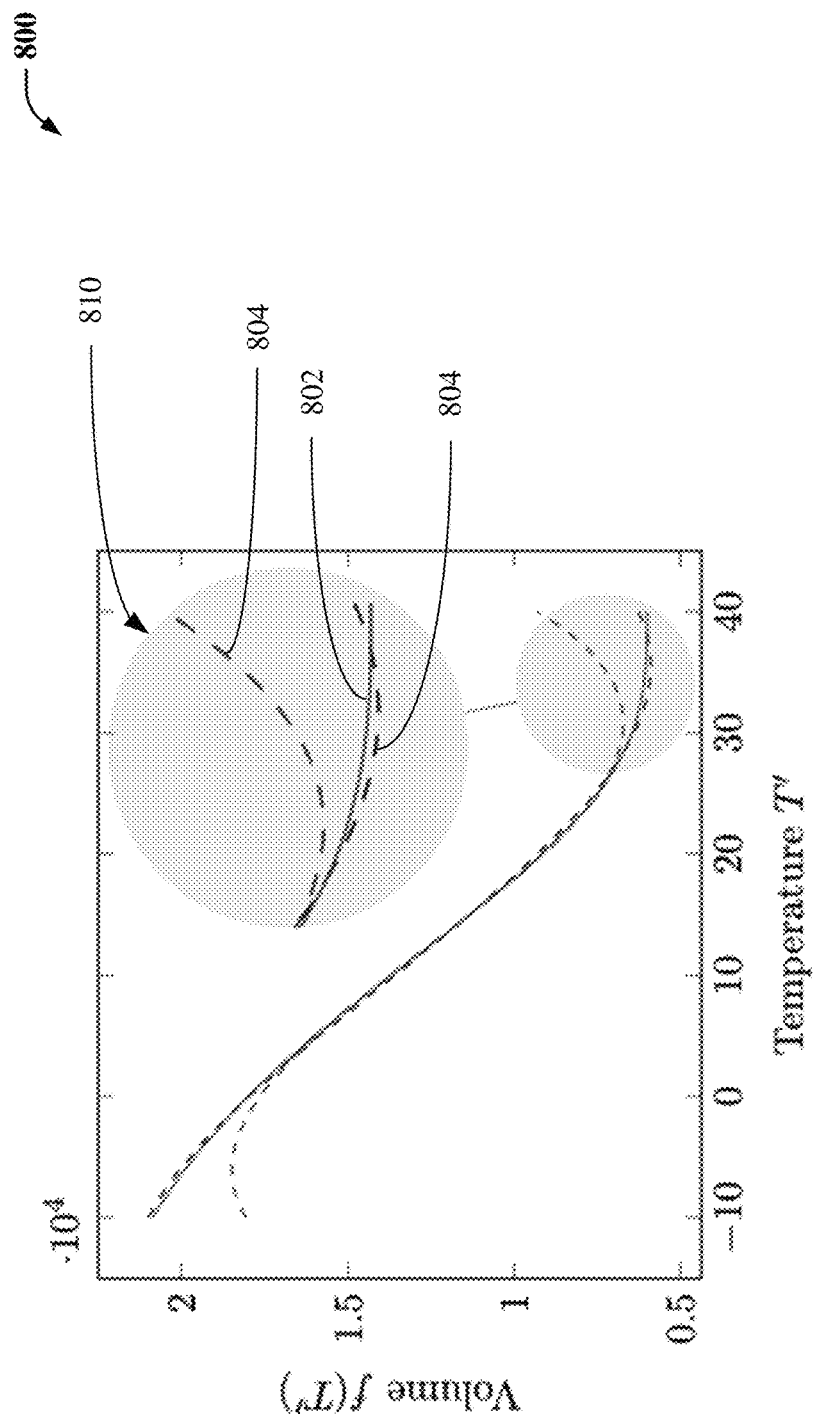
FIG. 8 depicts a graph illustrating estimation of a volume function employing the non-limiting system of FIG. 2, in accordance with one or more embodiments described herein.

Turning briefly to FIG. 8, an example of an approximating sigmoid function for the volume function as a function of temperature is illustrated at line 802 of the graph 800. The graph 800 provides a representation of fit of Equation 22 to an ideal volume function (line 802) and graphs temperature T' against volume $f(T')$. Line 804 represents a best fit polynomial p of degree three. Line 804 represents a Taylor expansion of degree 3 around T'=15, which can be a good approximation locally (e.g., at expanded view 810), but less useful globally. Expanded view 810 is zoomed to illustrate the approximation at the corresponding domain boundary.

A second processing function can be the identity function based on the encoded price time series. The identity function can be calculated by the estimation component 216 by employing unitary prices for the aspect, in the ongoing example being provision (e.g., sale) of gas.

Next, using the volume function and the identity function output from the estimation component 216 can estimate one or more inner products of the set of vectors comprising the one or more processed vectors (from step 310) and the one or more normalized vectors output from the encoding component 212 (from step 308). In a practical resolution of the valuation problem, multiple inner products can be calculated in connection with the approximation of a respective value function. That is, calculation can be performed by the estimation component 216, at the classical portfolio valuation system 202, using measurement output from the quantum system 401 (e.g., such as using a quantum circuit implementation of a quantum Hadamard product at the quantum register).

The purpose of these one or more operations (at step 312 of process flow 300), can be that the valuation function (e.g., approximated at step 314 of process flow 300) can be defined as one or more inner products between can be a function of both a volume function (discussed briefly above and detailed further next, below) and of an identity function (also detailed below). The one or more inner products can be approximated by calculating the weighted sum of the estimation terms, where the estimation terms are obtained as inner products of processed vectors (e.g., normalized, encoded and/or further processed at steps 302-310 of the process flow 300).

An inner product of a set of vectors can be represented by Equation 19 for all k (e.g., k=1, . . . , K).

$$y_k := \sum_{j=0}^{N-1} E_j T_j^k. \quad \text{Equation 19}$$

In one example, continuing the ongoing gas provision example, an inner product $\langle \psi_T^{(k)} | \psi_E \rangle$ can be calculated, using the quantum system 401, of the encoded price vector indexed over time and of the processed (e.g., power calculation for quantum states by non-linear transformation) temperature vector indexed over time. That is, the estimation component 216 can direct operation of the quantum system 401, such as by using one or more quantum job requests 424.

That is, assuming two real vectors mapped to quantum states of the form of Equation 20, by amplitude encoding or bidir-orth encoding, various techniques for the computation of the absolute inner product of Equation 21 can be employed.

$$|\psi_a\rangle = \sum_j \psi_j^{(a)} |j\rangle, \quad \text{Equation 20}$$

and $$|\langle \psi_0 | \psi_1 \rangle| = \left| \sum_j \psi_j^{(0)} \psi_j^{(1)} \right| := p. \quad \text{Equation 21}$$

Figure 9:
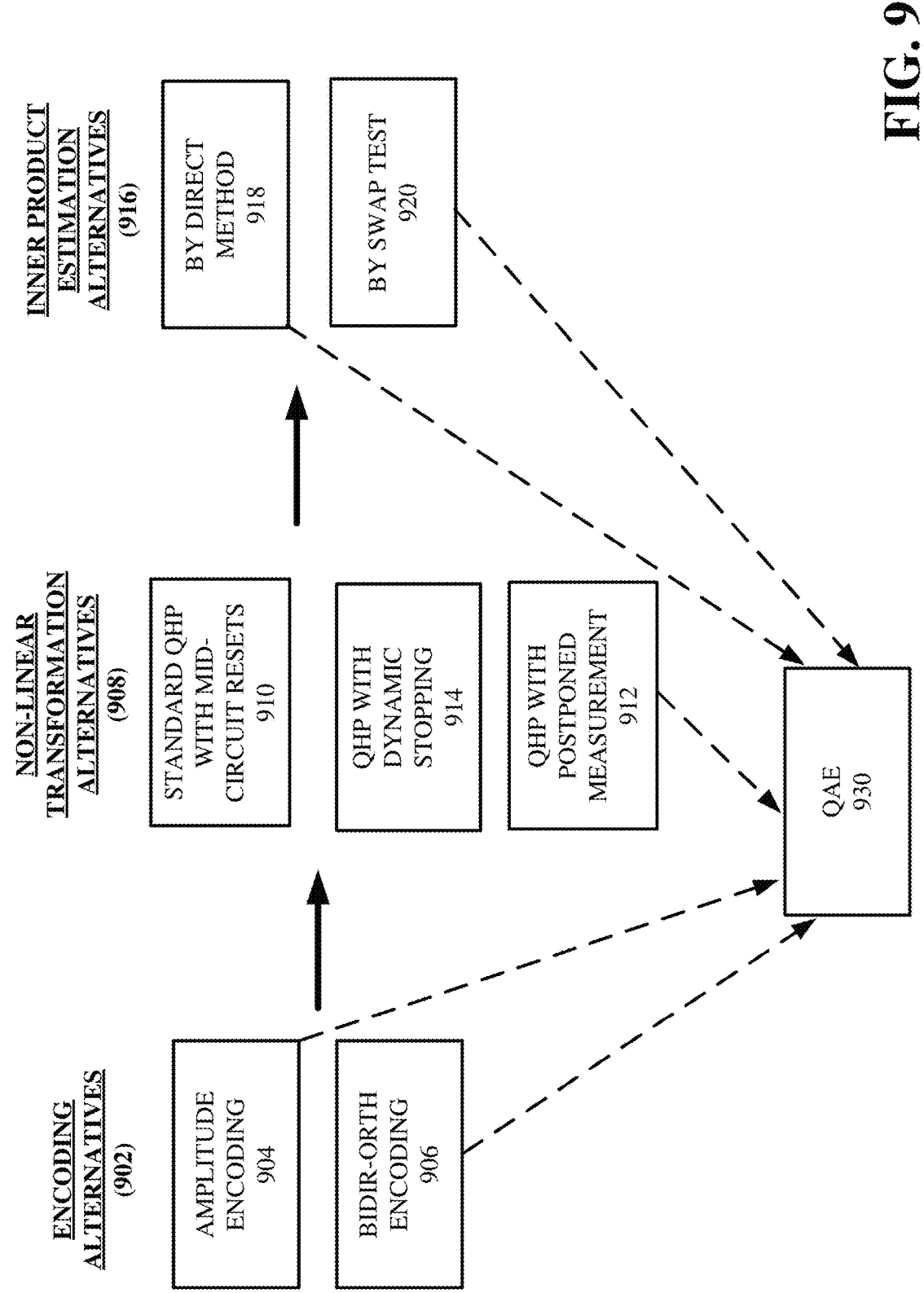
FIG. 9 illustrates a summary block diagram of various process steps that can be employed by the non-limiting system of FIG. 2 to achieve portfolio valuation, in accordance with one or more embodiments described herein.

For example, two techniques can be referred to as a direct method 918 (FIG. 9) and a swap test method 920 (FIG. 9). Let p be the inner product of two states, defined in Equation 21. The direct method 918 can be represented by Equation 22 and can output $p^2$, where sampling complexity can be independent of p. At Equation 22, an operator $U_1$ can be given such that $U_1 |0\rangle = |\psi 1\rangle$.

$$\langle 0 | U_1^\dagger | \psi_0 \rangle = \langle \psi_1 | \psi_0 \rangle = p, \quad \text{Equation 22}$$

where the $U_1^\dagger | \psi 0 \rangle$ circuit is built and projected onto $|0\rangle$.

The swap test method 920 can output an estimation of $$\frac{1}{2} + \frac{1}{2} p^2,$$

where the swap test is unbounded for p→0. For these reasons, in one or more embodiments, the direct method 918 can be employed best with the amplitude encoding 904 (FIG. 9), while the swap test method 920 can be employed with the bidir-orth encoding 906 (FIG. 9).

Regarding compatibility of the bidir-orth encoding 906 with the swap test method 920, the following is set forth. Where $|D_j^{(0)}|$ and $|D_1^{(1)}|$ are two state vectors of length N, a power of 2, and are represented in the bidir-orth encoding with split level s, the swap test can be applied between the primary registers (e.g., quantum registers) of the two state vectors. The swap test qubit can be measure in the state $|1\rangle$ with probability $\frac{1}{2} + \frac{1}{2} \Sigma_j |D_j^{(0)}|^2 |D_j^{(1)}|^2$. That is, where $\epsilon > 0$ and $a \in (0, 1)$, let $X_i$, for i=1 . . . , S, be a random variable representing the output of the swap test measurement after the i-th shot of the corresponding quantum circuit. Call $\overline{X}_S$ the mean random variable resulting from the S independent shots. Then $Y_S := 1 - 2\overline{X}_S$ is an estimator for $p = \Sigma_j |D_j^{(0)}|_2 |D_j^{(1)}|^2$ and corresponding error can be controlled by Equation 23, once S is chosen as in Equation 24, asymptotically when S→∞, where Φ is the cumulative distribution function of the standard normal distribution.

$$\mathbb{P}(|Y_S - p| < \epsilon) = \alpha, \text{ and} \qquad \text{Equation 23}$$

$$s = \frac{1-p^2}{\epsilon^2}\left[\Phi^{-1}\left(\frac{1+\alpha}{2}\right)\right]^2. \qquad \text{Equation 24}$$

Referring still to FIGS. 2 and 3, and turning next to the valuation component 220, generally the valuation component 220 can, in response to output of the processed vectors 236 by the evaluating component 214, and in response to the estimation of one or more inner products output by the estimation component 216, approximate a value function, and, based on the approximation, can output a valuation result 240 representing provision of an aspect over the time range. This can be performed by the valuation component 220 at the classical portfolio valuation system 202. The set of variables 232, of the dataset 230, correspond to conditions defining the provision of the aspect. The value function is a function of the one or more inner products, which are themselves functions of a set of processing functions, such as a pair of processing functions. In the ongoing example, the processing functions, as mentioned above, can comprise a volume function relative to the processed temperature time series and an identity function relative to the encoded price time series.

That is, more particularly, the valuation component 220 can employ outputs from the encoding component 212 (directly from step 308 and indirectly from step 306) and from the estimation component 216 (directly from step 312 and indirectly from steps 306 and 310) to construct a valuation function v, such as represented by Equation 25.

Further, this valuation function can be approximated by Equation 26 and then reconstructed, in view of the approximation (e.g., in view of the sequence of non-linear transformations instructed by the evaluating component 214 to calculate the powers $T_j^k$ for all j=0, . . . , N−1 and k=0, . . . , K) as Equation 27. That is, Equation 27 is an approximation of the target v, defined in Equation 25, provided that the volume function $f(T)$, defined in Equation 18, can be approximated by the polynomial as shown in Equation 26, below.

$$v = \sum_{j=0}^{N-1} E'_j f(T'_j), \qquad \text{Equation 25}$$

$$v = \sum_{j=0}^{N-1} E'_j f(T'_j) \approx \sum_{j,k} b_k(\eta) E'_j (T'_j - \eta)^k, \text{ and} \qquad \text{Equation 26}$$

$$v \approx \sum_{k=0}^{K} \rho_T^{-k} \rho_E^{-1} b_k(\eta) y_k. \qquad \text{Equation 27}$$

It is noted that for, and thus for Equation 28, $y'_k$ can be represented by Equation 29.

$$v^* = \sum_k b_k(\eta) y'_k, \text{ and} \qquad \text{Equation 28}$$

$$y'_k := \rho_T^{-k} \rho_E^{-1} y_k. \qquad \text{Equation 29}$$

Regarding Equation 27, attention is again directed to Equations 5 and 6, discussed above, and again reproduced below, where n is an appropriate translation term for temperature to guarantee $T_j>0$ for all j at least in probability, and $\rho^T$ and $\rho_E$ are scale factors of Equations 5 and 6.

$$\rho_T^{-2} = |\sum_{j=0}^{N-1} (T'_j - \eta)^2, \text{ and} \qquad \text{Equation 5}$$

$$\rho_E^{-2} = \sum_{j=0}^{N-1} (E'_j)^2. \qquad \text{Equation 6}$$

Discussion now turns to the quantum amplitude estimation (QAE) component 218 and to FIG. 9. That is, at least a portion of the processes set forth in the process flow 300 of FIG. 3 can be conducted by a QAE method employing the quantum system 401, such as via the QAE component 218 directing operation of the quantum system 401 through use of one or more quantum job requests 424. The idea of a QAE method can be to connect a desired expectation value to an eigenfrequency of an oscillating quantum system and then use a phase estimation method to obtain the estimation up to a desired accuracy.

It is noted that, as illustrated at the block diagram 900 of FIG. 9, various encoding alternatives 902, non-linear transformation alternatives 908 and inner product estimation alternatives 916, all discussed above, are illustrated, but not all such alternatives are suitable for a QAE method 930. That is, at least the amplitude encoding method 904, bidir-orth encoding method 906, QHP with postponed measurement 912, inner product estimation by direct method 918, and inner product estimation by swap test 920 can be suited to being conducted by a QAE method.

To exploit QAE and related techniques for improving performance, a unitary circuit can be required, and thus QHP with postponed measurement 912 (e.g., without mid-circuit resets) can be employed as an alternative to standard QHP with mid-circuit resets 910 or QHP with dynamic stopping 914.

Figure 10:
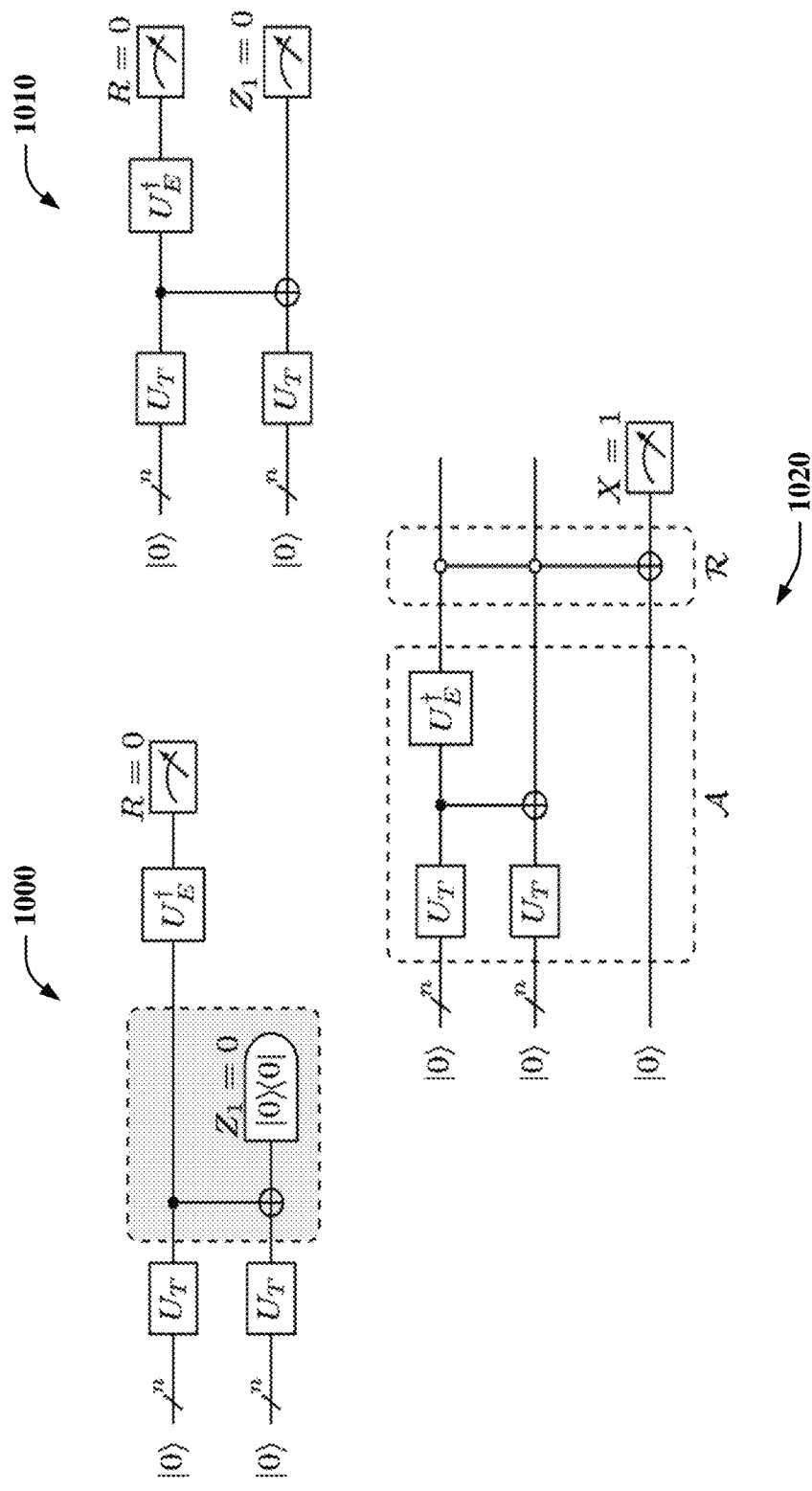
FIG. 10 illustrates a set of quantum circuit diagrams in connection with a pair of portfolio valuation options, in accordance with one or more embodiments described herein.

For one implementation, QAE Implementation A, as supported by diagram 1020 of FIG. 10, amplitude encoding 904 can be employed with QHP with postponed measurement 912 and the inner product estimation by direct method 918 in a QAE implementation. FIG. 10 illustrates the QHP method 912 and direct method 918, for the calculation of the inner product between temperatures to the power k and prices, when k=2. $U_T$ and $U_E$ are the loading unitaries for T and E, respectively. Diagram 1020 illustrates a single qubit measurement through a multi-controlled NOT. This suggests the definition of unitaries A and R that can be fed to a QAE implementation for efficient estimation. In this way, time complexity can achieve a quadratic speedup in error scaling, compared to a case without use of a QAE method.

Here, the direct method can be another, even simpler, way to calculate the inner product of two state vectors $|\psi_0\rangle$ and $|\psi_1\rangle$. This application is possible once an efficient unitary for loading at least one of the two states, such as $|\psi_1\rangle$, is known. Namely, an operator $_{U1}$ can be given such that $U_1 |0\rangle = |\psi_1\rangle$ so that it can be sufficient to construct the $U^\dagger_1 |\psi_0\rangle$ circuit, such as by the portfolio valuation system 202, and project that circuit on $|0\rangle$. The inner product estimation by direct method can be represented as Equation 30.

$$\langle 0|U_1^\dagger|\psi_0\rangle = \langle \psi_1 | \psi_0 \rangle = p. \qquad \text{Equation 30}$$

Concerning quantum circuit width, k copies of $|\psi_T\rangle$ need to be loaded in parallel for A, leading to k $\log_2$ N. The (k $\log_2$ N)-CNOT requires $O(\log_2 N)$ ancillas. R is a (k $\log_2$ N)-CNOT as well. Concerning quantum circuit depth, data loading can be performed in parallel on the different registers for $|\psi_T\rangle$, as well as CNOTs for QHPs. The data loading of $|\psi_E\rangle$ in performed afterwards. The other operations are dominated by the two (k log$_2$ N)-CNOTs, which require O (k log$_2$ N) circuit depth.

Indeed, if an efficient loading procedure in amplitude encoding is known, with depth $C_{d,\,load}(N) \ll N^{1/2}$, then an asymptotic advantage for K=2 can be achieved by the QAE Implementation A variant, against existing classical cases, and which scales as O(N). More precisely, the QAE Implementation A can have the characteristics of circuit width O(log$_2$ N) and time $$C_{d,load}(N) N^{\frac{K-1}{2}} O(\epsilon^{-1} \log N).$$

The QAE Implementation A also can have the characteristic that for K=3, and under the assumption of constant depth $C_{d,\,load}$, the scaling can be essentially comparable to that of an existing classical method. $\epsilon$ is the acceptable relative error.

For another implementation, QAE Implementation B, amplitude encoding 904 can be employed with QHP with postponed measurement 912 and inner product estimation by the swap test method 920 in a QAE implementation. The techniques applied in the immediately previous example also can be applied to the swap test method 920. Two quantities are to be estimated. With a first estimation problem, by defining $f_1=1$ when QHPs are successful, one derives the success rate $a_k^{-2}$. Then a second estimation problem can be run, by setting $f_2=1$ when both the QHPs are successful and the swap test ancilla provide 1. Thereafter, the two quantities can be merged into Equation 31 recalling also Equation 32 to estimate the desired inner product.

$$\mathbb{P}(Z=0) = a_k^{-2}, \text{ and} \qquad \text{Equation 31}$$

$$2\mathbb{P}(X=0, Z=0) - \mathbb{P}(Z=0) = \left(\sum_{j=0}^{N-1} E_j T_j^k\right)^2. \qquad \text{Equation 32}$$

Figure 11:
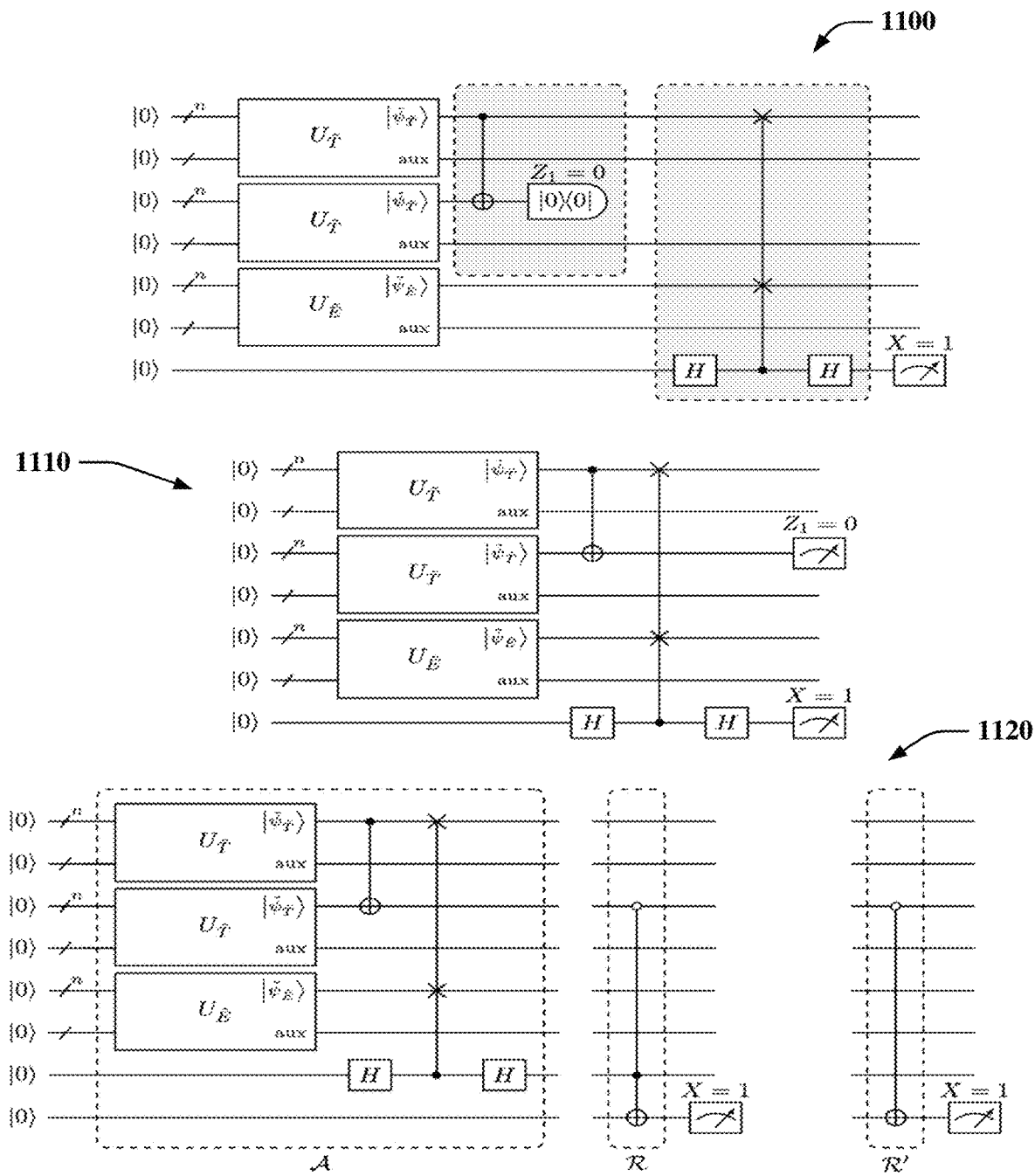
FIG. 11 illustrates another set of quantum circuit diagrams in connection with a pair of portfolio valuation options, in accordance with one or more embodiments described herein.

For still another implementation, QAE Implementation C, supported by diagram 1120 of FIG. 11, bidir-orth encoding 906 can be employed with QHP with postponed measurement 912 and inner product estimation by the swap test method 920 in a QAE implementation. This variant requires execution of two QAE estimation problems, the former to approximate the success rate $\tilde{a}_k^{-2}$ and the latter to estimate $\frac{1}{2}(\tilde{y}_k \tilde{a}_k^{-2})$, so that by difference the desired result $\tilde{y}_k$ can be obtained.

The two QAE problems use oracles (A+R) and (A+R') respectively, which are illustrated at diagram 1120 of FIG. 11. A is composed by data loading, QHP, and swap test. R' values an additional qubit as $|1\rangle$ iff all the QHPs were successful, thus enabling the estimation of $\tilde{a}_k^{-2}$. R values an additional qubit $|1\rangle$ iff all the QHPs were successful, and the swap test is $|1\rangle$, thus enabling the estimation of $\frac{1}{2}(\tilde{y}_k \tilde{a}_k^{-2})$. That is, to adopt QAE, a separate circuit bas on A and R' is required to estimate the success rate of QHPs (for this purpose A can be reduced to a smaller circuit that only computes the QHPs).

Indeed, if no efficient loading procedure is known for amplitude encoding, and/or inputs are stored in a binary tree structure (see, e.g., FIG. 5 and related specification text), then the QAE Implementation C can be applied with split level s=1 for width O(N) and time $O(\epsilon^{-1} N^K \log^2 N)$. This can compare with a time of $O(\epsilon^{-2} \log N)$ of the a quantum-inspired polynomial approximation on a classical computer. The time scaling for QAE Implementation C can provide a quadratic speedup on the error compared to such quantum-inspired polynomial approximation on a classical computer, but in one or more embodiments, having lower performance in N. $\epsilon$ is the acceptable relative error.

Alternatively, without QAE, various portfolio valuations still can be implemented.

Figure 12:
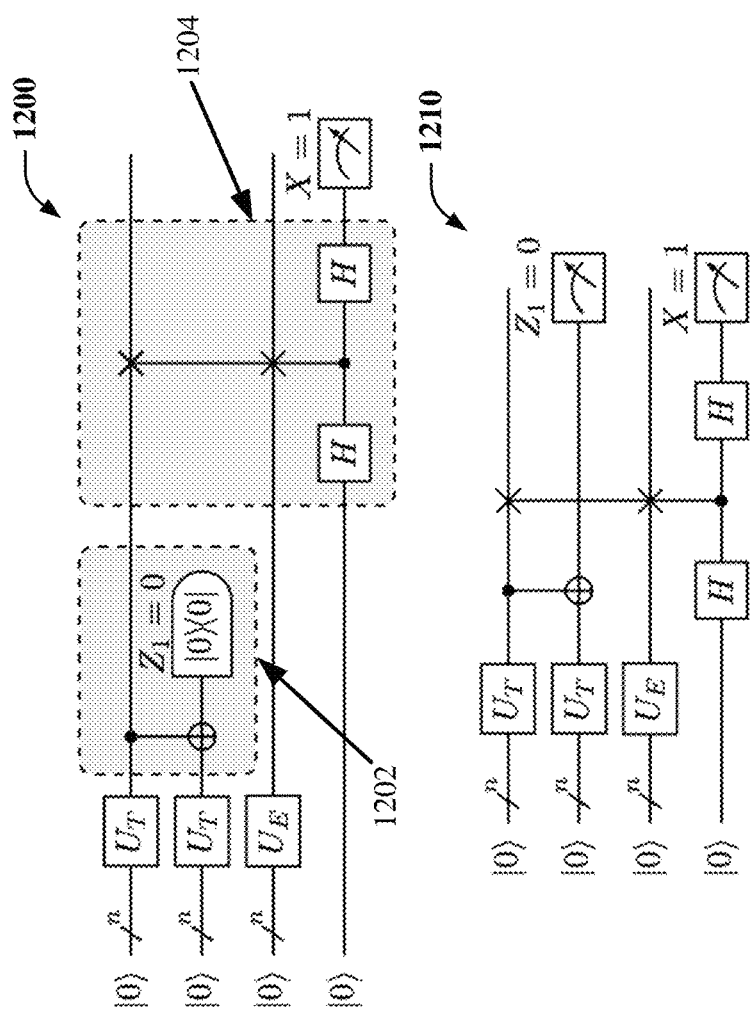
FIG. 12 illustrates still another set of quantum circuit diagrams in connection with a pair of portfolio valuation options, in accordance with one or more embodiments described herein.

At one implementation, Non-QAE Implementation D, as supported by FIG. 12, amplitude encoding 904 can be employed with QHP (with or without mid-measurements) and inner product estimation by swap test method 920. FIG. 12 generally illustrates an exemplary demonstration of the Non-QAE Implementation E based on QHP and the swap test, for the calculation of the inner product between temperatures to the power k and prices, when k=2. $U_T$ and $U_E$ are loading unitaries for T and E, respectively. Diagram 1200 illustrates the Non-QAE Implementation D in its original formulation (e.g., using standard QHP with mid-circuit resets 910), where the shaded box 1202 highlights the QHP and the shaded box 1204 highlights the swap test. Diagram 1210 illustrates a version of the Non-QAE Implementation D without mid-measurements (e.g., using QHP with postponed measurement 912).

At another implementation, Non-QAE Implementation E, as supported by diagram 1000 of FIG. 10, amplitude encoding 904 can be employed with QHP (e.g., standard QHP with mid-circuit resets 910) and inner product estimation by direct method 918. Diagram 1000 illustrates the QHP method 910 in its original form, where the shaded box highlights the QHP.

This is another proposed variant without a swap test, but direct method for inner product calculations can be used with the same amplitude encoding technique Non-QAE Implementation D. Here, the direct method can be another, even simpler, way to calculate the inner product of two state vectors $|\psi_0\rangle$ and $|\psi_1\rangle$. This application is possible once an efficient unitary for loading at least one of the two states, such as $|\psi_1\rangle$, is known. Namely, an operator $_{U1}$ can be given such that $U_1|0\rangle = |\psi_1\rangle$ so that it can be sufficient to construct the $U^{\dagger}_1 |\psi_0\rangle$ circuit, such as by the portfolio valuation system 202, and project that circuit on $|0\rangle$. The inner product estimation by direct method can be represented as Equation 30.

$$\langle 0|U_1^{\dagger}|\psi_0\rangle = \langle \psi_1 | \psi_0 \rangle = p. \qquad \text{Equation 30}$$

It is noted that diagram 1010 illustrates the QHP method without mid-measurements. That is, the measurements are postponed until the end of the quantum circuit.

At still another implementation, Non-QAE Implementation F, as supported by diagram 1100 or diagram 1110 at FIG. 11, bidir-orth encoding can be employed with QHP (with or without mid-circuit measurement) and inner product estimation by swap test method 920. Diagram 1100 illustrates an example of loading data using bidir-orth data encoding, QHP and the swap test for the calculation of inner product between temperatures to the power k and prices, as represented by Equation 33.

$$|\tilde{\psi}_T^{(k)}\rangle := \tilde{a}_k \sum_{j=0}^{N-1} T_j^k |j\rangle \otimes |\phi_j^T\rangle. \qquad \text{Equation 33}$$

It is noted that diagram 1110 illustrates the QHP method without mid-measurements. That is, the measurements are postponed until the end of the quantum circuit.

It will be appreciated that the above-described six implementation variants are not all encompassing and that other QAE-based and non-QAE-based variants can be suitable for various problems.

Figure 13:
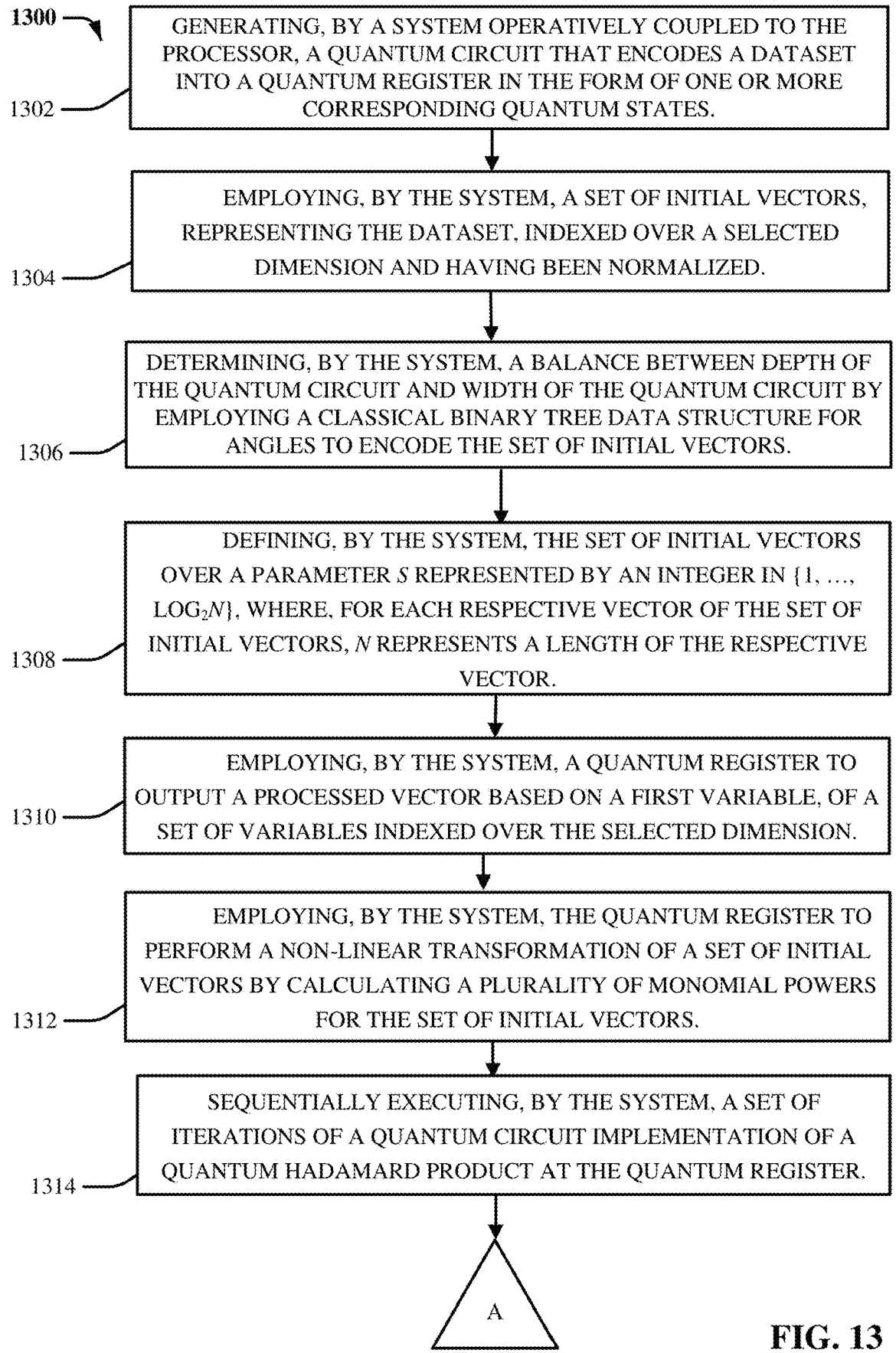
FIG. 13 illustrates a block diagram of various operations that can be performed by the non-limiting system of FIG. 2 to achieve portfolio valuation, in accordance with one or more embodiments described herein.
Figure 14:
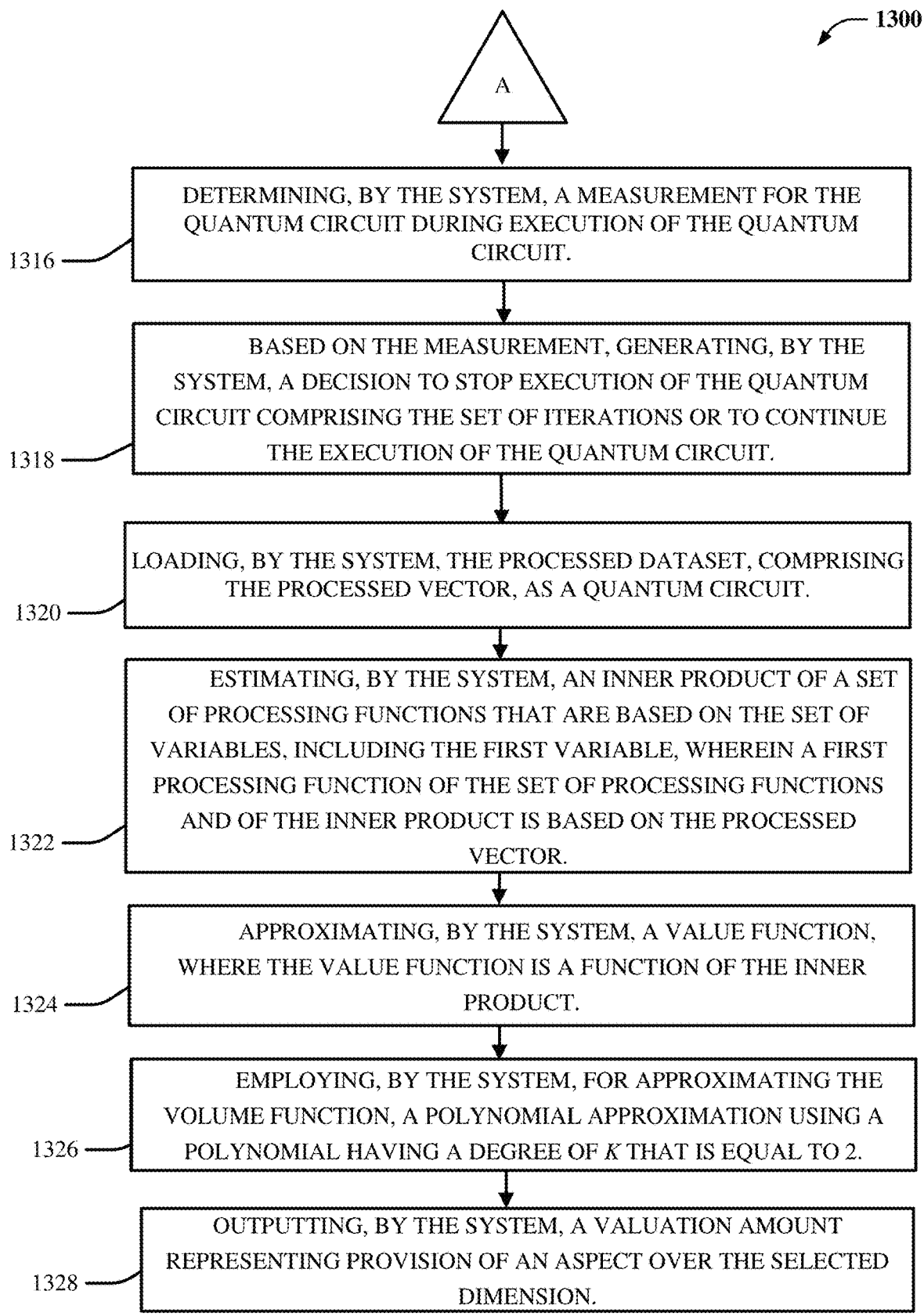
FIG. 14 illustrates a continuation of the block diagram of FIG. 13 of various operations that can be performed by the non-limiting system of FIG. 2 to achieve portfolio valuation, in accordance with one or more embodiments described herein.

As a summary of the above-described components, discussion turns next to FIGS. 13 and 14, illustrating a flow diagram of an example, non-limiting method 1300 that is described to summarize a process to perform portfolio valuation in accordance with one or more embodiments described herein, such as the non-limiting system 200 of FIG. 2 and extended non-limiting system 400 of FIG. 4. While the non-limiting method 1300 is described relative to the non-limiting systems 200 and 400 of FIGS. 2 and 4, the non-limiting method 1300 can be applicable also to other systems described herein, such as the non-limiting system 100 of FIG. 1. Repetitive description of like elements and/or processes employed in respective embodiments is omitted for sake of brevity.

At 1302, the non-limiting method 1300 can comprise generating, by a system operatively coupled to a processor (e.g., encoding component 212 of the classical portfolio valuation system 202), a quantum circuit that encodes a dataset into a quantum register (e.g., quantum register 252) in the form of one or more corresponding quantum states. That is, the encoding component 212 of the classical portfolio valuation system 202 can provide encoding processes for the quantum register of the quantum system 401.

At 1304, the encoding (1302) of the non-limiting method 1300 can comprise employing, by the system (e.g., encoding component 212 of the classical portfolio valuation system 202), a set of initial vectors, representing the dataset, indexed over the selected dimension and having been normalized.

At 1306, the encoding (1302) of the non-limiting method 1300 can comprise determining, by the system (e.g., encoding component 212 of the classical portfolio valuation system 202), a balance between depth of the quantum circuit and width of the quantum circuit by employing a classical binary tree data structure for angles to encode the set of initial vectors.

At 1308, the encoding (1302) of the non-limiting method 1300 can comprise defining, by the system (e.g., encoding component 212 of the classical portfolio valuation system 202), the set of initial vectors over a parameter s represented by an integer in $\{1, \ldots, \log_2 N\}$, where, for each respective vector of the set of initial vectors, N represents a length of the respective vector.

At 1310, the non-limiting method 1300 can comprise employing, by the system (e.g., evaluating component 214 of the classical portfolio valuation system 202), a quantum register (e.g., of the quantum system 401) to output a processed vector based on a first variable, of a set of variables indexed over the selected dimension. In one or more embodiments, the set of variables correspond to conditions defining the provision of the aspect. That is, the evaluating component 214 of the classical portfolio valuation system 202 can, through use of one or more quantum job requests 424, employ the quantum register of the quantum system 401. Based on quantum measurement readout 420 from the quantum device 401, the evaluating component 214 can generate and output the processed vector At 1312, the employing (1310) of the non-limiting method 1300 can comprise employing, by the system (e.g., evaluating component 214 of the classical portfolio valuation system 202), the quantum register to perform a non-linear transformation of a set of initial vectors by calculating a plurality of monomial powers for the set of initial vectors. That is, the evaluating component 214 of the classical portfolio valuation system 202 can, through use of one or more quantum job requests 424, employ the quantum register of the quantum system 401. Based on quantum measurement readout 420 from the quantum device 401, the evaluating component 214 can generate and output a non-linearly transformed set of vectors.

At 1314, the calculating (1312) of the non-limiting method 1300 can comprise sequentially executing, by the system (e.g., evaluating component 214 of the classical portfolio valuation system 202), a set of iterations of a quantum circuit implementation of a quantum Hadamard product at the quantum register. That is, the evaluating component 214 of the classical portfolio valuation system 202 can, through use of one or more quantum job requests 424, employ the quantum system 401 to execute the set of iterations using the quantum processor 408.

At 1316, the calculating (1312) of the non-limiting method 1300 can comprise determining, by the system (e.g., evaluating component 214 of the classical portfolio valuation system 202), a measurement for the quantum circuit during execution of the quantum circuit. That is, the evaluating component 214 of the classical portfolio valuation system 202 can, based on one or more quantum measurement readouts 420 received from the quantum system 401 during the execution of the quantum circuit, determine the measurement.

At 1318, the calculating (1312) of the non-limiting method 1300 can comprise, based on the measurement, generating, by the system (e.g., evaluating component 214 of the classical portfolio valuation system 202), a decision to stop execution of the quantum circuit comprising the set of iterations or to continue the execution of the quantum circuit. That is, based on the measurement, the evaluating component 214 of the classical portfolio valuation system 202 can direct continuation or stopping of a quantum circuit execution, such as by employing one or more quantum job requests 424 transmitted to the quantum system 401.

At 1320, the non-limiting method 1300 can comprise loading, by the system (e.g., quantum operation component 403 of the quantum system 401), the processed dataset, comprising the processed vector, as a quantum circuit.

At 1322, the non-limiting method 1300 can comprise estimating (e.g., at the classical portfolio valuation system 202), by the system (e.g., QAE component 218 of the classical portfolio valuation system 202), an inner product of a set of processing functions that are based on the set of variables, including the first variable, wherein a first processing function of the set of processing functions and of the inner product is based on the processed vector.

At 1324, the non-limiting method 1300 can comprise approximating (e.g., at the classical portfolio valuation system 202), by the system (e.g., valuation component 220 of the classical portfolio valuation system 202), a value function, where the value function is a function of the inner product.

At 1326, the approximating (1324) of the non-limiting method 1300 can comprise employing (e.g., at the classical portfolio valuation system 202), by the system (e.g., valuation component 220 of the classical portfolio valuation system 202), for approximating the volume function, a polynomial approximation using a polynomial having a degree of K that is equal to 2.

At 1328, the non-limiting method 1300 can comprise outputting (e.g., at the classical portfolio valuation system 202), by the system (e.g., valuation component 220 of the classical portfolio valuation system 202), a valuation amount (e.g., valuation result 240) representing provision of an aspect over the selected dimension.

An advantage of such system, computer-implemented method and/or computer program product can be an asymptotic quantum-based speedup of approximation of the value function as compared to classical-only only based approaches having higher costs of such classical computation. This speedup can be at least partially due to a quantum-based speedup associated with the output of the processed vectors and with one or more subsequent power calculations.

Another advantage of such system, computer-implemented method and/or computer program product can be provision of an optimal encoding strategy for representing classical data on a quantum processor that optimizes a trade off between quantum circuit depth and quantum circuit width. As a result, a complexity in a resulting quantum circuit can be reduced. As another result, error percentage throughout the encoding, and throughout a volume approximation employing the encoding, can be reduced. These one or more reductions can be at least partially due to reduction in noise in a corresponding quantum circuit being executed. Furthermore, the resulting encoding can be compatible with a variety of quantum operations, including a swap test.

Still another advantage of such system, computer-implemented method and/or computer program product can be enablement of dynamic stopping of a quantum circuit, employing a feature of dynamic circuits to incorporate classical processing within the coherence time of qubits of the quantum register. That is, the embodiment can make use of mid-circuit measurements and perform feed-forward operations, using the values produced by measurements to determine what gates to apply next, or whether to stop execution of the quantum circuit altogether, such as due to a quantity of error already present in the measurements.

Bidirectional-Orthogonal Encoding

Figure 15:
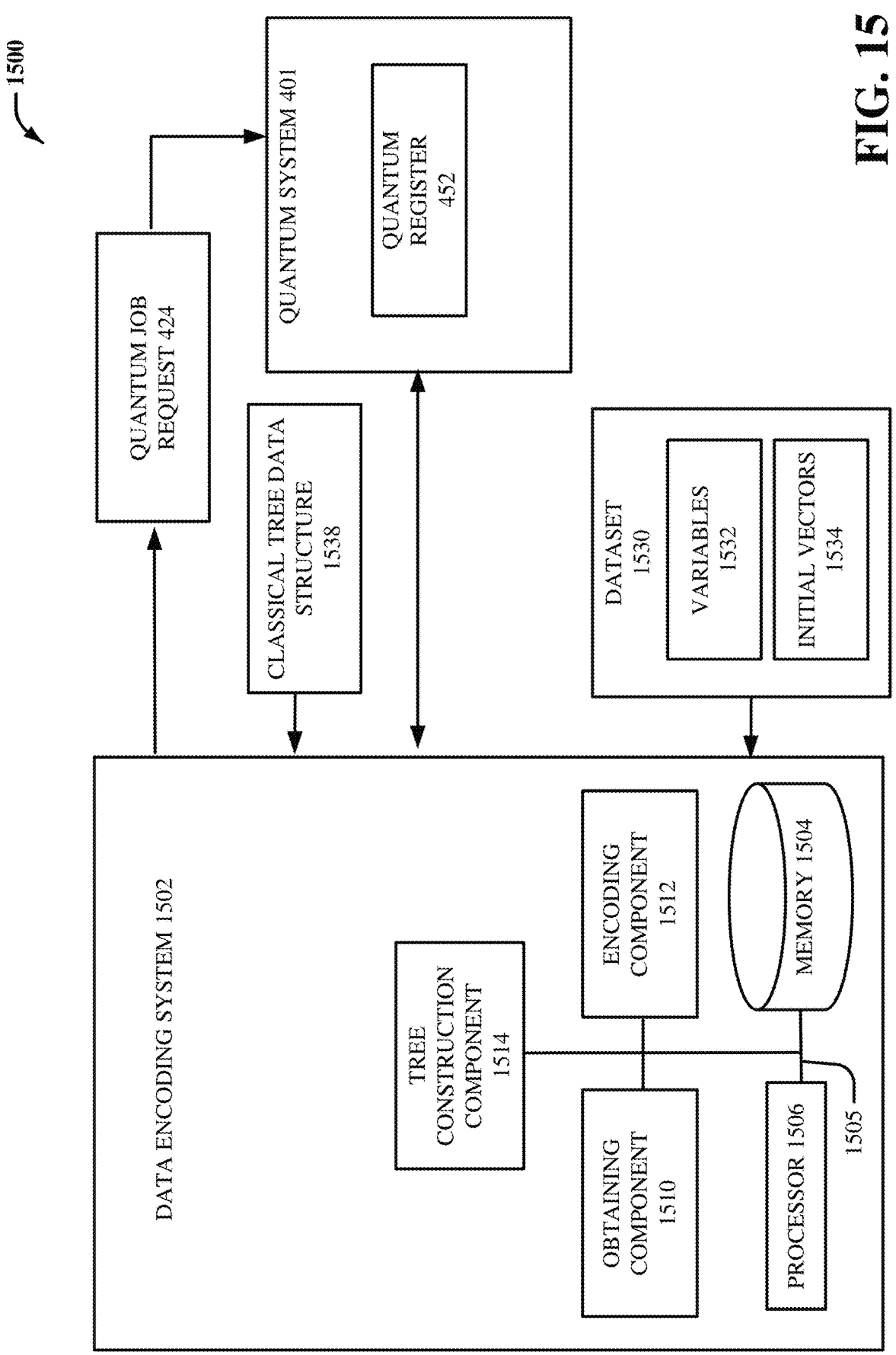
FIG. 15 illustrates a block diagram of another example, non-limiting system that can facilitate quantum data encoding, in accordance with one or more embodiments described herein.

Turning now to FIG. 15, a bidirectional-orthogonal encoding (also herein referred to as bidir-orth encoding) is detailed.

One of the main challenges for an efficient data loading (e.g., of a quantum register) for a quantum execution is to optimize trade off between circuit depth and circuit width, while also reducing the complexity in the quantum circuit and the error percentage through the computation procedure. Furthermore, existing procedures, such as existing bidirectional encoding, can provide encoding that is subsequently incompatible with the swap test and other quantum operations.

To account for one or more of these deficiencies of existing encoding techniques, the width/depth balance can be obtained by a bidir-orth encoding technique described herein, and as a result, the encoded result can be compatible with the swap test and other post-encoding quantum operations.

FIG. 15 illustrates a diagram of an example, non-limiting system 1500 that can facilitate bidir-orth encoding, in accordance with one or more embodiments described herein.

As illustrated, the non-limiting system 1500 can comprise a data encoding system 1502. Generally, data encoding system 1502 can facilitate data encoding of a quantum register such that encoding is subsequently compatible with the swap test and other quantum operations.

The data encoding system 1502, as illustrated, can comprise any suitable type of component, machine, device, facility, apparatus and/or instrument that comprises a processor and/or can be capable of effective and/or operative communication with a wired and/or wireless network. All such embodiments are envisioned. For example, data encoding system 1502 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the data encoding system 1502 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. The data encoding system 1502 can be associated with, such as accessible via, a cloud computing environment.

The data encoding system 1502 can comprise a plurality of components. The components can include a memory 1504, processor 1506, bus 1505, obtaining component 1510, encoding component 1512 and/or tree construction component 1514.

One or more communications between one or more components of the non-limiting system 1500, and/or between an external system, either comprising and/or facilitating access to any one or more of a database, log and/or dataset 1530, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 1506, memory 1504 and bus 1505 of the data encoding system 1502.

For example, in one or more embodiments, data encoding system 1502 can comprise a processor 1506 (e.g., computer processing unit, microprocessor, classical processor, quantum processor and/or like processor). In one or more embodiments, a component associated with data encoding system 1502, as described herein with or without reference to the one or more figures of the one or more embodiments, can comprise one or more computer and/or machine readable, writable and/or executable components and/or instructions that can be executed by processor 1506 to facilitate performance of one or more processes defined by such component(s) and/or instruction(s). In one or more embodiments, the processor 1506 can comprise the obtaining component 1510, encoding component 1512 and/or tree construction component 1514.

In one or more embodiments, the data encoding system 1502 can comprise a computer-readable memory 1504 that can be operably connected to the processor 1506. The memory 1504 can store computer-executable instructions that, upon execution by the processor 1506, can cause the processor 1506 and/or one or more other components of the data encoding system 1502 (e.g., the obtaining component 1510, encoding component 1512 and/or tree construction component 1514) to perform one or more actions. In one or more embodiments, the memory 1504 can store computer-executable components (e.g., the obtaining component 1510, encoding component 1512 and/or tree construction component 1514).

Data encoding system 1502 and/or a component thereof as described herein, can be communicatively, electrically, operatively, optically and/or otherwise coupled to one another via a bus 1505 to perform functions of non-limiting system 1500, data encoding system 1502 and/or one or more components thereof and/or coupled therewith. Bus 1505 can comprise one or more of a memory bus, memory controller, peripheral bus, external bus, local bus, quantum bus and/or another type of bus that can employ one or more bus architectures. One or more of these examples of bus 1505 can be employed to implement one or more embodiments described herein.

In one or more embodiments, data encoding system 1502 can be coupled (e.g., communicatively, electrically, operatively, optically and/or like function) to one or more external systems, such as a quantum system 401, sources and/or devices (e.g., classical and/or quantum computing devices, communication devices and/or like devices), such as via a network. In one or more embodiments, one or more of the components of the non-limiting system 1500 can reside in the cloud, and/or can reside locally in a local computing environment (e.g., at a specified location(s)).

In addition to the processor 1506 and/or memory 1504 described above, data encoding system 1502 can comprise one or more computer and/or machine readable, writable and/or executable components and/or instructions that, when executed by processor 1506, can facilitate performance of one or more operations defined by such component(s) and/or instruction(s).

Next, individual components of the data encoding system 1502 will be detailed.

Referring first to the obtaining component 1510, the obtaining component 1510 generally can determine, find, locate, download, receive and/or otherwise obtain information of the dataset 1530 and/or access to the dataset 1530. Based on data of the dataset 1530, which can define one or more variables 1532, the obtaining component 1510 can determine and/or a set of initial vectors. For example, price, temperature and/or distance can be variables.

In one or more embodiments, the obtaining component 1510 can generate a set of initial vectors 1534 which can be normalized and/or non-normalized. These initial vectors 1534 can be encoded to a quantum register, such as the quantum register 452, by the encoding component 1512.

It is noted that discussion above relative to the quantum system 401 can apply to the quantum register 452 and a corresponding quantum system. Indeed, the portfolio valuation system 202 at FIG. 4 can be replaced by the data encoding system 1502.

Turning next to the encoding component 1512, this component generally can generate and employ a loading quantum circuit that can encode a dataset (e.g., comprising the initial vectors 1534) into a quantum register in the form of one or more corresponding quantum states. The encoding can comprise employing the set of initial vectors 1534, representing the dataset 1530, indexed over a selected dimension, such as time, and having been normalized. The encoding can comprise determining a balance between depth of the quantum circuit and width of the quantum circuit by employing a classical binary tree data structure for angles 1538 to encode the set of initial vectors 1534. These operations can be performed by the encoding component 1512 at the classical data encoding system 1502.

This encoding can be referred to bidir-orth encoding. This bidir-orth encoding is so-named because on one side, it can build upon existing bidirectional encoding, and on the other side, it can guarantee that side registers are orthogonal, thus enabling subsequent processing through swap tests. Generally, bidir-orth encoding can allow for balancing memory and time resources, or, put another way, quantum circuit width and quantum circuit depth. The bidir-orth encoding can comprise employing a set of initial vectors, representing the data set, indexed over time and having been normalized, and then determining a balance between depth of the quantum circuit and width of the quantum circuit to be defined by loading of the quantum register.

The bidir-orth encoding can be characterized by states of the form of Equation 8.

$$|\tilde{\psi}_D\rangle := \sum_{j=0}^{N-1} D_j |j\rangle |\phi_j^D\rangle. \quad \text{Equation 8}$$

At Equation 8, the second register is auxiliary, and contains states entangled to the main register, with the orthonormal property. That is, as compared to existing bidirectional encoding procedures, auxiliary states can be modified to be orthonormal (i.e., $\langle \varphi_j | \varphi_j \rangle = \delta_{i,j}$), such as at the expense of use of an additional side register of a small width $\log_2 N$, thus allowing application of the swap test. Similar to existing bidirectional encoding, the bidir-orth encoding requires classical data to be organized in a binary tree structure (FIG. 5).

For example, turning to FIG. 5, the bidir-orth encoding technique can work under an assumption of availability of a classical tree data structure for angles, and thus can employ a classical binary tree data structure for angles to encode the set of initial vectors. As illustrated at FIG. 5, a pair of classical binary tree structure representations of the dataset D, applicable to the ongoing gas example and to other examples, are illustrated. The tree structure 500 provides a state decomposition representation and the tree structure 510 provides an angle representation. The state decomposition tree structure 500 can be built (e.g., by the tree construction component 1514 at the classical data encoding system 1502) bottom up starting from a classical array, and also can be applied to unnormalized datasets. The angle representation tree structure 510 can be suited for quantum data loading and can be derived (e.g., by the tree construction component 1514 at the classical data encoding system 1502) by traveling the state decomposition tree structure 500 top-down. It is noted that for the angle representation tree structure 510, dashed nodes are redundant and can be inferred from their respective sibling.

To achieve the above, the bidir-orth encoding technique (e.g., via the encoding component 1512) employs a family of encoding techniques parameterized over a split level, s, represented by an integer in $\{1, \ldots, \log_2 N\}$, and where, for each respective vector of the set of vectors, N represents a length of the respective vector, that can steer a balance between quantum circuit depth and quantum circuit width.

The parameter s can steer the balance between circuit depth and circuit width of a quantum circuit being encoded where:
  for s=1, the width is $O(N)$ and the depth is $O(\log^2 2N)$,
  for s=$\log_2 N$, the width is $O(\log_2 N)$ and the depth is $O(N)$, and
  for s=½ $\log_2 N$, a sublinear behavior in both depth $O(\sqrt{N})$ and width $O(\sqrt{N})$ can be achieved.

Put another way, the split level can steer the balance between circuit depth and circuit width: for s=1, the width is $O(N)$ and the depth $O(\log^2 2N)$ (depth efficient), while for s=$\log_2 N$ the width is $O(\log_2 N)$ and the depth $O(N)$ (memory efficient, kin to amplitude encoding).

The data loading procedure (e.g., that can be performed by the encoding component 1512) is next detailed relative to Equation 9. Data loading can be directed by the encoding component 1512, as operation of the quantum system 401, such as through use of one or more quantum job requests 424.

The bidir-orth encoding can be represented as Equation 9, for a dataset D, to encode (e.g., by the encoding component 1512) the dataset D into quantum states, where the dataset D separately comprises one of the normalized vectors indexed over time. For example, Equation 9 can be executed separately for different variables, such as of a pair of variables.

$$|\tilde{\psi}_D\rangle := \sum_{j=0}^{N-1} D_j |j\rangle |\tilde{\phi}_j\rangle |j\rangle = \sum_{j=0}^{N-1} D_j |j\rangle |\phi_j\rangle. \quad \text{Equation 9}$$

At Equation 9, $|D_j|$ is a vector of length N, a power of 2, and a classical binary tree representation, such as the angle representation tree structure 510 is available and/or can be generated, such as by the encoding component based on the aforementioned derivation. As mentioned above, s can be any integer in $\{1, \ldots, \log_2 N\}$, called split level. As a result, a state defined by Equation 9 can be constructed in depth of Equation 10 and in width of Equation 11:

$$2^s + \frac{1}{2}(\log_2^2 N - \log_2 N - s^2 + s) + 1 = O(2^s + \log_2^2 N - s^2), \text{ and} \quad \text{Equation 10}$$

$$(s+1)N2^{-s} - 1 + \log_2 N = O((s+1)N2^{-s}). \quad \text{Equation 11}$$

Figure 16:
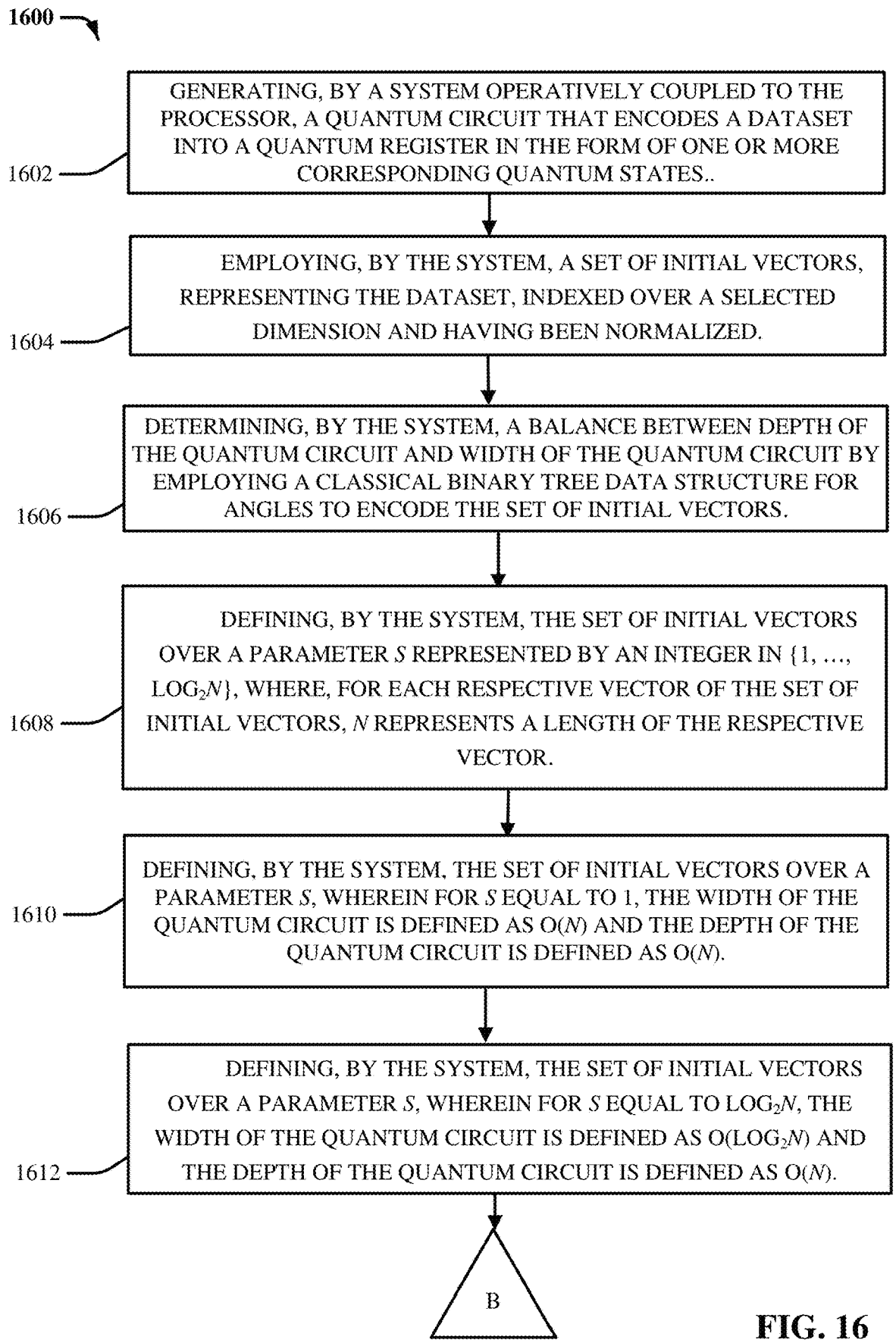
FIG. 16 illustrates a block diagram of various operations that can be performed by the non-limiting system of FIG. 15 to achieve quantum data encoding, in accordance with one or more embodiments described herein.
Figure 17:
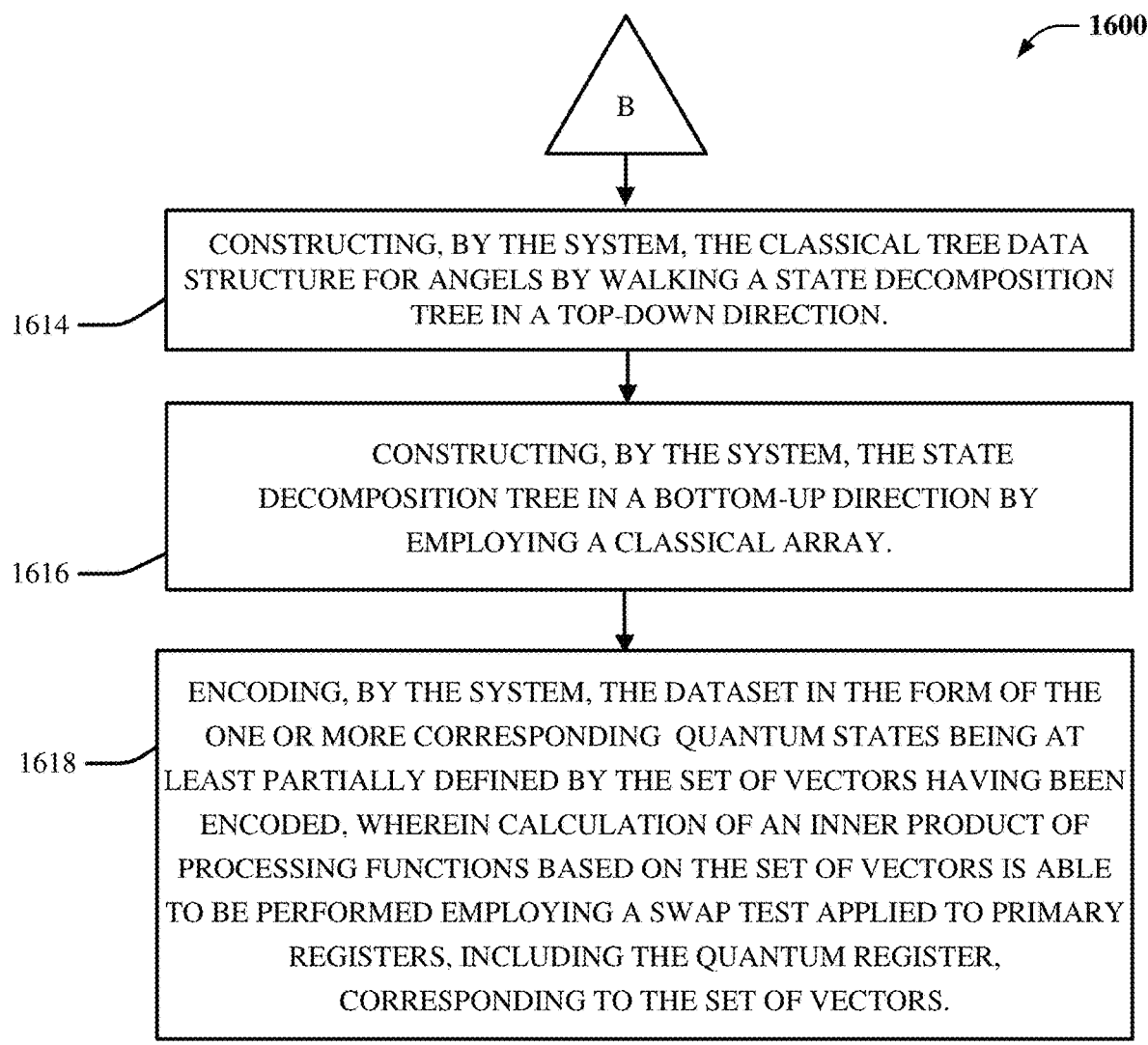
FIG. 17 illustrates a continuation of the block diagram of FIG. 16 of various operations that can be performed by the non-limiting system of FIG. 15 to achieve quantum data encoding, in accordance with one or more embodiments described herein.

As a summary of the above-described components, discussion turns next to FIGS. 16 and 17, illustrating a flow diagram of an example, non-limiting method 1600 that is described to summarize a process to perform portfolio valuation in accordance with one or more embodiments described herein, such as the non-limiting system 1500 of FIG. 15.

At 1602, the non-limiting method 1600 can comprise generating, by a system operatively coupled to a processor (e.g., encoding component 1512), a quantum circuit that encodes a dataset (e.g., data set 1530) into a quantum register (e.g., quantum register 452) in the form of one or more corresponding quantum states. The generating can be performed by the encoding component 1512 at the classical data encoding system 1502.

At 1604, the encoding (1602) of the non-limiting method 1600 can comprise employing, by the system (e.g., encoding component 1512), a set of initial vectors (e.g., initial vectors 1534), representing the dataset, indexed over a selected dimension (or one or more selected dimensions) and having been normalized. The employing can be performed by the encoding component 1512 at the classical data encoding system 1502.

At 1606, the encoding (1602) of the non-limiting method 1600 can comprise determining, by the system (e.g., encoding component 1512), a balance between depth of the quantum circuit and width of the quantum circuit by employing a classical binary tree data structure for angles (e.g., tree structure 510) to encode the set of initial vectors. The determining can be performed by the encoding component 1512 at the classical data encoding system 1502.

At 1608, the encoding (1602) of the non-limiting method 1600 can comprise defining, by the system (e.g., encoding component 212), the set of initial vectors over a parameter s represented by an integer in $\{1, \ldots, \log_2 N\}$, where, for each respective vector of the set of initial vectors, N represents a length of the respective vector. The defining can be performed by the encoding component 1512 at the classical data encoding system 1502.

At 1610, the defining (1608) of the non-limiting method 1600 can comprise defining by the system (e.g., encoding component 212), the set of initial vectors over a parameter s, wherein for s equal to 1, the width of the quantum circuit is defined as $O(N)$ and the depth of the quantum circuit is defined as $O(\log_2^2 N)$. The defining can be performed by the encoding component 1512 at the classical data encoding system 1502.

At 1612, the defining (1608) of the non-limiting method 1600 can comprise defining by the system (e.g., encoding component 212), the set of initial vectors over a parameter s, wherein for s equal to $\log_2 N$, the width of the quantum circuit is defined as $O(\log_2 N)$ and the depth of the quantum circuit is defined as $O(N)$. The defining can be performed by the encoding component 1512 at the classical data encoding system 1502.

At 1614, the non-limiting method 1600 can comprise constructing, by the system (e.g., tree construction component 1514), the classical tree data structure for angels by walking a state decomposition tree (e.g., state decomposition tree structure 500) in a top-down direction. The constructing can be performed by the tree construction component 1514 at the classical data encoding system 1502.

At 1616, the non-limiting method 1600 can comprise constructing, by the system (e.g., tree construction component 1514), the state decomposition tree in a bottom-up direction by employing a classical array. The constructing can be performed by the tree construction component 1514 at the classical data encoding system 1502.

At 1618, the encoding (1602) of the non-limiting method 1600 can comprise encoding, by the system (e.g., the encoding component 1512) the dataset in the form of the one or more corresponding quantum states being at least partially defined by the set of vectors having been encoded, wherein calculation of an inner product of processing functions based on the set of vectors is able to be performed employing a swap test applied to primary registers, including the quantum register, corresponding to the set of vectors. This encoding can at least partially employ the quantum system 401, such as through direction of the quantum system by the data encoding system 1502 through use of one or more quantum job requests 424 by the encoding component 1512. For example, the encoding component 1512 can direct loading of the quantum register 452 and primary registers. The quantum system 401 can subsequently operate employing one or more of these registers to enable return of measured values to the classical data encoding system 1502 for calculation of one or more inner products by the classical data encoding system 1502.

An advantage of such system, computer-implemented method and/or computer program product can be provision of an optimal encoding strategy for representing classical data on a quantum processor that optimizes a trade off between quantum circuit depth and quantum circuit width. As a result, a complexity in a resulting quantum circuit can be reduced. As another result, error percentage throughout the encoding, and throughout a volume approximation employing the encoding, can be reduced. These one or more reductions can be at least partially due to reduction in noise in a corresponding quantum circuit being executed. Furthermore, the resulting encoding can be compatible with a variety of quantum operations, including a swap test.

Non-Linear Transformation Using QHP and Dynamic Stopping

Figure 18:
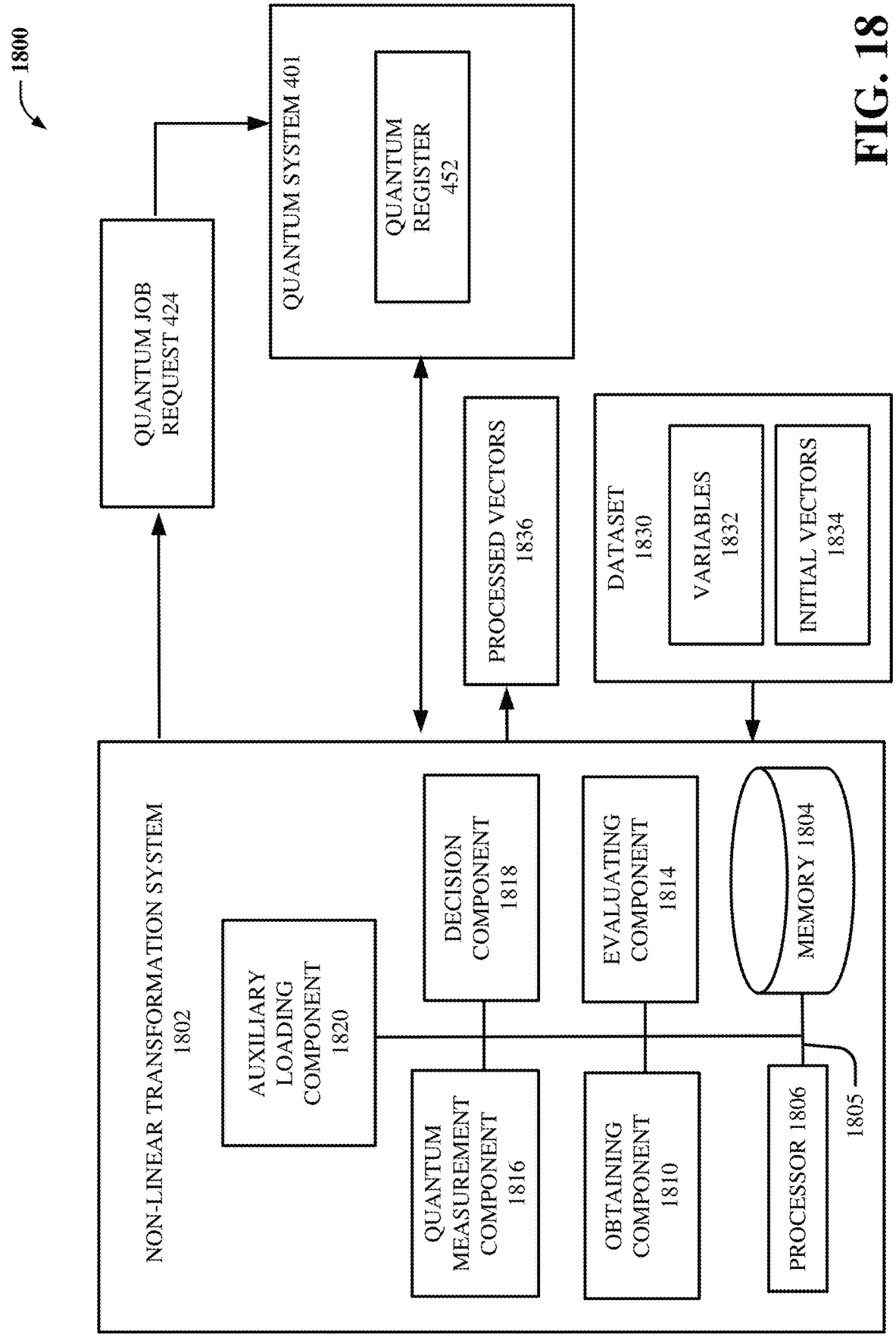
FIG. 18 illustrates a block diagram of another example, non-limiting system that can facilitate quantum circuit dynamic stopping, in accordance with one or more embodiments described herein.

Turning next to FIG. 18, a non-linear transformation technique, including dynamic stopping, is detailed.

Challenges of iterative operations executed in a quantum circuit can comprise error propagation from one iteration to another, thus further compounding the error and noise in some cases. Further, until measurements are taken at completion of execution of a quantum circuit, this error and noise can be unknown. Indeed, an output of such iterations can be generally indistinguishable from noise where error has propagated sufficiently.

To account for one or more of these deficiencies of existing quantum circuit execution techniques, a linear transformation technique, including dynamic stopping, can be employed. The use of dynamic stopping can allow for use of a dynamic circuit, which can offer an opportunity to trade off circuit depth and circuit width, which can be the difference between a quantum circuit that works well and a quantum circuit having an output that is generally indistinguishable from noise.

Dynamic circuits can incorporate classical processing within the coherence time of the qubits being operated upon. That is, dynamic circuits, and thus the non-linear transformation system 1802, can make use of mid-circuit measurements and perform feed-forward operations, using the values produced by measurements to determine what gates to apply next, or whether to stop execution of the quantum circuit altogether, such as due to a quantity of error already present in the measurements. As a result, a processed vector 1836 can be output from the non-linear transformation system 1802 with reduced error and increased accuracy having been established.

FIG. 18 illustrates a diagram of an example, non-limiting system 1800 that can facilitate non-linear transformation using dynamic stopping, in accordance with one or more embodiments described herein.

As illustrated, the non-limiting system 1800 can comprise the non-linear transformation system 1802. The non-linear transformation system 1802, as illustrated, can comprise any suitable type of component, machine, device, facility, apparatus and/or instrument that comprises a processor and/or can be capable of effective and/or operative communication with a wired and/or wireless network. All such embodiments are envisioned. For example, non-linear transformation system 1802 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the non-linear transformation system 1802 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. The non-linear transformation system 1802 can be associated with, such as accessible via, a cloud computing environment.

The non-linear transformation system 1802 can comprise a plurality of components. The components can include a memory 1804, processor 1806, bus 1805, obtaining component 1810, evaluating component 1814, quantum measurement component 1816 and/or decision component 1818.

One or more communications between one or more components of the non-limiting system 1800, and/or between an external system, either comprising and/or facilitating access to any one or more of a database, log and/or dataset 1830, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 1806, memory 1804 and bus 1805 of the non-linear transformation system 1802.

For example, in one or more embodiments, non-linear transformation system 1802 can comprise a processor 1806 (e.g., computer processing unit, microprocessor, classical processor, quantum processor and/or like processor). In one or more embodiments, a component associated with non-linear transformation system 1802, as described herein with or without reference to the one or more figures of the one or more embodiments, can comprise one or more computer and/or machine readable, writable and/or executable components and/or instructions that can be executed by processor 1806 to facilitate performance of one or more processes defined by such component(s) and/or instruction(s). In one or more embodiments, the processor 1806 can comprise the obtaining component 1810, evaluating component 1814, quantum measurement component 1816 and/or decision component 1818.

In one or more embodiments, the non-linear transformation system 1802 can comprise a computer-readable memory 1804 that can be operably connected to the processor 1806. The memory 1804 can store computer-executable instructions that, upon execution by the processor 1806, can cause the processor 1806 and/or one or more other components of the non-linear transformation system 1802 (e.g., the obtaining component 1810, evaluating component 1814, quantum measurement component 1816 and/or decision component 1818) to perform one or more actions. In one or more embodiments, the memory 1804 can store computer-executable components (e.g., the obtaining component 1810, evaluating component 1814, quantum measurement component 1816 and/or decision component 1818).

Non-linear transformation system 1802 and/or a component thereof as described herein, can be communicatively, electrically, operatively, optically and/or otherwise coupled to one another via a bus 1805 to perform functions of non-limiting system 1800, non-linear transformation system 1802 and/or one or more components thereof and/or coupled therewith. Bus 1805 can comprise one or more of a memory bus, memory controller, peripheral bus, external bus, local bus, quantum bus and/or another type of bus that can employ one or more bus architectures. One or more of these examples of bus 1805 can be employed to implement one or more embodiments described herein.

In one or more embodiments, non-linear transformation system 1802 can be coupled (e.g., communicatively, electrically, operatively, optically and/or like function) to one or more external systems, such as a quantum system 401, sources and/or devices (e.g., classical and/or quantum computing devices, communication devices and/or like devices), such as via a network. In one or more embodiments, one or more of the components of the non-limiting system 1800 can reside in the cloud, and/or can reside locally in a local computing environment (e.g., at a specified location(s)).

In addition to the processor 1806 and/or memory 1804 described above, non-linear transformation system 1802 can comprise one or more computer and/or machine readable, writable and/or executable components and/or instructions that, when executed by processor 1806, can facilitate performance of one or more operations defined by such component(s) and/or instruction(s).

Next, individual components of the non-linear transformation system 1802 will be detailed.

Referring first to the obtaining component 1810, the obtaining component 1810 generally can determine, find, locate, download, receive and/or otherwise obtain information of the dataset 1830 and/or access to the dataset 1830. Based on data of the dataset 1830, which can define one or more variables 1832, the obtaining component 1810 can determine and/or generate a set of initial vectors. For example, price, temperature and/or distance can be variables. These processes can be performed by the obtaining component 1810 at the classical non-linear transformation system 1802.

In one or more embodiments, the obtaining component 1810 can generate a set of initial vectors 1834 which can be normalized and/or non-normalized. This process can be performed by the obtaining component 1810 at the classical non-linear transformation system 1802. These initial vectors 1834 can be encoded to a quantum register, such as the quantum register 452, by the non-linear transformation system 1802. Such encoding can be performed by the quantum system 401, such as via direction by the non-linear transformation system 1802 through use of one or more quantum job requests 424.

It is noted that discussion above relative to the quantum system 401 can apply to the quantum register 452 and a corresponding quantum system. Indeed, the portfolio valuation system 202 at FIG. 4 can be replaced by the non-linear transformation system 1802.

Turning next to the evaluating component 1814, this component can be employed to perform operations for non-linear transformation of at least one time series or other vector encoded to the quantum register 452. As a result thereof, the evaluating component 1814 can output one or more processed vectors 1836 based on one or more of the initial vectors 1834. Briefly, the evaluating component 1814 can take as an input a vector (e.g., in the form of a quantum state) and can output a processed vector (e.g., in the form of a processed state).

A purpose of this non-linear transformation can be that the monomial powers calculated can be employed to calculate individual monomials of an approximating polynomial for a processing function, such as a volume function. In one or more embodiments, such processing function can be employed to approximate another function, such as a value function, an inner product, etc.

Generally, a sequence of non-linear transformations can be exploited (e.g., by the evaluating component 1814) to calculate the power $T_j^k$ for al j=0, . . . , N−1 and k=0, . . . , K, where N is the size of said vectors, j is an index (e.g., a ranging) on the slices of the selected dimensions (e.g., time slices of the time range), K is the degree of a polynomial that approximates the corresponding function, and k is an index that ranges over the monomials of the polynomial. For example, the evaluating component 214 can employ a normalized vector $[T_j]_{j=0}^{N-1}$ (e.g., a normalized time series of a variable T) being a vector of real numbers such that $\Sigma_j T_j^2=1$. The state at Equation 12 can be produced, however, to evaluate an approximating polynomial related to a function (e.g., volume function) and based on the variable T, where the powers $T_j^k$ are needed in the form of a state represented at Equation 13, for k=1, . . . , K, where $a_k$ is an appropriate scale factor represented by Equation 14.

$$|\psi_T\rangle := \sum_{j=0}^{N-1} T_j |j\rangle, \qquad \text{Equation 12}$$

$$|\psi_T^{(k)}\rangle := a_k \sum_{j=0}^{N-1} T_j^k |j\rangle, \text{ and} \qquad \text{Equation 13}$$

$$a_k := \left(\sum_j T_j^{2k}\right)^{-1/2}. \qquad \text{Equation 14}$$

It is noted that $a_k$ is an increasing finite sequence, when k grows (e.g., $a_k \geq 1 = a_1$).

Therefore, for the calculation of powers, a non-linear transformation of the quantum Hadamard product (QHP) can be employed (e.g., by the evaluating component 1814).

That is, given two states $|\psi_0\rangle$ and $|\omega_1\rangle$, their respective QHP can be the state represented by Equation 15, where $\odot$ is the QHP.

$$|\psi_0 \odot \psi_1\rangle := a \sum_{j=1}^{N-1} \langle \psi_0|j\rangle\langle\psi_1|j\rangle|j\rangle. \quad \text{Equation 15}$$

Further, the QHP can be iterated (e.g., via instruction of the evaluating component 214 to the quantum system 401) to compute the Hadamard product of multiple vectors, hence producing higher-order powers. For example, states in the form $|\psi_T^{(k)}\rangle$, as defined at Equation 13, can be obtained by loading k copies of $|\psi_T\rangle$ as input states and calculating their QHP's, as represented at Equation 16.

$$|\psi_T^{(k)}\rangle := \left|\bigodot^k \psi_T\right\rangle. \quad \text{Equation 16}$$

Referring now to FIG. 7, in addition to still referring to FIG. 18, generally, the evaluating component 1814 can employ a quantum register (e.g., quantum register 452 or of another quantum system) to output the set of processed vectors 1836 based on a set of variables 1832 indexed over a time range using a non-linear transformation technique using the QHP and employing dynamic stopping to satisfy Equation 16. This employing can be based on direction of the quantum system 401 through use of one or more quantum job requests 424 by the evaluating component 1814.

The quantum circuit diagram 700 of FIG. 7 illustrates use of mid-circuit measurements and/or mid-circuit resets, and also dynamic stopping.

As used herein, and as mentioned above, dynamic stopping is a technique that can employ a feature of dynamic circuits to incorporate classical processing within the coherence time of qubits of the quantum register. Dynamic circuits can incorporate classical processing within the coherence time of the qubits being operated upon. That is, the non-linear transformation system 1802 can make use of mid-circuit measurements and perform feed-forward operations, using the values produced by measurements to determine what gates to apply next, or whether to stop execution of the quantum circuit altogether, such as due to a quantity of error already present in the measurements. As a result, the dynamic stopping can offer an opportunity to trade off circuit depth and circuit width, which can be the difference between a quantum circuit that works well and a quantum circuit having an output that is generally indistinguishable from noise.

For example, the evaluating component 1814 can instruct (e.g., by way of a quantum job request 424 to the corresponding quantum system) to sequentially execute a set of iterations of a quantum circuit implementation of a QHP, determine a measurement for the quantum circuit during execution of the quantum circuit (e.g., mid-circuit), and, based on the measurement from the quantum system 401 (e.g., a quantum measurement readout), generate a decision to continue or to stop execution of the quantum circuit. The evaluating component 1814 can employ the quantum measurement component 1816 to receive the quantum measurement readout from the quantum system and the decision component 1818 to generate the decision.

That is, mid-circuit information (e.g., performed by the quantum system) can be received by the quantum measurement component 1816, allowing the quantum measurement component 1816 to determine a measurement for the quantum circuit being executed, during execution of the quantum circuit (i.e., mid-circuit).

As such, the mid-circuit information can be employed by the quantum measurement component 1816 to identify some characteristics of the circuit output for a given shot, while it is being executed.

Based on the determined measurement, the decision component 1818, at the classical non-linear transformation system 1802, can generate a decision to stop execution of the quantum circuit and the mid-circuit instance or to continue the execution of the quantum circuit. These measurements can be determined and decisions made at a plurality of times along the execution of the quantum circuit, such as after each iteration of a quantum circuit portion of the quantum circuit. If said characteristics are enough to reconstruct the shot output, dynamic stopping can abort the execution before execution of the full quantum circuit, thus saving execution time and limiting error propagation. This can decrease the average depth of a circuit and hence the accumulated gate errors as well.

For example, the quantum circuit diagram 700 can employ a k=4 with mid-measurements and mid-resets, employing k−1=3 iterations. A quantum circuit execution can be controlled by this dynamic stopping technique with an if-else loop and using conditional mid-circuit measurements. The evaluating component 214 can thus instruct the corresponding quantum system to employ a classical computation after the measurement of box 704 and to stop at the first dashed line 702 if the measurement for the "else" branch of the if-else determination (e.g., from box 704) is not 0 (e.g., dynamic stopping condition tests as false). Otherwise, the quantum circuit execution can continue, and again a classical computation can be employed for box 708, with the quantum circuit being conditionally stopped, this time at the second dashed line 706, if the measurement from the box 708 is not 0. Otherwise, the quantum circuit execution can then continue to completion.

Figure 19:
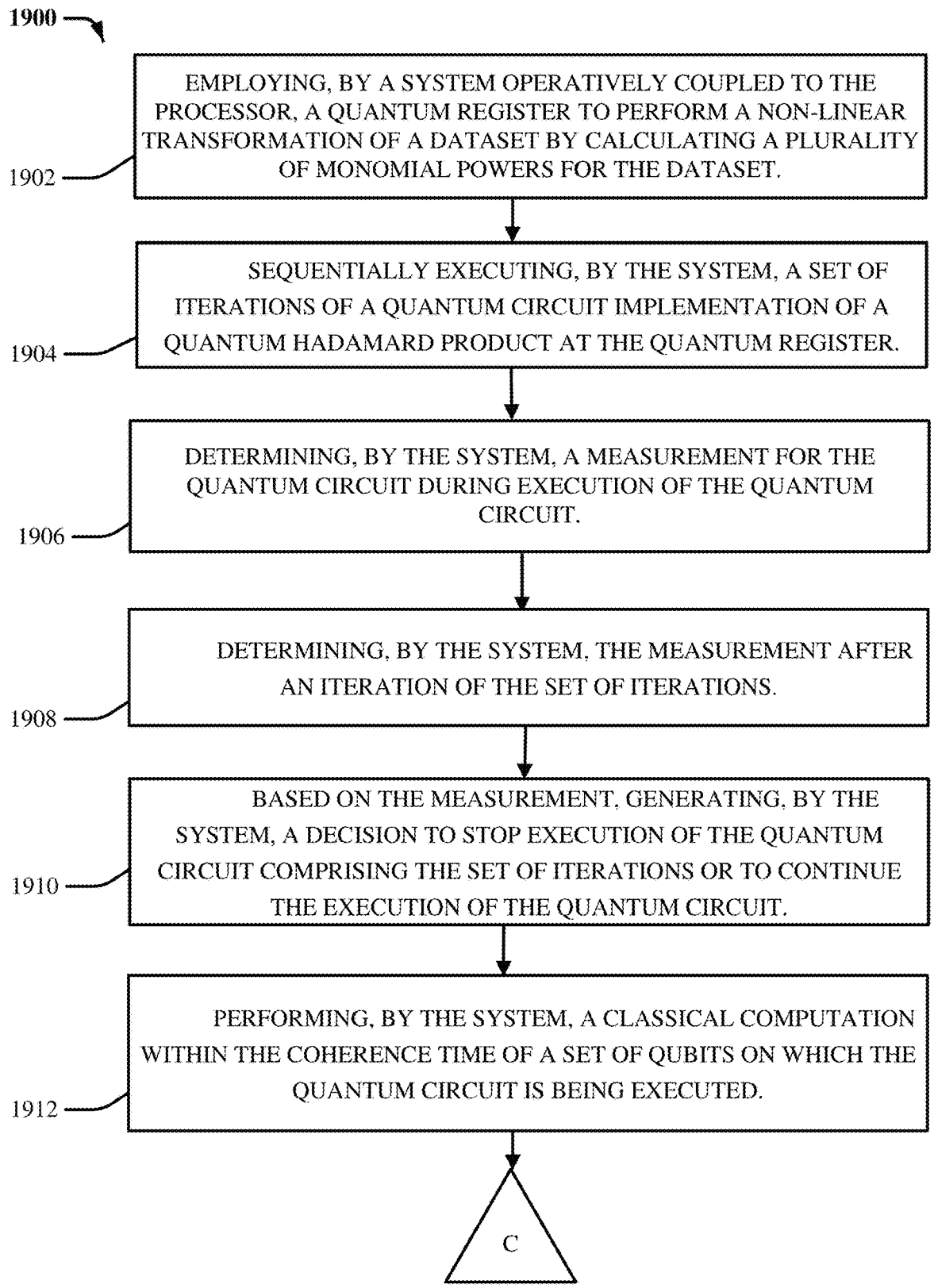
FIG. 19 illustrates a block diagram of various operations that can be performed by the non-limiting system of FIG. 18 to achieve quantum circuit dynamic stopping, in accordance with one or more embodiments described herein.
Figure 20:
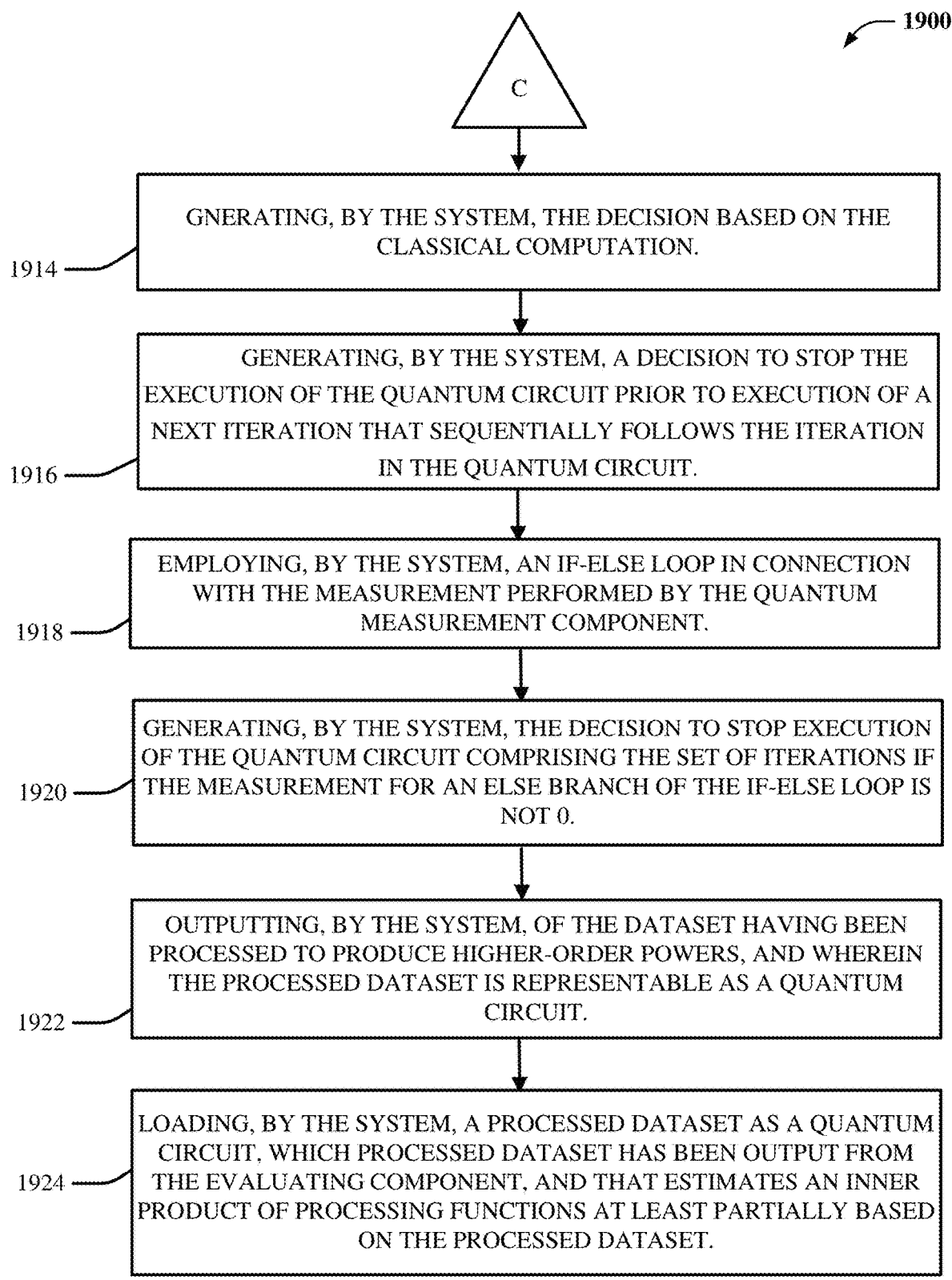
FIG. 20 illustrates a continuation of the block diagram of FIG. 19 of various operations that can be performed by the non-limiting system of FIG. 18 to achieve quantum circuit dynamic stopping, in accordance with one or more embodiments described herein.

As a summary of the above-described components, discussion turns next to FIGS. 19 and 20, illustrating a flow diagram of an example, non-limiting method 1900 that is described to summarize a process to perform portfolio valuation in accordance with one or more embodiments described herein, such as the non-limiting system 1800 of FIG. 18.

At 1902, the non-limiting method 1900 can comprise employing, by a system operatively coupled to a processor (e.g., evaluating component 1814), a quantum register (e.g., quantum register 452) to perform a non-linear transformation of a dataset (e.g., dataset 1830) by calculating a plurality of monomial powers for the dataset. That is, the evaluating component 1814 can employ the quantum system 401 through use of one or more quantum job requests 424. The quantum system 401 can operate one or more quantum circuits and return one or more measurements to the classical non-linear transformation system 1802, which in turn can employ the measurements for subsequent non-linear transformation calculations.

At 1904, the calculating (1902) of the non-limiting method 1900 can comprise sequentially executing, by the system (e.g., evaluating component 1814), a set of iterations of a quantum circuit implementation of a quantum Hadamard product at the quantum register. That is, the evaluating component 1814 can employ the quantum system 401 through use of one or more quantum job requests 424. The quantum system 401 can operate one or more quantum circuits and return one or more measurements to the classical non-linear transformation system 1802, which in turn can employ the measurements for subsequent non-linear transformation calculations.

At 1906, the non-limiting method 1900 can comprise determining, by the system (e.g., quantum measurement component 1816), a measurement for the quantum circuit during execution of the quantum circuit. For example, the measurement can be based on a readout or other information from a corresponding quantum system having and/or employing the quantum register. This determining can be performed at the non-linear transformation system 1802.

At 1908, the determining (1906) of the non-limiting method 1900 can comprise determining, by the system (e.g., quantum measurement component 1816), the measurement after an iteration of the set of iterations. This determining can be performed at the non-linear transformation system 1802.

At 1910, the non-limiting method 1900 can comprise based on the measurement, generating, by the system (e.g., decision component 1818), a decision to stop execution of the quantum circuit comprising the set of iterations or to continue the execution of the quantum circuit. This generating can be performed at the non-linear transformation system 1802.

At 1912, the non-limiting method 1900 can comprise performing, by the system (e.g., decision component 1818), a classical computation within the coherence time of a set of qubits on which the quantum circuit is being executed. This calculating can be performed at the non-linear transformation system 1802.

At 1914, the non-limiting method 1900 can comprise generating, by the system (e.g., decision component 1818), the decision based on the classical computation. This generating can be performed at the non-linear transformation system 1802.

At 1916, the non-limiting method 1900 can comprise generating, by the system (e.g., decision component 1818), a decision to stop the execution of the quantum circuit prior to execution of a next iteration that sequentially follows the iteration in the quantum circuit. This generating can be performed at the non-linear transformation system 1802.

At 1918, the non-limiting method 1900 can comprise employing, by the system (e.g., evaluating component 1814), an if-else loop in connection with the measurement performed by the quantum measurement component. This employing can be performed at the non-linear transformation system 1802.

At 1920, the non-limiting method 1900 can comprise generating, by the system (e.g., decision component 1818), the decision to stop execution of the quantum circuit comprising the set of iterations if the measurement for an else branch of the if-else loop is not 0. This generating can be performed at the non-linear transformation system 1802.

At 1922, the non-limiting method 1900 can comprise outputting, by the system (e.g., evaluating component 1814), of the dataset having been processed to produce higher-order powers, and wherein the processed dataset is representable as a quantum circuit. This outputting can be performed at the non-linear transformation system 1802.

At 1924, the non-limiting method 1900 can comprise loading, by the system (e.g., auxiliary loading component 1820), a processed dataset as a quantum circuit, which processed dataset has been output from the evaluating component, and that estimates an inner product of processing functions at least partially based on the processed dataset. That is, the auxiliary loading component 1820 can direct the loading by the quantum system 401 through use of one or more quantum job requests 424.

An advantage of such system, computer-implemented method and/or computer program product can be enablement of dynamic stopping of a quantum circuit, employing a feature of dynamic circuits to incorporate classical processing within the coherence time of qubits of the quantum register. That is, the embodiment can make use of mid-circuit measurements and perform feed-forward operations, using the values produced by measurements to determine what gates to apply next, or whether to stop execution of the quantum circuit altogether, such as due to a quantity of error already present in the measurements.

Additional Summary

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

Where description indicates a process as taking place at a classical system or a quantum system, it is noted that in one or more other embodiments, such process can take place, at least partially, at the other of the classical system or the quantum system, where suitable and/or where such other system is configured to perform the process.

In summary, one or more systems, computer program products and/or computer-implemented methods provided herein relate to a process to determine valuation of provision of an aspect, such as a product and/or service, over one or more selected dimensions, such as a time (e.g., a time range). A system can comprise a memory that stores computer executable components, and a processor, operably coupled to the memory, that executes the computer executable components comprising: an evaluating component that employs a quantum register to output a processed vector based on a first variable, of set of variables indexed over a selected dimension, and a valuation component that approximates a value function and that, based on the approximating, outputs a valuation amount representing provision of an aspect over the selected dimension, wherein the value function is a function of an inner product of a set of processing functions that are based on the set of variables, including the first variable, wherein a first processing function of the set of processing functions and of the inner product is based on the processed vector, and wherein the set of variables correspond to conditions defining the provision of the aspect.

Indeed, in view of the one or more embodiments described herein, a practical application of the systems, computer-implemented methods and/or computer program products described herein can be ability to speedup portfolio evaluations based on two or more variables through quantum speedup. As a result, such evaluations can be performed more often and likewise with greater accuracy due to the processes involved with the quantum speedup. Furthermore, due to one or more processes described above, such as the bidir-orth encoding, quantum circuit depth and/or width can be reduced, thus allowing for a more efficient use of a quantum register. Also, due to one or more processes described above, such as QHP computation coupled with dynamic stopping, coherent time of qubits can be used more efficiently and/or not wasted where error is too great at a point of mid-circuit execution. These are each useful and practical applications of computers, in various cases providing enhanced (e.g., improved and/or optimized) operation of the hardware and/or software components of the systems being employed. Overall, such computerized tools can constitute a concrete and tangible technical improvement in the fields of portfolio evaluation, quantum encoding and/or quantum circuit execution.

Furthermore, one or more embodiments described herein can be employed in a real-world system based on the disclosed teachings. For example, one or more embodiments described herein can function with a quantum system that can receive as input a quantum job request comprising a quantum source code for execution a quantum amplitude estimation comprising one or more operations as described herein, and that can measure a real-world qubit state of one or more qubits, such as superconducting qubits, of the quantum system, by executing the quantum source code at some level of the quantum system.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to quantum circuit execution, as compared to existing systems and/or techniques. Systems, computer-implemented methods and/or computer program products providing performance of these processes are of great utility in the fields of portfolio evaluation, quantum encoding and/or quantum circuit execution, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively automatically perform quantum circuit encoding, load a quantum register, perform quantum calculations and/or measure a state of qubit as the one or more embodiments described herein can provide these processes. Moreover, neither can the human mind nor a human with pen and paper conduct one or more of these processes, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

A system comprises a memory that stores computer executable components; and a processor, operably coupled to the memory, and that executes the computer executable components stored in the memory, wherein the computer executable components comprise: an evaluating component that employs a quantum register to output a processed vector based on a first variable, of a set of variables indexed over a selected dimension; and a valuation component that approximates a value function and that, based on the approximating, outputs a valuation amount representing provision of an aspect over the selected dimension, wherein the value function is a function of an inner product of a set of processing functions that are based on the set of variables, including the first variable, wherein a first processing function of the set of processing functions and of the inner product is based on the processed vector, and wherein the set of variables correspond to conditions defining the provision of the aspect.

The system of the previous paragraph, further comprising: an encoding component that generates a quantum circuit that encodes a dataset into the quantum register in the form of one or more corresponding quantum states, wherein the encoding comprises employing a set of initial vectors representing the dataset, indexed over the selected dimension, and having been normalized.

The system of the previous paragraph wherein the encoding further comprises determining a balance between depth of the quantum circuit and width of the quantum circuit by employing a classical binary tree data structure for angles to encode the set of initial vectors.

The system of any previous paragraph, wherein the set of initial vectors are defined over a parameter s represented by an integer in $\{1, \ldots, \log_2 N\}$, and wherein, for each respective vector of the set of initial vectors, N represents a length of the respective vector.

The system of any previous paragraph, wherein the evaluating component employs the quantum register to perform a non-linear transformation of the set of initial vectors by calculating a plurality of monomial powers for the set of initial vectors, wherein the calculating comprises, based on a measurement obtained during execution of a quantum circuit implementation of the non-linear transformation, generating a decision to stop execution of the quantum circuit or to continue the execution of the quantum circuit.

The system of any previous paragraph, further comprising: a quantum amplitude estimation component that loads a processed dataset, comprising the processed vector, as a quantum circuit, which processed dataset has been output from the evaluating component, and that directs estimation of the inner product of the processing functions.

The system of any previous paragraph, wherein performing the non-linear transformation by the evaluating component allows for output of the processed vector being representable as a quantum circuit at the quantum register.

The system of any previous paragraph, wherein the evaluating component employs the quantum register to perform a non-linear transformation of a set of initial vectors by calculating a plurality of monomial powers for the set of initial vectors, wherein the calculating comprises sequentially executing a set of iterations of a quantum circuit implementation of a quantum Hadamard product at the quantum register; determining a measurement for the quantum circuit during execution of the quantum circuit; and based on the measurement, generating a decision to stop execution of the quantum circuit comprising the set of iterations or to continue the execution of the quantum circuit.

A computer-implemented method comprises employing, by a system operably coupled to a processor, a quantum register to output processed vector based on a first variable of a set of variables indexed over a selected dimension; approximating, by the system, a value function, wherein the value function is a function of an inner product of a set of processing functions that are based on the set of variables, including the first variable, and wherein a first processing function of the set of processing functions and of the inner product is based on the processed vector; and based on the approximating, outputting, by the system, a valuation amount representing provision of an aspect over the selected dimension, wherein the set of variables correspond to conditions defining the provision of the aspect.

The computer-implemented method of the previous paragraph, further comprising: generating, by the system, a quantum circuit that encodes a dataset into the quantum register in the form of one or more corresponding quantum states, wherein the encoding comprises employing a set of initial vectors representing the dataset, indexed over the selected dimension, and having been normalized.

The computer-implemented method of the previous paragraph, wherein the set of initial vectors are defined over a parameter s represented by an integer in $\{1, \ldots, \log_2 N\}$, and wherein, for each respective vector of the set of initial vectors, N represents a length of the respective vector.

The computer-implemented method of any previous paragraph, further comprising: employing, by the system, the quantum register to perform a non-linear transformation of the set of initial vectors by calculating a plurality of monomial powers for the set of initial vectors, wherein the calculating comprises based on a measurement obtained during execution of a quantum circuit implementation of the non-linear transformation, generating a decision to stop execution of the quantum circuit or to continue the execution of the quantum circuit.

The computer-implemented method of any previous paragraph, further comprising: loading, by the system, a processed dataset, comprising the processed vector, as a quantum circuit; and directing, by the system, estimation of the inner product of the processing functions.

The computer-implemented method any previous paragraph, further comprising: employing, by the system, the quantum register to perform a non-linear transformation of a set of initial vectors by calculating a plurality of monomial powers for the set of initial vectors, wherein the calculating comprises sequentially executing a set of iterations of a quantum circuit implementation of a quantum Hadamard product at the quantum register; determining a measurement for the quantum circuit during execution of the quantum circuit; and based on the measurement, generating a decision to stop execution of the quantum circuit comprising the set of iterations or to continue the execution of the quantum circuit.

A computer program product facilitating valuation of a portfolio, the computer program product comprising a computer readable storage medium having program instructions embodied therewith, the program instructions executable by a processor to cause the processor to: employ, by the processor, a quantum register to output a processed vector based on a first variable, of a set of variables indexed over a selected dimension; approximate, by the processor, a value function, wherein the value function is a function of an inner product of a set of processing functions that are based on the set of variables, including the first variable, and wherein a first processing function of the set of processing functions and of the inner product is based on the processed vector; and based on the approximating, output, by the processor, a valuation amount representing provision of an aspect over the selected dimension, wherein the set of variables correspond to conditions defining the provision of the aspect.

The computer program product of the previous paragraph, wherein the program instructions are further executable by a processor to cause the processor to: generate, by the processor, a quantum circuit that encodes a dataset into the quantum register in the form of one or more corresponding quantum states, wherein the encoding comprises employing a set of initial vectors representing the dataset, indexed over the selected dimension, and having been normalized.

The computer program product of the previous paragraph, wherein the set of initial vectors are defined over a parameter s represented by an integer in $\{1, \ldots, \log_2 N\}$, and wherein, for each respective vector of the set of initial vectors, N represents a length of the respective vector.

The computer program product of any previous paragraph, wherein the program instructions are further executable by a processor to cause the processor to: employ, by the processor, the quantum register to perform a non-linear transformation of the set of initial vectors by calculating a plurality of monomial powers for the set of initial vectors, wherein the calculating comprises based on a measurement obtained during execution of a quantum circuit implementation of the non-linear transformation, generating a decision to stop execution of the quantum circuit or to continue the execution of the quantum circuit.

The computer program product of any previous paragraph, wherein the program instructions are further executable by a processor to cause the processor to: load, by the processor, a processed dataset, comprising the processed vector, as a quantum circuit; and direct, by the processor, estimation of the inner product of the processing functions.

The computer program product of any previous paragraph, wherein the program instructions are further executable by a processor to cause the processor to: employ, by the processor, the quantum register to perform a non-linear transformation of a set of initial vectors by calculating a plurality of monomial powers for the set of initial vectors, wherein the calculating comprises sequentially executing a set of iterations of a quantum circuit implementation of a quantum Hadamard product at the quantum register; determining a measurement for the quantum circuit during execution of the quantum circuit; and based on the measurement, generating a decision to stop execution of the quantum circuit comprising the set of iterations or to continue the execution of the quantum circuit.

A system comprises a memory that stores computer executable components; and a processor, operably coupled to the memory, and that executes the computer executable components stored in the memory, wherein the computer executable components comprise: an encoding component that generates a quantum circuit that encodes a dataset into a quantum register in the form of one or more corresponding quantum states, wherein the encoding comprises employing a set of vectors representing the dataset, indexed over a selected dimension, and having been normalized, and wherein the encoding comprises determining a balance between depth of the quantum circuit and width of the quantum circuit by employing a classical binary tree data structure for angles to encode the set of vectors.

The system of the previous paragraph, wherein the set of vectors are defined over a parameter s represented by an integer in $\{1, \ldots, \log_2 N\}$, and wherein, for each respective vector of the set of vectors, N represents a length of the respective vector.

The system of any previous paragraph, wherein the quantum states are at least partially defined by the set of vectors having been encoded, and wherein calculation of an inner product of processing functions based on the set of vectors is able to be performed employing a swap test applied to primary registers, including the quantum register, corresponding to the set of vectors.

The system of any previous paragraph, further comprising: a tree construction component that constructs the classical tree data structure for angles by walking a state decomposition tree in a top-down direction.

The system of the previous paragraph, wherein the tree construction component further constructs the state decomposition tree in a bottom-up direction by employing a classical array.

The system of any previous paragraph, wherein for s equal to 1, the width of the quantum circuit is defined as $O(N)$ and the depth of the quantum circuit is defined as $O(\log_2^2 N)$.

The system of any previous paragraph, wherein for s equal to $\log_2 N$, the width of the quantum circuit is defined as $O(\log_2 N)$ and the depth of the quantum circuit is defined as $O(N)$.

A system comprises a memory that stores computer executable components; and a processor, operably coupled to the memory, and that executes the computer executable components stored in the memory, wherein the computer executable components comprise: an evaluating component that employs a quantum register to perform a non-linear transformation of a dataset by calculating a plurality of monomial powers for the dataset, wherein the calculating comprises sequentially executing a set of iterations of a quantum circuit implementation of a quantum Hadamard product at the quantum register; a quantum measurement component that determines a measurement for the quantum circuit during execution of the quantum circuit; and a decision component that, based on the measurement, generates a decision to stop execution of the quantum circuit comprising the set of iterations or to continue the execution of the quantum circuit.

The system of the previous paragraph, wherein the measurement is a mid-circuit measurement that is taken after initiation of the quantum circuit and before completion of execution of the quantum circuit.

The system of any previous paragraph, wherein the quantum measurement component determines the measurement after an iteration of the set of iterations, and wherein the decision component generates a decision to stop the execution of the quantum circuit prior to execution of a next iteration that sequentially follows the iteration in the quantum circuit.

The system of any previous paragraph, wherein the decision component performs a classical computation within the coherence time of a set of qubits on which the quantum circuit is being executed, and wherein the decision component generates the decision based on the classical computation.

The system of any previous paragraph, wherein performing the non-linear transformation by the evaluating component allows for output, by the evaluating component, of the dataset having been processed to produce higher-order powers, and wherein the processed dataset is representable as a quantum circuit.

The system of any previous paragraph, further comprising: an auxiliary loading component that loads a processed dataset as a quantum circuit, which processed dataset has been output from the evaluating component, and that estimates an inner product of processing functions at least partially based on the processed dataset.

The system of any previous paragraph, wherein the evaluating component employs an if-else loop in connection with the measurement performed by the quantum measurement component, and wherein the decision component generates the decision to stop execution of the quantum circuit comprising the set of iterations if the measurement for an else branch of the if-else loop is not 0.

Computing Environment Description

Figure 21:
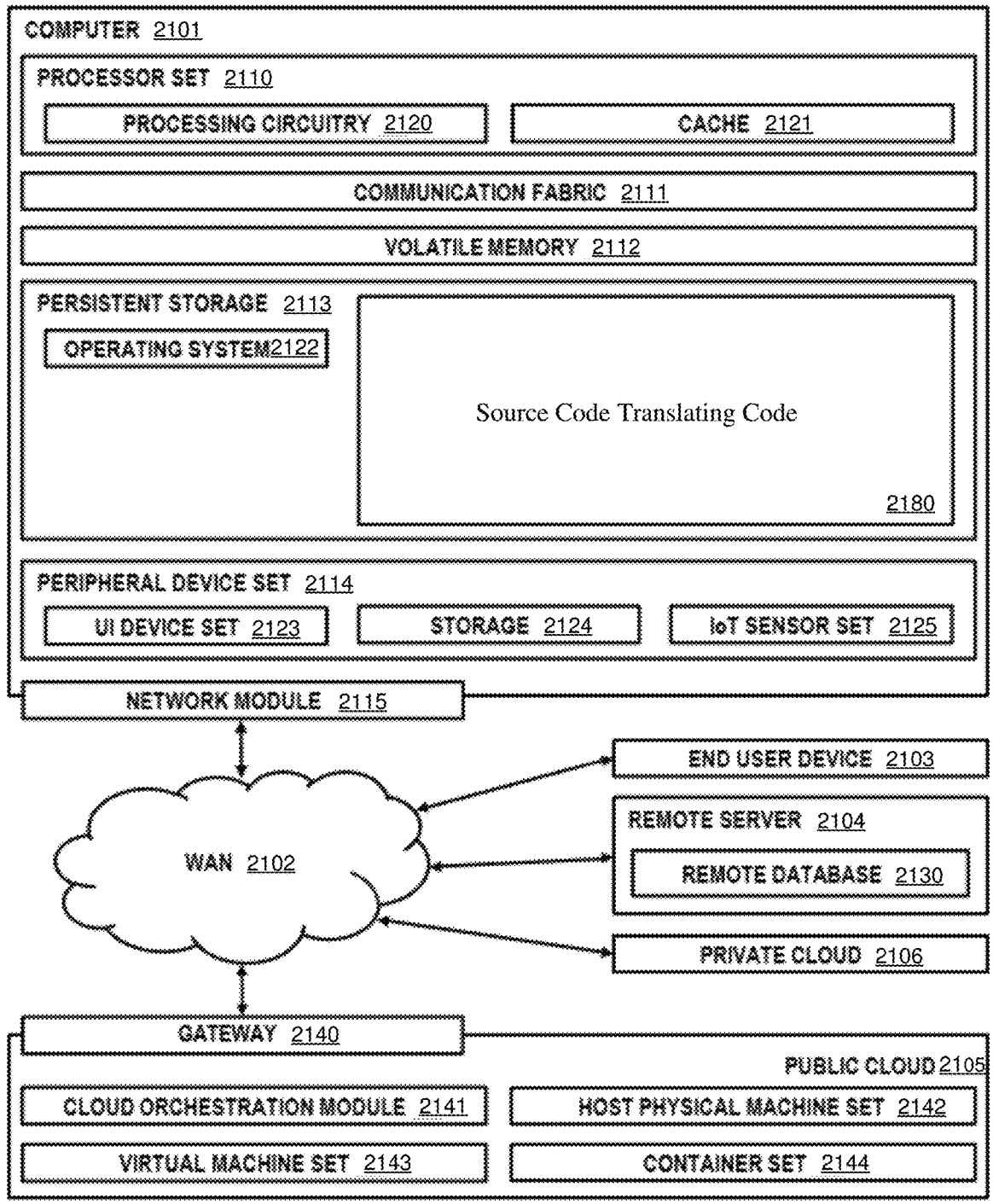
FIG. 21 illustrates a block diagram of an example, non-limiting, operating environment in which one or more embodiments described herein can be facilitated.

Turning next to FIG. 21, a detailed description is provided of additional context for the one or more embodiments described herein at FIGS. 1-20.

FIG. 21 and the following discussion are intended to provide a brief, general description of a suitable computing environment 1400 in which one or more embodiments described herein at FIGS. 1-20 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 2100 contains an example of an environment for the execution of at least some of the computer code involved in performing the inventive methods, such as translation of an original source code based on a configuration of a target system by the quantum operation execution code 2180. In addition to block 2180, computing environment 2100 includes, for example, computer 2101, wide area network (WAN) 2102, end user device (EUD) 2103, remote server 2104, public cloud 2105, and private cloud 2106. In this embodiment, computer 2101 includes processor set 2110 (including processing circuitry 2120 and cache 2121), communication fabric 2111, volatile memory 2112, persistent storage 2113 (including operating system 2122 and block 2180, as identified above), peripheral device set 2114 (including user interface (UI), device set 2123, storage 2124, and Internet of Things (IoT) sensor set 2125), and network module 2115. Remote server 2104 includes remote database 2130. Public cloud 2105 includes gateway 2140, cloud orchestration module 2141, host physical machine set 2142, virtual machine set 2143, and container set 2144.

COMPUTER 2101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 2130. As is well understood in the art of computer technology, and depending upon the technology, performance of a computer-implemented method may be distributed among multiple computers and/or between multiple locations. On the other hand, in this presentation of computing environment 2100, detailed discussion is focused on a single computer, specifically computer 2101, to keep the presentation as simple as possible. Computer 2101 may be located in a cloud, even though it is not shown in a cloud in FIG. 21. On the other hand, computer 2101 is not required to be in a cloud except to any extent as may be affirmatively indicated.

PROCESSOR SET 2110 includes one, or more, computer processors of any type now known or to be developed in the future. Processing circuitry 2120 may be distributed over multiple packages, for example, multiple, coordinated integrated circuit chips. Processing circuitry 2120 may implement multiple processor threads and/or multiple processor cores. Cache 2121 is memory that is located in the processor chip package(s) and is typically used for data or code that should be available for rapid access by the threads or cores running on processor set 2110. Cache memories are typically organized into multiple levels depending upon relative proximity to the processing circuitry. Alternatively, some, or all, of the cache for the processor set may be located "off chip." In some computing environments, processor set 2110 may be designed for working with qubits and performing quantum computing.

Computer readable program instructions are typically loaded onto computer 2101 to cause a series of operational steps to be performed by processor set 2110 of computer 2101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 2121 and the other storage media discussed below. The program instructions, and associated data, are accessed by processor set 2110 to control and direct performance of the inventive methods. In computing environment 2100, at least some of the instructions for performing the inventive methods may be stored in block 2180 in persistent storage 2113.

COMMUNICATION FABRIC 2111 is the signal conduction paths that allows the various components of computer 2101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 2112 is any type of volatile memory now known or to be developed in the future. Examples include dynamic type random access memory (RAM) or static type RAM. Typically, the volatile memory is characterized by random access, but this is not required unless affirmatively indicated. In computer 2101, the volatile memory 2112 is located in a single package and is internal to computer 2101, but, alternatively or additionally, the volatile memory may be distributed over multiple packages and/or located externally with respect to computer 2101.

PERSISTENT STORAGE 2113 is any form of non-volatile storage for computers that is now known or to be developed in the future. The non-volatility of this storage means that the stored data is maintained regardless of whether power is being supplied to computer 2101 and/or directly to persistent storage 2113. Persistent storage 2113 may be a read only memory (ROM), but typically at least a portion of the persistent storage allows writing of data, deletion of data and re-writing of data. Some familiar forms of persistent storage include magnetic disks and solid state storage devices. Operating system 2122 may take several forms, such as various known proprietary operating systems or open source Portable Operating System Interface type operating systems that employ a kernel. The code included in block 2180 typically includes at least some of the computer code involved in performing the inventive methods.

PERIPHERAL DEVICE SET 2114 includes the set of peripheral devices of computer 2101. Data communication connections between the peripheral devices and the other components of computer 2101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 2123 may include components such as a display screen, speaker, microphone, wearable devices (such as goggles and smart watches), keyboard, mouse, printer, touchpad, game controllers, and haptic devices. Storage 2124 is external storage, such as an external hard drive, or insertable storage, such as an SD card. Storage 2124 may be persistent and/or volatile. In some embodiments, storage 2124 may take the form of a quantum computing storage device for storing data in the form of qubits. In embodiments where computer 2101 is required to have a large amount of storage (for example, where computer 2101 locally stores and manages a large database) then this storage may be provided by peripheral storage devices designed for storing very large amounts of data, such as a storage area network (SAN) that is shared by multiple, geographically distributed computers. IoT sensor set 2125 is made up of sensors that can be used in Internet of Things applications. For example, one sensor may be a thermometer and another sensor may be a motion detector.

NETWORK MODULE 2115 is the collection of computer software, hardware, and firmware that allows computer 2101 to communicate with other computers through WAN 2102. Network module 2115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 2115 are performed on the same physical hardware device. In other embodiments (for example, embodiments that utilize software-defined networking (SDN)), the control functions and the forwarding functions of network module 2115 are performed on physically separate devices, such that the control functions manage several different network hardware devices. Computer readable program instructions for performing the inventive methods can typically be downloaded to computer 2101 from an external computer or external storage device through a network adapter card or network interface included in network module 2115.

WAN 2102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 2103 is any computer system that is used and controlled by an end user (for example, a customer of an enterprise that operates computer 2101) and may take any of the forms discussed above in connection with computer 2101. EUD 2103 typically receives helpful and useful data from the operations of computer 2101. For example, in a hypothetical case where computer 2101 is designed to provide a recommendation to an end user, this recommendation would typically be communicated from network module 2115 of computer 2101 through WAN 2102 to EUD 2103. In this way, EUD 2103 can display, or otherwise present, the recommendation to an end user. In some embodiments, EUD 2103 may be a client device, such as thin client, heavy client, mainframe computer, desktop computer and so on.

REMOTE SERVER 2104 is any computer system that serves at least some data and/or functionality to computer 2101. Remote server 2104 may be controlled and used by the same entity that operates computer 2101. Remote server 2104 represents the machine(s) that collect and store helpful and useful data for use by other computers, such as computer 2101. For example, in a hypothetical case where computer 2101 is designed and programmed to provide a recommendation based on historical data, then this historical data may be provided to computer 2101 from remote database 2130 of remote server 2104.

PUBLIC CLOUD 2105 is any computer system available for use by multiple entities that provides on-demand availability of computer system resources and/or other computer capabilities, especially data storage (cloud storage) and computing power, without direct active management by the scale. The direct and active management of the computing resources of public cloud 2105 is performed by the computer hardware and/or software of cloud orchestration module 2141. The computing resources provided by public cloud 2105 are typically implemented by virtual computing environments that run on various computers making up the computers of host physical machine set 2142, which is the universe of physical computers in and/or available to public cloud 2105. The virtual computing environments (VCEs) typically take the form of virtual machines from virtual machine set 2143 and/or containers from container set 2144. It is understood that these VCEs may be stored as images and may be transferred among and between the various physical machine hosts, either as images or after instantiation of the VCE. Cloud orchestration module 2141 manages the transfer and storage of images, deploys new instantiations of VCEs and manages active instantiations of VCE deployments. Gateway 2140 is the collection of computer software, hardware, and firmware that allows public cloud 2105 to communicate through WAN 2102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 2106 is similar to public cloud 2105, except that the computing resources are only available for use by a single enterprise. While private cloud 2106 is depicted as being in communication with WAN 2102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 2105 and private cloud 2106 are both part of a larger hybrid cloud.

ADDITIONAL CLOSING INFORMATION

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
a memory that stores computer executable components; and
a processor, operably coupled to the memory, and that executes the computer executable components stored in the memory, wherein the computer executable components comprise:
an evaluating component that employs a quantum register to output a processed vector based on a first variable, of a set of variables indexed over a selected dimension;
a valuation component that approximates a value function and that, based on the approximating, outputs a valuation amount representing provision of an aspect over the selected dimension,
wherein the value function is a function of an inner product of a set of processing functions that are based on the set of variables, including the first variable,
wherein a first processing function of the set of processing functions and of the inner product is based on the processed vector, and
wherein the set of variables correspond to conditions defining the provision of the aspect; and
an encoding component that generates a quantum circuit that encodes a dataset into the quantum register in the form of one or more corresponding quantum states,
wherein the encoding comprises employing a set of initial vectors representing the dataset, indexed over the selected dimension, and having been normalized.

2. The system of claim 1, wherein the encoding further comprises determining a balance between depth of the quantum circuit and width of the quantum circuit by employing a classical binary tree data structure for angles to encode the set of initial vectors.

3. The system of claim 1, wherein the set of initial vectors are defined over a parameter s represented by an integer in $\{1, \ldots, \log_2 N\}$, and wherein, for each respective vector of the set of initial vectors, N represents a length of the respective vector.

4. The system of claim 1, wherein the evaluating component employs the quantum register to perform a non-linear transformation of the set of initial vectors by calculating a plurality of monomial powers for the set of initial vectors, wherein the calculating comprises, based on a measurement obtained during execution of a quantum circuit implementation of the non-linear transformation, generating a decision to stop execution of the quantum circuit or to continue the execution of the quantum circuit.

5. The system of claim 1, wherein the evaluating component employs the quantum register to perform a non-linear transformation of a set of initial vectors by calculating a plurality of monomial powers for the set of initial vectors, wherein the calculating comprises
sequentially executing a set of iterations of a quantum circuit implementation of a quantum Hadamard product at the quantum register;
determining a measurement for the quantum circuit during execution of the quantum circuit; and
based on the measurement, generating a decision to stop execution of the quantum circuit comprising the set of iterations or to continue the execution of the quantum circuit.

6. The system of claim 4, further comprising:
a quantum amplitude estimation component that loads a processed dataset, comprising the processed vector, as a unitary quantum circuit, which processed dataset has been output from the evaluating component, and that directs estimation of the inner product of the set of the processing functions.

7. The system of claim 4, wherein performing the non-linear transformation by the evaluating component allows for output of the processed vector being representable as a quantum circuit.

8. A computer-implemented method, comprising:
employing, by a system operably coupled to a processor, a quantum register to output processed vector based on a first variable of a set of variables indexed over a selected dimension;
approximating, by the system, a value function, wherein the value function is a function of an inner product of a set of processing functions that are based on the set of variables, including the first variable, and wherein a first processing function of the set of processing functions and of the inner product is based on the processed vector;

based on the approximating, outputting, by the system, a valuation amount representing provision of an aspect over the selected dimension, wherein the set of variables correspond to conditions defining the provision of the aspect; and generating, by the system, a quantum circuit that encodes a dataset into the quantum register in the form of one or more corresponding quantum states, wherein the encoding comprises employing a set of initial vectors representing the dataset, indexed over the selected dimension, and having been normalized.

9. The computer-implemented method of claim 8, wherein the set of initial vectors are defined over a parameter s represented by an integer in $\{1, \ldots, \log_2 N\}$, and wherein, for each respective vector of the set of initial vectors, N represents a length of the respective vector.

10. The computer-implemented method of claim 9, further comprising:

employing, by the system, the quantum register to perform a non-linear transformation of the set of initial vectors by calculating a plurality of monomial powers for the set of initial vectors, wherein the calculating comprises based on a measurement obtained during execution of a quantum circuit implementation of the non-linear transformation, generating a decision to stop execution of the quantum circuit or to continue the execution of the quantum circuit.

11. The computer-implemented method of claim 10, further comprising:

loading, by the system, a processed dataset, comprising the processed vector, as a quantum circuit; and directing, by the system, estimation of the inner product of the processing functions.

12. The computer-implemented method of claim 8, further comprising:

employing, by the system, the quantum register to perform a non-linear transformation of a set of initial vectors by calculating a plurality of monomial powers for the set of initial vectors, wherein the calculating comprises sequentially executing a set of iterations of a quantum circuit implementation of a quantum Hadamard product at the quantum register;

determining a measurement for the quantum circuit during execution of the quantum circuit; and based on the measurement, generating a decision to stop execution of the quantum circuit comprising the set of iterations or to continue the execution of the quantum circuit.

13. A computer program product facilitating valuation of a portfolio, the computer program product comprising a computer readable storage medium having program instructions embodied therewith, the program instructions executable by a processor to cause the processor to:

employ, by the processor, a quantum register to output a processed vector based on a first variable, of a set of variables indexed over a selected dimension;

approximate, by the processor, a value function, wherein the value function is a function of an inner product of a set of processing functions that are based on the set of variables, including the first variable, and wherein a first processing function of the set of processing functions and of the inner product is based on the processed vector;

based on the approximating, output, by the processor, a valuation amount representing provision of an aspect over the selected dimension, wherein the set of variables correspond to conditions defining the provision of the aspect; and generate, by the processor, a quantum circuit that encodes a dataset into the quantum register in the form of one or more corresponding quantum states, wherein the encoding comprises employing a set of initial vectors representing the dataset, indexed over the selected dimension, and having been normalized.

14. The computer program product of claim 13, wherein the set of initial vectors are defined over a parameter s represented by an integer in $\{1, \ldots, \log_2 N\}$, and wherein, for each respective vector of the set of initial vectors, N represents a length of the respective vector.

15. The computer program product of claim 13, wherein the program instructions are further executable by a processor to cause the processor to:

employ, by the processor, the quantum register to perform a non-linear transformation of the set of initial vectors by calculating a plurality of monomial powers for the set of initial vectors, wherein the calculating comprises based on a measurement obtained during execution of a quantum circuit implementation of the non-linear transformation, generating a decision to stop execution of the quantum circuit or to continue the execution of the quantum circuit.

16. The computer program product of claim 15, wherein the program instructions are further executable by a processor to cause the processor to:

load, by the processor, a processed dataset, comprising the processed vector, as a quantum circuit; and direct, by the processor, estimation of the inner product of the processing functions.

17. The computer program product of claim 13, wherein the program instructions are further executable by a processor to cause the processor to:

employ, by the processor, the quantum register to perform a non-linear transformation of a set of initial vectors by calculating a plurality of monomial powers for the set of initial vectors, wherein the calculating comprises sequentially executing a set of iterations of a quantum circuit implementation of a quantum Hadamard product at the quantum register;

determining a measurement for the quantum circuit during execution of the quantum circuit; and based on the measurement, generating a decision to stop execution of the quantum circuit comprising the set of iterations or to continue the execution of the quantum circuit.

* * * * *